US012311406B2

(12) United States Patent
Martini et al.

(10) Patent No.: US 12,311,406 B2
(45) Date of Patent: May 27, 2025

(54) METHODS FOR PRODUCING OPTICAL EFFECT LAYERS COMPRISING MAGNETIC OR MAGNETIZABLE PIGMENT PARTICLES AND EXHIBITING ONE OR MORE INDICIA

(71) Applicant: SICPA HOLDING SA, Prilly (CH)

(72) Inventors: Thibaut Martini, Nyon (CH); Hervé Pittet, Châtel-St-Denis (CH); Patrick Veya, Aclens (CH); Riccardo Ruggerone, Echallens (CH); Jean Garnier, Corcelles-le-Jorat (CH)

(73) Assignee: SICPA HOLDING SA, Prilly (CH)

( * ) Notice: Subject to any disclaimer, the term of this patent is extended or adjusted under 35 U.S.C. 154(b) by 86 days.

(21) Appl. No.: 18/553,680

(22) PCT Filed: Mar. 30, 2022

(86) PCT No.: PCT/EP2022/058389
§ 371 (c)(1),
(2) Date: Oct. 2, 2023

(87) PCT Pub. No.: WO2022/207692
PCT Pub. Date: Oct. 6, 2022

(65) Prior Publication Data
US 2024/0238839 A1 Jul. 18, 2024

(30) Foreign Application Priority Data
Mar. 31, 2021 (EP) .................................... 21166341

(51) Int. Cl.
*B05D 5/06* (2006.01)
*B05D 3/00* (2006.01)
(Continued)

(52) U.S. Cl.
CPC ............... *B05D 5/06* (2013.01); *B05D 3/067* (2013.01); *B05D 3/207* (2013.01); *B05D 7/542* (2013.01);
(Continued)

(58) Field of Classification Search
None
See application file for complete search history.

(56) References Cited

U.S. PATENT DOCUMENTS 2,418,479 A 4/1947 Pratt et al.
2,570,856 A 10/1951 Pratt et al.
(Continued)

FOREIGN PATENT DOCUMENTS

| CN | 102529326 | 8/2014 |
| DE | 2006848 | 9/1971 |

(Continued)

OTHER PUBLICATIONS

Z.Q. Zhu and D. Howe, Halbach permanent magnet machines and applications: a review, IEE. Proc. Electric Power Appl., 2001, 148, p. 299-308.

(Continued)

*Primary Examiner* — Alexander M Weddle
(74) *Attorney, Agent, or Firm* — Muncy, Geissler, Olds & Lowe, P.C.

(57) ABSTRACT

The invention relates to the field of the protection of security documents such as for example banknotes and identity documents against counterfeit and illegal reproduction. In particular, the present invention provides methods for producing optical effect layers exhibiting one or more indicia on a substrate, said method comprising a step of exposing a coating layer comprising non-spherical magnetic or magnetizable pigment particles to a magnetic field of a magnetic-field generating device so as to orient at least a part of the (Continued)

magnetic or magnetizable pigment particles; a step of applying a top coating composition on top of the coating layer and in the form of one or more indicia, and a step of at least partially curing the coating layer and the one or more indicia with a curing unit.

16 Claims, 19 Drawing Sheets

(51) Int. Cl.
| | | |
|---|---|---|
| B05D 3/06 | (2006.01) | |
| B05D 7/00 | (2006.01) | |
| C09D 11/037 | (2014.01) | |
| C09D 11/101 | (2014.01) | |
| C09D 11/322 | (2014.01) | |
| C09D 11/38 | (2014.01) | |
| C09D 11/50 | (2014.01) | |
| C09D 11/54 | (2014.01) | |

(52) U.S. Cl.
CPC .......... *C09D 11/037* (2013.01); *C09D 11/101* (2013.01); *C09D 11/322* (2013.01); *C09D 11/38* (2013.01); *C09D 11/50* (2013.01); *C09D 11/54* (2013.01)

(56) References Cited

U.S. PATENT DOCUMENTS

| | | |
|---|---|---|
| 3,676,273 A | 7/1972 | Graves |
| 3,791,864 A | 2/1974 | Steingroever |
| 4,838,648 A | 6/1989 | Phillips et al. |
| 5,364,689 A | 11/1994 | Kashiwagi et al. |
| 5,630,877 A | 5/1997 | Kashiwagi et al. |
| 6,103,361 A | 8/2000 | Batzar et al. |
| 6,410,130 B1 | 6/2002 | Schuhmacher et al. |
| 6,531,221 B1 | 3/2003 | Schuhmacher et al. |
| 6,582,781 B1 | 6/2003 | Schuhmacher et al. |
| 6,838,166 B2 | 1/2005 | Phillips et al. |
| 8,025,952 B2 | 9/2011 | Raksha et al. |
| 8,343,615 B2 | 1/2013 | Raksha et al. |
| 10,359,730 B2 | 7/2019 | Anno et al. |
| 10,503,091 B2 | 12/2019 | Tsurumi et al. |
| 2002/0160194 A1 | 10/2002 | Phillips et al. |
| 2004/0009309 A1 | 1/2004 | Raksha et al. |
| 2005/0106367 A1 | 5/2005 | Raksha et al. |
| 2007/0172261 A1 | 7/2007 | Raksha et al. |
| 2013/0084411 A1 | 4/2013 | Raksha et al. |

FOREIGN PATENT DOCUMENTS

| | | | |
|---|---|---|---|
| DE | 102010009977 | 9/2011 | |
| EP | 0406667 | 1/1995 | |
| EP | 0710508 | 5/1996 | |
| EP | 0686675 | 2/1998 | |
| EP | 1710756 | 10/2006 | |
| EP | 1641624 | 4/2008 | |
| EP | 1937415 | 4/2009 | |
| EP | 2157141 | 2/2010 | |
| EP | 1819525 | 3/2010 | |
| EP | 2263806 | 12/2010 | |
| EP | 2263807 | 12/2010 | |
| EP | 2306222 | 4/2011 | |
| EP | 2325677 | 5/2011 | |
| EP | 2223976 | 9/2012 | |
| EP | 1674282 | 6/2013 | |
| EP | 2402401 | 11/2013 | |
| EP | 2155498 | 3/2014 | |
| EP | 3224055 | 8/2018 | |
| EP | 3459758 | 3/2019 | |
| EP | 2542421 | 5/2019 | |
| EP | 3170566 | 10/2019 | |
| EP | 3587500 | 1/2020 | |
| WO | 02009002 | 1/2002 | |
| WO | 02073250 | 9/2002 | |
| WO | 02090002 | 11/2002 | |
| WO | 03000801 | 1/2003 | |
| WO | 2004007095 | 1/2004 | |
| WO | 2005002866 | 1/2005 | |
| WO | 2006061301 | 6/2006 | |
| WO | 2006063926 | 6/2006 | |
| WO | 2006114289 | 11/2006 | |
| WO | 2007131833 | 11/2007 | |
| WO | 2008046702 | 4/2008 | |
| WO | 2010058026 | 5/2010 | |
| WO | 2011012520 | 2/2011 | |
| WO | 2011092502 | 8/2011 | |
| WO | 2012104098 | 8/2012 | |
| WO | 2013167425 | 11/2013 | |
| WO | 2014108303 | 7/2014 | |
| WO | 2014108404 | 7/2014 | |
| WO | 2014198905 | 12/2014 | |
| WO | 2015082344 | 6/2015 | |
| WO | 2015086257 | 6/2015 | |
| WO | 2015121028 | 8/2015 | |
| WO | 2016015973 | 2/2016 | |
| WO | 2016026896 | 2/2016 | |
| WO | 2016193252 | 12/2016 | |
| WO | 2017064052 | 4/2017 | |
| WO | 2017080698 | 5/2017 | |
| WO | 2017148789 | 9/2017 | |
| WO | 2018019594 | 2/2018 | |
| WO | 2018033512 | 2/2018 | |
| WO | 2018045230 | 3/2018 | |
| WO | 2018054819 | 3/2018 | |
| WO | 2018141547 | 8/2018 | |
| WO | 2019103937 | 5/2019 | |
| WO | 2019215148 | 11/2019 | |
| WO | 2020006286 | 1/2020 | |
| WO | 2020025218 | 2/2020 | |
| WO | 2020025482 | 2/2020 | |
| WO | 2020025862 | 3/2020 | |
| WO | WO-2020052862 A1 * | 3/2020 | ............ B05D 3/065 |
| WO | 2020148076 | 7/2020 | |
| WO | 2020160993 | 8/2020 | |
| WO | 2020193009 | 10/2020 | |
| WO | WO-2021259527 A1 * | 12/2021 | ............ B05D 3/207 |

OTHER PUBLICATIONS

F. C. Krebs, Solar Energy Materials & Solar Cells (2009), 93, p. 405-406.

F. C. Krebs, Solar Energy Materials & Solar Cells (2009), 93, p. 407.

N. J. Wilkinson et al., A review of aerosol jet printing—a non-traditional hybrid process for micro-manufacturing, The International Journal of Advanced Manufacturing Technology (2019) 105:4599-4619.

P.V. Raje and N.C. Murmu, A review on electrohydrodynamic-inkjet printing technology, International Journal of Emerging Technology and Advanced Engineering, (2014), 4(5), pp. 174-183.

Chemistry & Technology of UV & EB Formulation for Coatings, Inks & Paints, vol. III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.

International Search Report and Written Opinion issued with repect to application No. PCT/EP2022/058389.

* cited by examiner

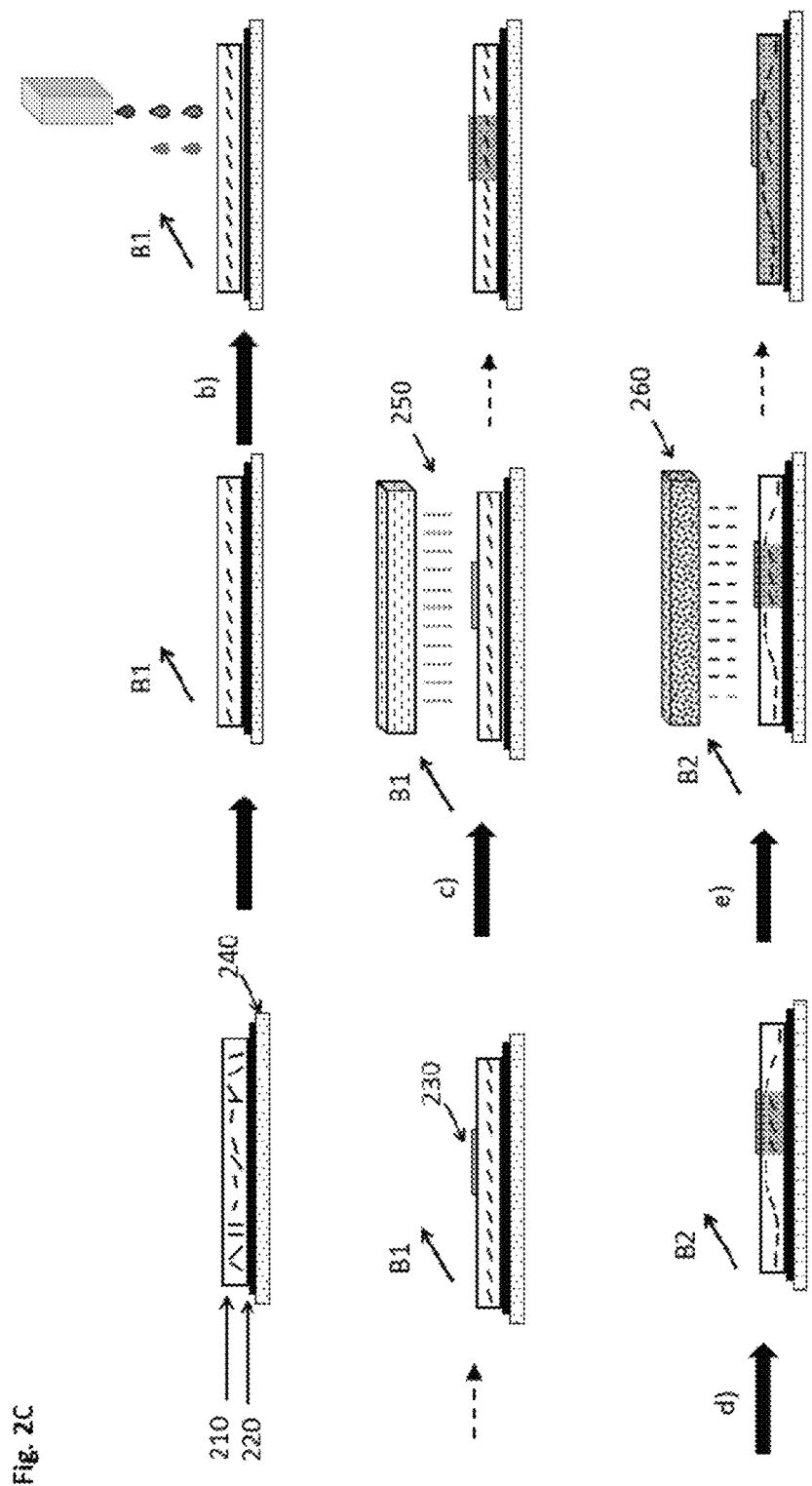

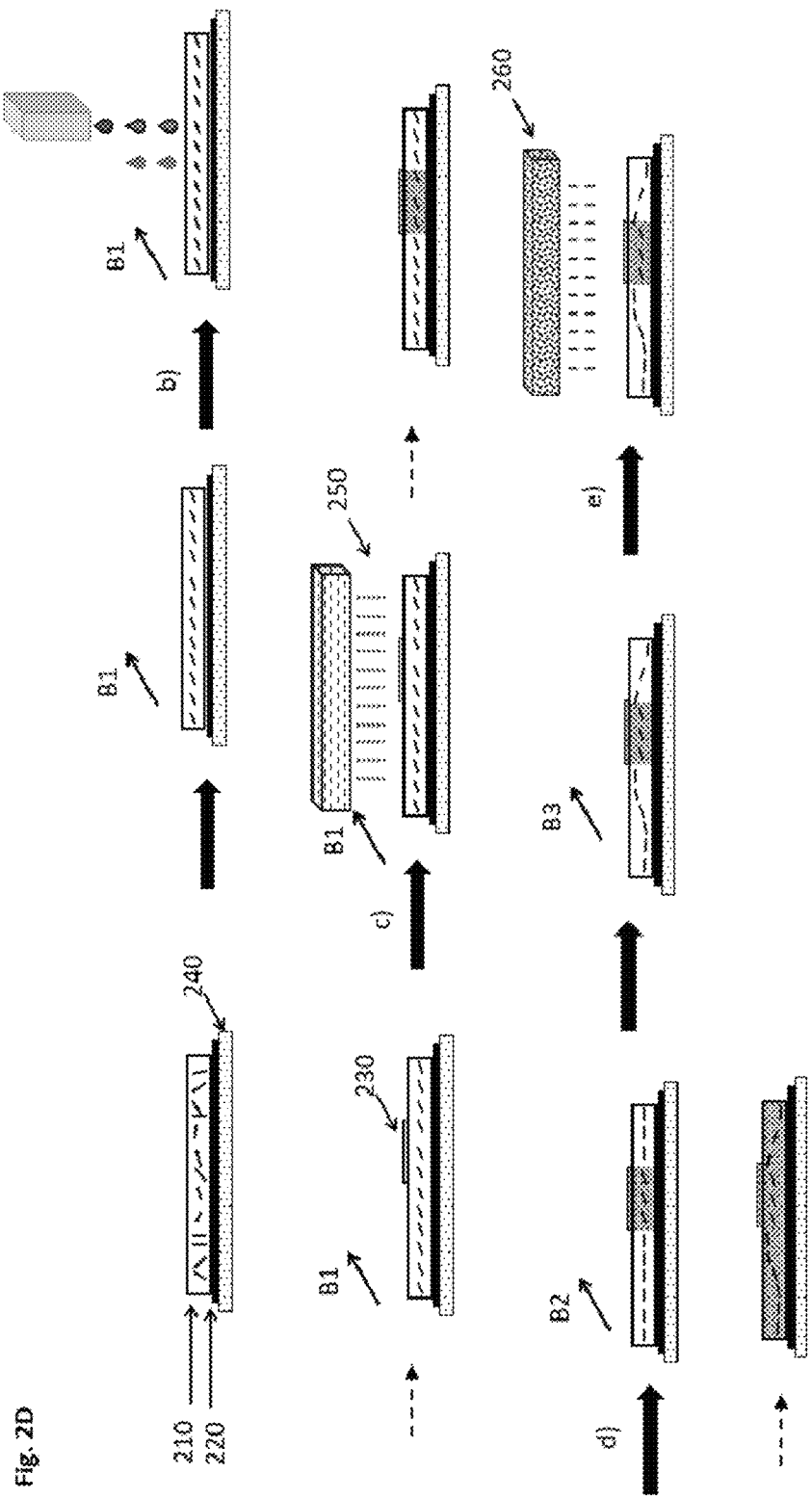

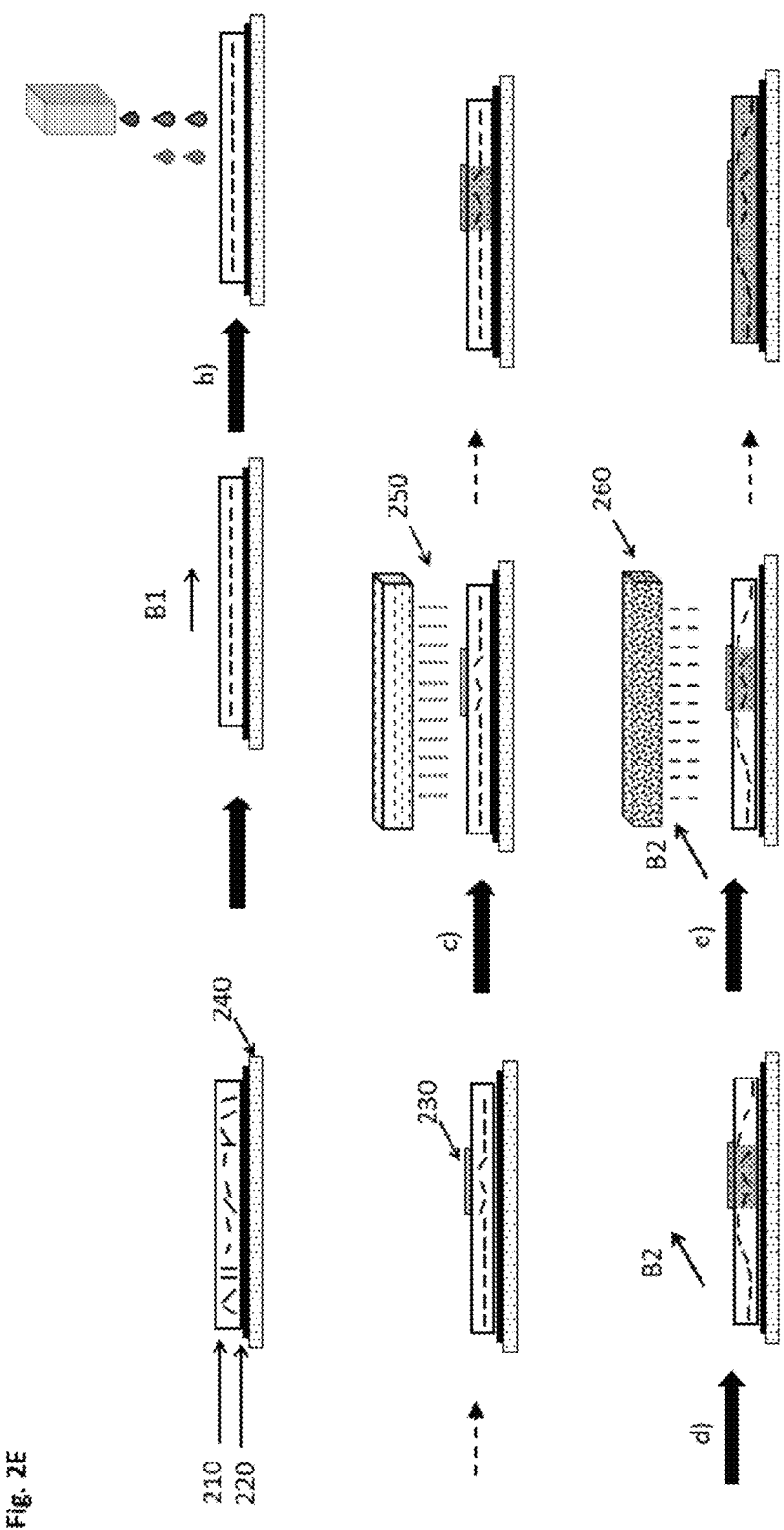

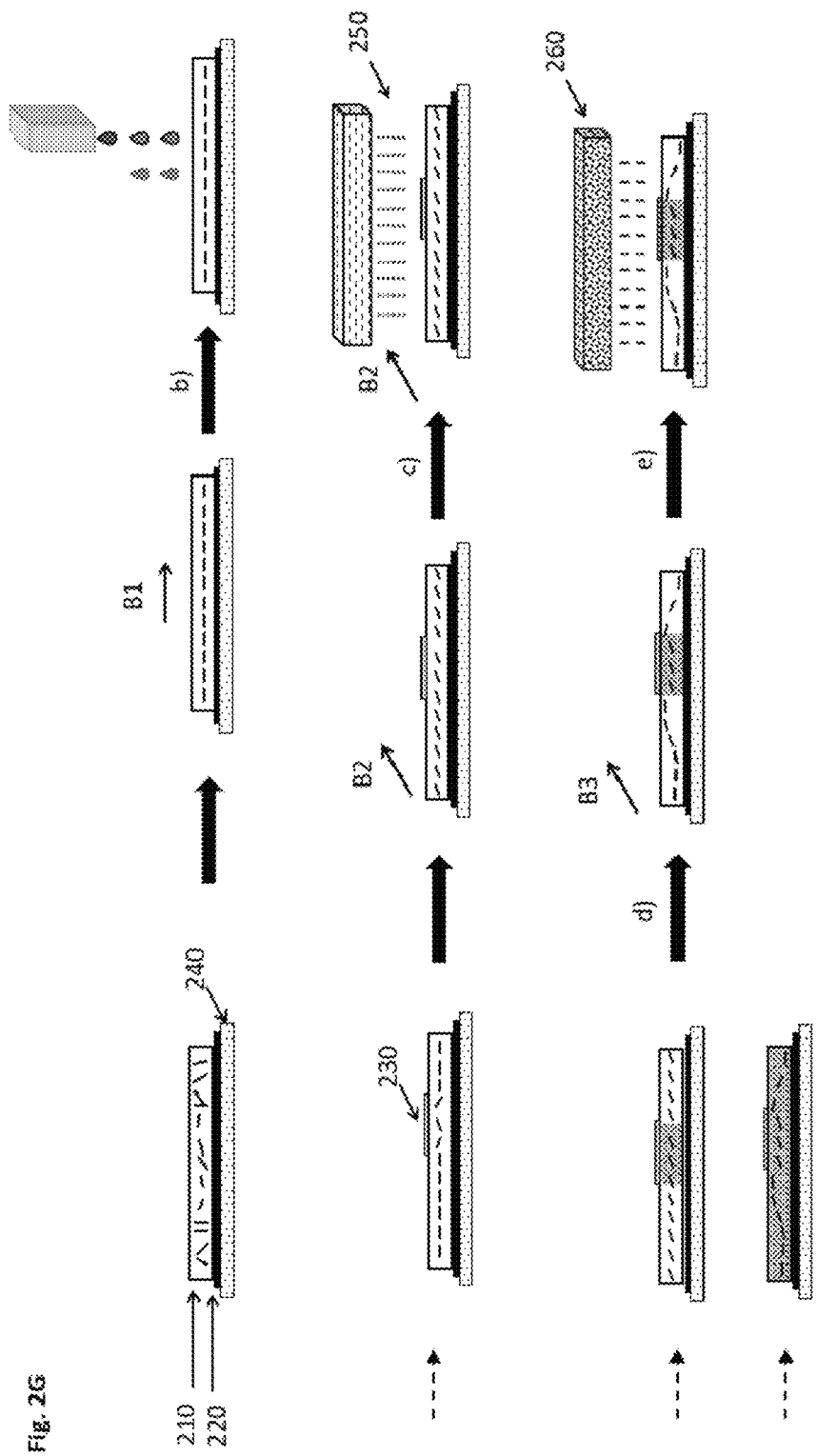

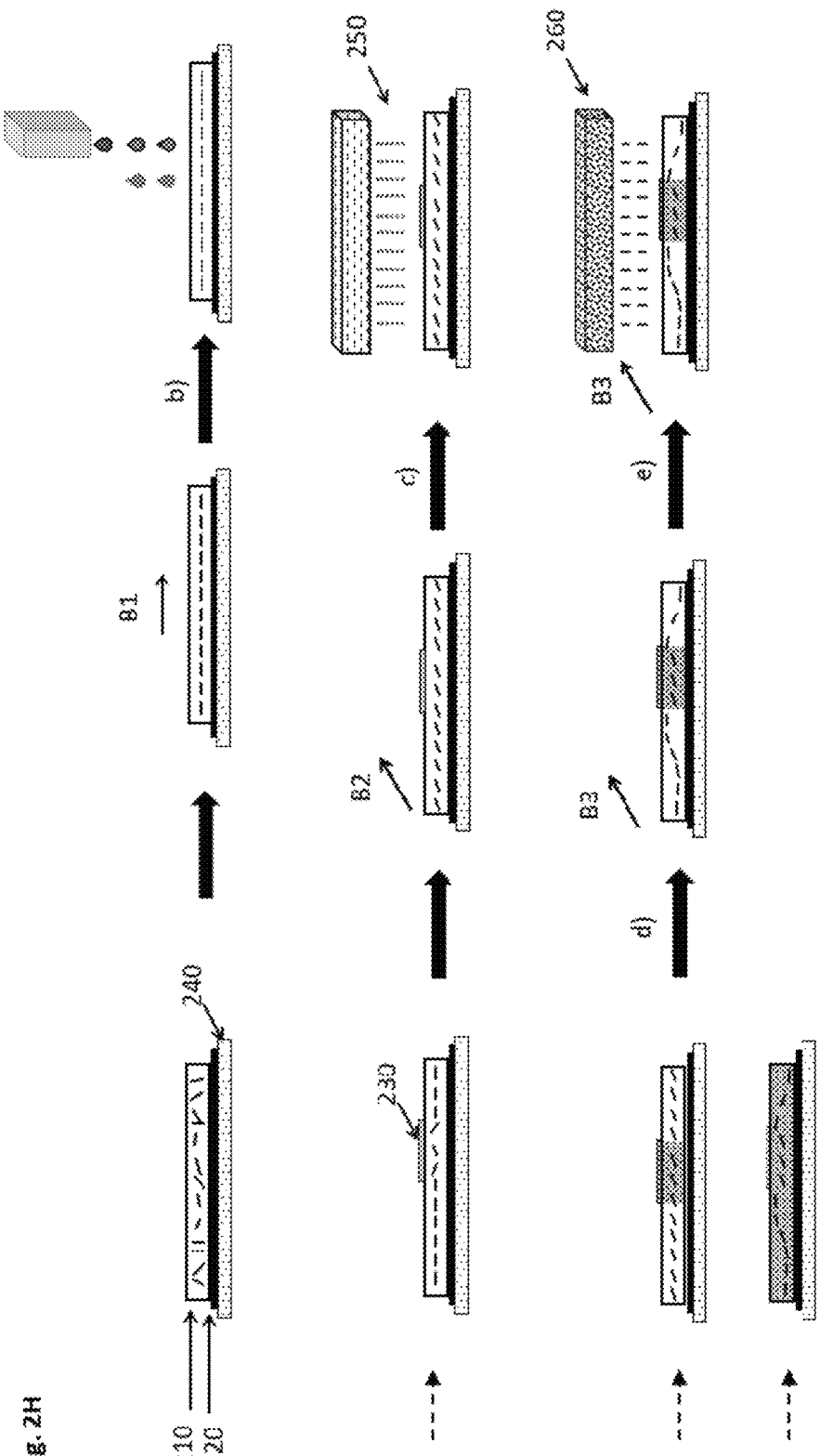

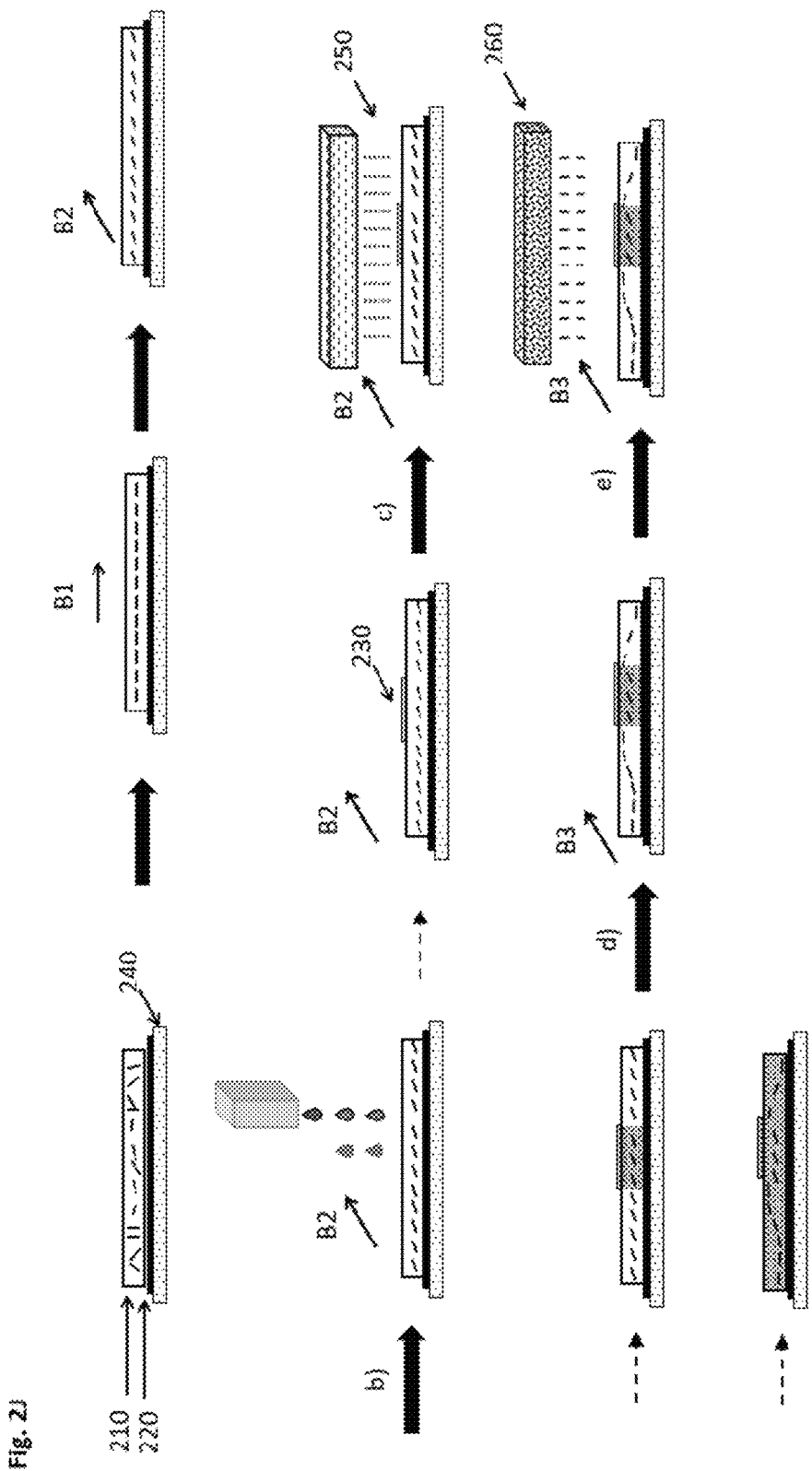

Fig. 4A (cnt)

METHODS FOR PRODUCING OPTICAL EFFECT LAYERS COMPRISING MAGNETIC OR MAGNETIZABLE PIGMENT PARTICLES AND EXHIBITING ONE OR MORE INDICIA

FIELD OF THE INVENTION

The present invention relates to the field of magnetic-field generating devices and methods for producing optical effect layers (OELs) comprising magnetically oriented non-spherical magnetic or magnetizable pigment particles. In particular, the present invention provides magnetic-field generating devices and method for magnetically orienting non-spherical magnetic or magnetizable pigment particles in coating layer so as to produce OELs and the use of said OELs as anti-counterfeit means on security documents or security articles as well as decorative purposes.

BACKGROUND OF THE INVENTION

It is known in the art to use inks, compositions, coatings or layers containing oriented magnetic or magnetizable pigment particles, particularly also optically variable magnetic or magnetizable pigment particles, for the production of security elements, e.g. in the field of security documents. Coatings or layers comprising oriented magnetic or magnetizable pigment particles are disclosed for example in U.S. Pat. Nos. 2,570,856; 3,676,273; 3,791,864; 5,630,877 and 5,364,689. Coatings or layers comprising oriented magnetic color-shifting pigment particles, resulting in particularly appealing optical effects, useful for the protection of security documents, have been disclosed in WO 2002/090002 A2 and WO 2005/002866 A1.

Security features, e.g. for security documents, can generally be classified into "covert" security features on the one hand, and "overt" security features on the other hand. The protection provided by covert security features relies on the principle that such features are difficult to detect, typically requiring specialized equipment and knowledge for detection, whereas "overt" security features rely on the concept of being easily detectable with the unaided human senses, e.g. such features may be visible and/or detectable via the tactile sense while still being difficult to produce and/or to copy. However, the effectiveness of overt security features depends to a great extent on their easy recognition as a security feature.

Magnetic or magnetizable pigment particles in printing inks or coatings allow for the production of magnetically induced images, designs and/or patterns through the application of a correspondingly structured magnetic field, inducing a local orientation of the magnetic or magnetizable pigment particles in the not yet hardened (i.e. wet) coating, followed by the hardening of the coating. The result is a fixed and stable magnetically induced image, design or pattern. Materials and technologies for the orientation of magnetic or magnetizable pigment particles in coating compositions have been disclosed for example in U.S. Pat. Nos. 2,418,479; 2,570,856; 3,791,864, DE 2006848-A, U.S. Pat. Nos. 3,676,273, 5,364,689, 6,103,361, EP 0 406 667 B1; US 2002/0160194; US 2004/0009309; EP 0 710 508 A1; WO 2002/09002 A2; WO 2003/000801 A2; WO 2005/002866 A1; WO 2006/061301 A1. In such a way, magnetically induced patterns which are highly resistant to counterfeit can be produced. The security element in question can only be produced by having access to both, the magnetic or magnetizable pigment particles or the corresponding ink, and the particular technology employed to print said ink and to orient said pigment in the printed ink.

With the aim of protecting security documents or articles comprising a magnetically induced image against the premature detrimental influence of soil and/or moisture upon use and time, it has been a practice to apply a protective varnish. Said protective varnishes are applied as continuous layers on top of the already prepared and dried/cured magnetically induced image.

WO 2011/012520 A2 discloses a transfer foil comprising a coating layer having the form of a design, said design comprising oriented optically variable magnetic pigment representing an image, indicium, or a pattern. The transfer foil may further comprise a top coating layer, wherein said top coating layer is applied prior to the application of the layer comprising the optically variable magnetic pigment. The process to produce said transfer foil comprises a) a step of applying the top coating layer, hardening/curing said top coating layer, and b) applying the layer comprising the optically variable magnetic pigments, magnetically orienting the particles and hardening/curing said layer. The disclosed methods are not suitable for producing magnetically induced images required to exhibit personalized variable indicia.

EP 1 641 624 B1, EP 1 937 415 B1 and EP 2 155 498 B1 disclose devices and method for magnetically transferring indicia into a not yet hardened (i.e. wet) coating composition comprising magnetic or magnetizable pigment particles so as to form optical effect layers (OELs). The disclosed methods allow the production of security documents and articles having a customer-specific magnetic design. However, the disclosed magnetic devices are prepared to meet the specific design and cannot be modified if said design is required to change from one article to another one and thus, the methods are not suitable for producing OEL required to exhibit personalized variable indicia.

EP 3 170 566 B1, EP 3 459 758 A1, EP 2 542 421 B1 and WO 2020/148076 A1 disclose different methods for the production of variable indicia on optically variable magnetic ink. However, said methods require the use of special apparatus such as photomask, laser or addressable LED.

With the aim of producing variable information having magnetic properties on security documents or articles, inkjet inks comprising magnetic particles have been developed to allow Magnetic Ink Character Recognition (MICR). However, said inkjet inks face different challenges in particular related to the shelf-life stability of said inks, ink printability, non-homogeneous magnetic inks deposits and printhead clogging. EP 2 223 976 B1 discloses a method for the production of documents comprising a MICR feature, wherein said method comprises a step of applying by inkjet a pattern of a curable ink containing a gellant on a substrate, cooling the ink below the gel temperature of the ink, applying a magnetic material to the ink and finally curing said ink. Alternatively, toner comprising magnetic particles have also been developed and are disclosed for example in U.S. Pat. No. 10,503,091 B2 and U.S. Pat. No. 10,359,730 B2. However specific dedicated apparatus are required to print those toners.

Therefore, a need remains for methods to produce customized optical effect layers exhibiting one or more indicia in a versatile manner but also on an industrial scale, said optical effects layers exhibiting an eye-catching effect. Furthermore, said methods should be reliable, easy to implement and able to work at a high production speed.

SUMMARY OF THE INVENTION

Accordingly, it is an object of the present invention to overcome the deficiencies of the prior art. This is achieved by the provision of a method for producing an optical effect layer (OEL), said OEL comprising a motif made of at least two areas made of a single applied and cured layer comprising non-spherical magnetic or magnetizable pigment particles and exhibiting one or more indicia (×30) on a substrate (×20), the method comprising the steps of:

a) applying on a substrate (×20) surface a radiation curable coating composition comprising the non-spherical magnetic or magnetizable pigment particles and one or more photo-reactive compounds not absorbing in an range from about 350 nm to about 470 nm, said radiation curable coating composition being in a first, liquid state so as to form a coating layer (×10);

b) subsequently to step a), applying a top coating composition at least partially on top of the coating layer (×10), wherein said top coating composition is applied in the form of one or more indicia (×30) and wherein said top coating composition comprises one or more compounds absorbing in the range from about 350 nm to about 470 nm, c) partially simultaneously with or subsequently to step b), at least partially curing the one or more indicia (×30) and the one or more areas of the coating layer (×10) below said one or more indicia (×30) with a LED curing unit (×50) emitting between 350 nm and 470 nm.

d) subsequently to step c), exposing the coating layer (×10) to a magnetic field of a magnetic-field generating device so as to orient at least a part of the non-spherical magnetic or magnetizable pigment particles; and e) partially simultaneously with or subsequently to step d), at least partially curing the coating layer (×10) with a curing unit (×60) at least emitting between 250 nm and 320 nm, wherein the radiation curable coating composition and the top coating composition are cationically curable compositions, and wherein the one or more photo-reactive compounds not absorbing in the range from about 350 nm to about 470 nm of the radiation curable coating composition of step a) and the one or more compounds absorbing in the range from about 350 nm to about 470 nm of the top curable coating composition of step b) are selected according to one of the following combinations:

i) the one or more compounds of the radiation curable coating composition of step a) are iodonium salts and the one or more compounds of the top curable coating composition of step b) are thioxanthone compounds;

ii) the one or more compounds of the radiation curable coating composition of step a) are iodonium salts, and
the one or more compounds of the top curable coating composition of step b) are anthracene compounds;

iii) the one or more compounds of the radiation curable coating composition of step a) are iodonium salts, and
the one or more compounds of the top curable coating composition of step b) are coumarin compounds;

iv) the one or more compounds of the radiation curable coating composition of step a) are iodonium salts and
the one or more compounds of the top curable coating composition of step b) are naphthalene compounds and the top curable coating composition of step b) further comprises one or more anthracene compounds;

v) the one or more compounds of the radiation curable coating composition of step a) are sulfonium salts having a cationic moiety and an anionic moiety, wherein cationic moiety is 4-(phenylthio)phenyldiphenyl-sulfonium; bis[4-(diphenylsulfonium)phenyl] sulfide; (4-methylphenyl)diphenyl-sulfonium; (3-methylphenyl)diphenyl-sulfonium; bis(4-methylphenyl)phenyl-sulfonium; [(4-(1,1-dimethylethyl)phenyl]diphenyl-sulfonium; bis[4-(1-methylethyl)phenyl]phenyl-sulfonium; [(4-(2-methylpropyl)phenyl]diphenyl-sulfonium; (4-methoxyphenyl)diphenyl-sulfonium; 1-naphthalenyldiphenyl-sulfonium; tris(4-methylphenyl)-sulfonium; (4-bromophenyl)diphenyl-sulfonium; (4-iodophenyl)diphenyl-sulfonium; (4-fluorophenyl)diphenyl-sulfonium; (4-chlorophenyl)diphenyl-sulfonium; (4-phenoxyphenyl)diphenyl-sulfonium; (4'-methyl[1,1'-biphenyl]-4-yl)diphenyl-sulfonium; tris(4-propylphenyl)-sulfonium; bis(4-butylphenyl)phenyl-sulfonium; tris[4(1-methylethyl)phenyl]-sulfonium; S,S'-1,3-phenylenbis[S,S'-diphenyl]-sulfonium; (4-dodecylphenyl)diphenyl-sulfonium; (4-benzoylphenyl)diphenyl-sulfonium; bis([1,1'-biphenyl]-4-yl)(4-methylphenyl)-sulfonium; tris[4-[1,1-dimethylethyl)phenyl]-sulfonium; triphenyl-sulfonium, 5-(4-methylphenyl)-dibenzothiophenium; 10-(4-methylphenyl)-9H-thioxanthenium; diphenyl[4-[[(4-phenylthiophenyl]thio]phenyl]-sulfonium; phenylbis[4-phenylthio)phenyl]-sulfonium; 5-[4-(phenylthio)phenyl]-thianthrenium; 5-[4-(phenylthio)phenyl]-dibenzothiophenium; 10-[4-(diphenylthio)phenyl]-9H-thioxanthenium; 5-phenyl-thianthrenium; 10-phenyl-9H-thioxanthenium; 5-(4-methylphenyl)-thianthrenium; 5-[1,1'-biphenyl]-4-yl-thianthrenium; or S,S'-(thiodi-4,1-phenylene)bis[S,S'-bis[4-(2-hydroxyethoxy)]phenyl]-sulfonium;
5-[4-(2-hydroxyethoxy) phenyl]thianthrenium; and the one or more compounds of the top curable coating composition of step b) are anthracene compounds;

vi) the one or more compounds of the radiation curable coating composition of step a) are sulfonium salts having a cationic moiety and an anionic moiety, wherein the cationic moiety is any one of those of v), and
the one or more compounds of the top curable coating composition of step b) are thioxanthone compounds and the top curable coating composition of step b) further comprises one or more compounds being iodonium salts;

vii) the one or more compounds of the radiation curable coating composition of step a) are sulfonium salts having a cationic moiety and an anionic moiety, wherein the cationic moiety is any one of those of v), and
the one or more compounds of the top curable coating composition of step b) are naphthalene compounds and the top curable coating composition of step b) further comprises one or more anthracene compounds;

viii) the one or more compounds of the radiation curable coating composition of step a) are sulfonium salts having a cationic moiety and an anionic moiety, wherein the cationic moiety is any one of those of v), and the one or more compounds of the top curable coating composition of step b) are coumarin compounds and the top curable coating composition of step b) further comprises one or more compounds being iodonium salts;

ix) the one or more compounds of the radiation curable coating composition of step a) are selected from the group consisting of iodonium salts, sulfonium salts having a cationic moiety and an anionic moiety, wherein the cationic moiety is any one of those of v), and mixtures thereof, and the one or more compounds of the top curable coating composition of step b) are iodonium salts having a cationic moiety and an anionic moiety, wherein the cationic moiety is [(7-methoxy-4-methyl-2-oxo-2H-1-benzopyran-3-yl)phenyl]iodonium or [(7-methoxy-4-methyl-2-oxo-2H-1-benzopyran-3-yl)phenyl]iodonium;

x) the one or more compounds of the radiation curable coating composition of step a) are selected from the group consisting of iodonium salts, sulfonium salts having a cationic moiety and an anionic moiety, wherein the cationic moiety is any one of those of v), and mixtures thereof, and the one or more compounds of the top curable coating composition of step b) are oxonium salts having a cationic moiety and an anionic moiety, wherein the cationic moiety 2,4,6-triphenylpyrylium; 2,4,6-tris(4-methylphenyl)-pyrylium; 2,4,6-tris(4-methoxyphenyl)-pyrylium; 2,6-bis(4-fluorophenyl)-4-(4-methoxyphenyl)-pyrylium; 3-methyl-2,4,6-triphenyl-pyrylium; 2,4,6-tris([1,1'-biphenyl]-4-yl)-pyrylium; 4-[4-(dimethylamino)phenyl]-2,6-diphenyl-pyrylium or 2,4-bis(4-methoxyphenyl)-6-phenyl-pyrylium;

xi) the one or more compounds of the radiation curable coating composition of step a) are selected from the group consisting of iodonium salts, sulfonium salts having a cationic moiety and an anionic moiety, wherein the cationic moiety is any one of those of v), and mixtures thereof, and the one or more compounds of the top curable coating composition of step b) are sulfonium salts having a cationic moiety and an anionic moiety, wherein the cationic moiety is tris[4-(4-acetylphenylsulfanyl)phenyl]-sulfonium; 10-[1,1'-biphenyl]-4-yl-2-(1-methylethyl)-9-oxo-9H-thioxanthenium; or (9-oxo-9H-thioxanthen-2-yl)diphenyl-sulfonium.

In one preferred embodiment, the step a) of applying the radiation curable coating composition is carried out by a process selected from the group consisting of screen printing, rotogravure printing, pad printing and flexography printing.

In one preferred embodiment, the step b) of applying the top coating composition is carried out by a contactless fluid microdispensing technologies, preferably by an inkjet printing process.

Also described herein are optical effect layers (OELs) produced by the method described herein and security documents as well as decorative elements and objects comprising one or more optical OELs described herein.

Also described herein are methods of manufacturing a security document or a decorative element or object, comprising a) providing a security document or a decorative element or object, and b) providing an optical effect layer such as those described herein, in particular such as those obtained by the method described herein, so that it is comprised by the security document or decorative element or object.

The method described herein advantageously allows the production of optical effect layers (OELs) made of a single layer and comprising two or more areas made of a radiation cured coating composition comprising non-spherical magnetic or magnetizable pigment particles, wherein said two or more areas comprise non-spherical magnetic or magnetizable pigment particles oriented according to a different orientation pattern with high resolution, said method not requiring the use of curing units with photomask or laser or addressable LED curing units.

The method described herein advantageously uses two compositions, wherein said two compositions are applied on each other in a wet-on-wet state. In particular, the method according to the invention allows the production of optical effect layers (OELs) exhibiting one or more indicia in a versatile manner, can be easily implemented on an industrial scale at a high production speed. The two compositions used in the method described herein comprise as a first composition, a radiation curable coating composition comprising non-spherical magnetic or magnetizable pigment particles which is applied on the substrate (×20) and a top coating composition as second composition which is applied at least partially on top of the radiation curable coating composition comprising the pigment particles and partially overlaps (i.e. overlaps in at least one area) said composition and which is applied in the form of the one or more indicia, when said radiation curable coating composition is still in a wet, unpolymerized state.

The present invention provides a reliable and easy-to-implement method for producing eye-catching optical effect layers (OELs) exhibiting the one or more indicia described herein. The disclosed methods advantageously allow the production of security documents and articles having a customer-specific magnetic design also exhibiting one or more indicia in a versatile, on-line variation, easy-to-implement and highly reliable way without requiring the customization of the magnetic assemblies used to orient the non-spherical magnetic or magnetizable pigment particles for each variable or personalized indicium and for each and every customer-specific optical effect layers (OELs) and without requiring the use of hardening units with photomasks or addressable LED curing units.

BRIEF DESCRIPTION OF DRAWINGS

The methods described herein for producing optical effect layers (OELs) exhibiting one or more indicia (×30) on the substrate (×20) described herein are now described in more details with reference to the drawings and to particular embodiments, wherein FIG. 1 schematically illustrates a non-spherical, in particular platelet-shaped, pigment particle.

FIG. 2C schematically illustrates a method for producing an optical effect layer (OEL) on a substrate (220) according to the present invention. The method comprises a step of exposing the coating layer (210) to a magnetic field of a magnetic-field generating device (B1) so as to orient at least a part of the non-spherical magnetic or magnetizable pigment particles, partially simultaneously with said step, a step b) of applying a top coating composition on top of the coating layer (210), wherein said top coating composition is applied in the form of one or more indicia (230) while maintaining the magnetic-field generating device (B1) in the vicinity of the coating layer (210); subsequently to step b), a step c) at least partially curing the one or more indicia (230) and the one or more areas of the coating layer (210) below said one or more indicia (230) with a LED curing unit (250) while maintaining the magnetic-field generating device (B1) in the vicinity of the coating layer (210); subsequently to step c), a step d) exposing the coating layer (210) to a magnetic field of a second magnetic-field generating device (B2) so as to orient at least a part of the magnetic or magnetizable pigment particles in the not yet cured areas of the coating layer (210); and partially simultaneously with to step d), a step e) of at least partially curing the coating layer (210) with a curing unit (260) at least emitting between 250 nm and 320 nm while maintaining the second magnetic-field generating device (B2) in the vicinity of the coating layer (210).

FIG. 2D schematically illustrates a method for producing an optical effect layer (OEL) on a substrate (220) according to the present invention. The method comprises a step of exposing the coating layer (210) to a magnetic field of a magnetic-field generating device (B1) so as to orient at least a part of the non-spherical magnetic or magnetizable pigment particles, partially simultaneously with said step, a step b) of applying a top coating composition on top of the coating layer (210), wherein said top coating composition is applied in the form of one or more indicia (230) while maintaining the magnetic-field generating device (B1) in the vicinity of the coating layer (210); subsequently to step b), a step c) of at least partially curing the one or more indicia (230) and the one or more areas of the coating layer (210) below said one or more indicia (230) with a LED curing unit (250) while maintaining the magnetic-field generating device (B1) in the vicinity of the coating layer (210); subsequently to step c), a step d) exposing the coating layer (210) to a magnetic field of a second magnetic-field generating device (B2) so as to bi-axially orient at least a part of the non-spherical magnetic or magnetizable pigment particles in the not yet cured areas of the coating layer (210); subsequently to said step, a step of exposing the coating layer (210) to a magnetic field of a third magnetic-field generating device (B3) so as to orient at least a part of the magnetic or magnetizable pigment particles in the not yet cured areas of the coating layer (210); and partially simultaneously with said step, a step e) of at least partially curing the coating layer (210) with a curing unit (260) at least emitting between 250 nm and 320 nm while maintaining the magnetic-field generating device (B3) in the vicinity of the coating layer (210).

FIG. 2E schematically illustrates a method for producing an optical effect layer (OEL) on a substrate (220) according to the present invention. The method comprises a step of exposing the coating layer (210) to a magnetic field of a magnetic-field generating device (B1) so as to bi-axially orient at least a part of the non-spherical magnetic or magnetizable pigment particles, subsequently to said step, a step b) of applying a top coating composition on top of the coating layer (210), wherein said top coating composition is applied in the form of one or more indicia (230); subsequently to step b), a step c) of at least partially curing the one or more indicia (230) and the one or more areas of the coating layer (210) below said one or more indicia (230) with a LED curing unit (250); subsequently to step c), a step d) of exposing the coating layer (210) to a magnetic field of a second magnetic-field generating device (B2) so as to orient at least a part of the non-spherical magnetic or magnetizable pigment particles in the not yet cured areas of the coating layer (210); and partially simultaneously with step d), a step e) of at least partially curing the coating layer (210) with a curing unit (260) at least emitting between 250 nm and 320 nm while maintaining the second magnetic-field generating device (B2) in the vicinity of the coating layer (210).

FIGS. 2F and 2G schematically illustrate methods for producing an optical effect layer (OEL) on a substrate (220) according to the present invention. The method comprises a step of exposing the coating layer (210) to a magnetic field of a magnetic-field generating device (B1) so as to bi-axially orient at least a part of the non-spherical magnetic or magnetizable pigment particles; subsequently to said step, a step b) of applying a top coating composition on top of the coating layer (210), wherein said top coating composition is applied in the form of one or more indicia (230); subsequently to step b), a step of exposing the coating layer (210) to a magnetic field of a second magnetic-field generating device (B2) so as to orient at least a part of the non-spherical magnetic or magnetizable pigment particles; partially simultaneously with said step, a step c) of at least partially curing the one or more indicia (230) and the one or more areas of the coating layer (210) below said one or more indicia (230) with a LED curing unit (250) while maintaining the second magnetic-field generating device (B2) in the vicinity of the coating layer (210); subsequently to step c), a step d) exposing the coating layer (210) to a magnetic field of a third magnetic-field generating device (B3) so as to orient at least a part of the non-spherical magnetic or magnetizable pigment particles in the not yet cured areas of the coating layer (210); and, partially simultaneously with step d) (FIG. 2F) or subsequently to step d) (FIG. 2G), a step e) of at least partially curing the coating layer (×10) with a curing unit (260) at least emitting between 250 nm and 320 nm.

FIGS. 2H and 2I schematically illustrate methods for producing an optical effect layer (OEL) on a substrate (220) according to the present invention. The methods comprise a step of exposing the coating layer (210) to a magnetic field of a magnetic-field generating device (B1) so as to bi-axially orient at least a part of the non-spherical magnetic or magnetizable pigment particles; subsequently to said step, a step b) of applying a top coating composition on top of the coating layer (210), wherein said top coating composition is applied in the form of one or more indicia (230); subsequently to step b), a step of exposing the coating layer (210) to a magnetic field of a second magnetic-field generating device (B2) so as to orient at least a part of the non-spherical magnetic or magnetizable pigment particles; subsequently to said step, a step c) of at least partially curing the one or more indicia (×30) and the one or more areas of the coating layer (210) below said one or more indicia (230) with a LED curing unit (250); subsequently to step c), a step d) exposing the coating layer (210) to a magnetic field of a third magnetic-field generating device (B3) so as to orient at least a part of the non-spherical magnetic or magnetizable pigment particles in the not yet cured areas of the coating layer (210); and, partially simultaneously with step d) (FIG. 2H) or subsequently to step d) (FIG. 2I), a step e) of at least partially curing the coating layer (×10) with a curing unit (260) at least emitting between 250 nm and 320 nm.

FIG. 2J schematically illustrates a method for producing an optical effect layer (OEL) on a substrate (220) according to the present invention. The method comprises a step of exposing the coating layer (210) to a magnetic field of a magnetic-field generating device (B1) so as to bi-axially orient at least a part of the non-spherical magnetic or magnetizable pigment particles; subsequently to said step, a step of exposing the coating layer (210) to a magnetic field of a second magnetic-field generating device (B2) so as to orient at least a part of the non-spherical magnetic or magnetizable pigment particles; partially simultaneously with said step, a step b) of applying a top coating composition on top of the coating layer (210), wherein said top coating composition is applied in the form of one or more indicia (230) while maintaining the second magnetic-field generating device (B2) in the vicinity of the coating layer (210); subsequently to step b), a step c) of at least partially curing the one or more indicia (230) and the one or more areas of the coating layer (210) below said one or more indicia (230) with a LED curing unit (250) while maintaining the second magnetic-field generating device (B2) in the vicinity of the coating layer (210); subsequently to step c), a step d) of exposing the coating layer (210) to a magnetic field of a third magnetic-field generating device (B3) so as to orient at least a part of the non-spherical magnetic or magnetizable pigment particles in the not yet cured areas of the coating layer (210); and partially simultaneously with step d), a step e) of at least partially curing the coating layer (×10) with a curing unit (260) at least emitting between 250 nm and 320 nm while maintaining the third magnetic-field generating device (B3) in the vicinity of the coating layer (210).

DETAILED DESCRIPTION

Definitions

Figure 1:
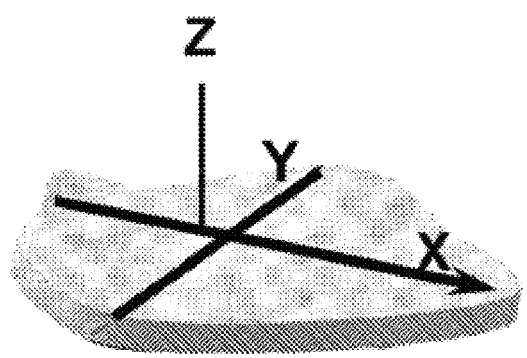
FIG. 2A1-2 schematically illustrates methods for producing an optical effect layer (OEL) on a substrate (220) according to the present invention. The methods comprises a step b) of applying a top coating composition at least partially on top of the coating layer (210), wherein said top coating composition is applied in the form of one or more indicia (230); subsequently to step b), a step c) at least partially curing the one or more indicia (230) and the one or more areas of the coating layer (210) below said one or more indicia (230) with a LED curing unit (250); subsequently to step c), a step d) exposing the coating layer (210) to a magnetic field of a magnetic-field generating device (B1) so as to mono-axially orient (2A1) or so as to bi-axially orient (2A2) at least a part of the non-spherical magnetic or magnetizable pigment particles in the not yet cured areas of the coating layer (210); and, partially simultaneously with to step d) (FIG. 2A1) or subsequently to step d) (FIG. 2A2), a step e) of at least partially curing the coating layer (210) with a curing unit (260) at least emitting between 250 nm and 320 nm.

The following definitions are to be used to interpret the meaning of the terms discussed in the description and recited in the claims.

As used herein, the term "at least one" is meant to define one or more than one, for example one or two or three.

As used herein, the terms "about" and "substantially" mean that the amount or value in question may be the specific value designated or some other value in its neighborhood. Generally, the terms "about" and "substantially" denoting a certain value is intended to denote a range within ±5% of the value. As one example, the phrase "about 100" denotes a range of 100-5, i.e. the range from 95 to 105. Generally, when the terms "about" and "substantially" are used, it can be expected that similar results or effects according to the invention can be obtained within a range of ±5% of the indicated value.

The terms "substantially parallel" refer to deviating not more than 100 from parallel alignment and the terms "substantially perpendicular" refer to deviating not more than 100 from perpendicular alignment.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

The term "comprising" as used herein is intended to be non-exclusive and open-ended. Thus, for instance a coating composition comprising a compound A may include other compounds besides A. However, the term "comprising" also covers, as a particular embodiment thereof, the more restrictive meanings of "consisting essentially of" and "consisting of", so that for instance "a fountain solution comprising A, B and optionally C" may also (essentially) consist of A and B, or (essentially) consist of A, B and C.

The term "optical effect layer (OEL)" as used herein denotes a coating layer that comprises oriented magnetic or magnetizable pigment particles, wherein said magnetic or magnetizable pigment particles are oriented by a magnetic field and wherein the oriented magnetic or magnetizable pigment particles are fixed/frozen in their orientation and position (i.e. after curing) so as to form a magnetically induced image.

The term "coating composition" refers to any composition which is capable of forming an optical effect layer (OEL) on a solid substrate and which can be applied preferably but not exclusively by a printing method. The coating composition comprises the non-spherical magnetic or magnetizable pigment particles described herein and the binder described herein. The term "top coating composition" refers to a composition which does not comprise the non-spherical magnetic or magnetizable pigment particles described herein.

As used herein, the term "wet" refers to a coating layer which is not yet cured, for example a coating in which the non-spherical magnetic or magnetizable pigment particles are still able to change their positions and orientations under the influence of external forces acting upon them.

The term "security document" refers to a document which is usually protected against counterfeit or fraud by at least one security feature. Examples of security documents include without limitation value documents and value commercial goods.

The term "security feature" is used to denote an image, pattern or graphic element that can be used for authentication purposes.

Where the present description refers to "preferred" embodiments/features, combinations of these "preferred" embodiments/features shall also be deemed as disclosed as long as this combination of "preferred" embodiments/features is technically meaningful.

The present invention provides methods for producing optical effect layers (OELs) exhibiting one or more indicia (x30) on substrates (x20), wherein said OELs are based on magnetically oriented non-spherical magnetic or magnetizable pigment particles and further exhibit one or more indicia (x30). Preferred examples of said processes are shown in FIG. 2A-2K.

The method described herein comprises the step a) of applying on the substrate (x20) surface described herein the radiation curable coating composition comprising the non-spherical magnetic or magnetizable pigment particles described herein and the one or more photo-reactive compounds not absorbing in a range from about 350 nm to about 470 nm described herein so as to form the coating layer (x10) described herein, said composition being in a first liquid state which allows its application as a layer and which is in a not yet cured (i.e. wet) state wherein the pigment particles can move and rotate within the layer. Since the radiation curable coating composition described herein is to be provided on the substrate (x20) surface, the radiation curable coating composition comprises at least a binder material and the magnetic or magnetizable pigment particles, wherein said composition is in a form that allows its processing on the desired printing or coating equipment. Preferably, said step a) is carried out by a printing process, preferably selected from the group consisting of screen printing, rotogravure printing, flexography printing, intaglio printing (also referred in the art as engraved copper plate printing, engraved steel die printing), pad printing and curtain coating, more preferably selected from the group consisting of intaglio printing, screen printing, rotogravure printing, pad printing and flexography printing and still more preferably screen printing, rotogravure printing, pad printing and flexography printing. According to a preferred embodiment, the step a) is carried out by a printing process selected from the group consisting of screen printing, rotogravure printing and flexography printing.

The non-spherical magnetic or magnetizable pigment particles described herein are preferably prolate or oblate ellipsoid-shaped, platelet-shaped or needle-shaped magnetic or magnetizable pigment particles or a mixture of two or more thereof and more preferably platelet-shaped particles.

Non-spherical magnetic or magnetizable pigment particles described herein are defined as having, due to their non-spherical shape, non-isotropic reflectivity with respect to an incident electromagnetic radiation for which the cured binder material is at least partially transparent. As used herein, the term "non-isotropic reflectivity" denotes that the proportion of incident radiation from a first angle that is reflected by a particle into a certain (viewing) direction (a second angle) is a function of the orientation of the particles, i.e. that a change of the orientation of the particle with respect to the first angle can lead to a different magnitude of the reflection to the viewing direction. Preferably, the non-spherical magnetic or magnetizable pigment particles described herein have a non-isotropic reflectivity with respect to incident electromagnetic radiation in some parts or in the complete wavelength range of from about 200 to about 2500 nm, more preferably from about 400 to about 700 nm, such that a change of the particle's orientation results in a change of reflection by that particle into a certain direction. As known by the man skilled in the art, the magnetic or magnetizable pigment particles described herein are different from conventional pigments, in that said conventional pigment particles exhibit the same color and reflectivity, independent of the particle orientation, whereas the magnetic or magnetizable pigment particles described herein exhibit either a reflection or a color, or both, that depend on the particle orientation.

The radiation curable coating composition described herein as well as the coating layer (x10) described herein comprise the non-spherical, preferably platelet-shaped, magnetic or magnetizable pigment particles described herein preferably in an amount from about 5 wt-% to about 40 wt-%, more preferably about 10 wt-% to about 30 wt-%, the weight percentages being based on the total weight of the radiation curable coating composition or the coating layer (x10).

In the OELs described herein, the magnetic or magnetizable pigment particles described herein are dispersed in the radiation curable coating composition comprising a cured binder material that fixes the orientation and position of the magnetic or magnetizable pigment particles. The binder material is at least in its cured or solid state (also referred to as second state herein), at least partially transparent to electromagnetic radiation of a range of wavelengths comprised between 200 nm and 2500 nm, i.e. within the wavelength range which is typically referred to as the "optical spectrum" and which comprises infrared, visible and UV portions of the electromagnetic spectrum. Accordingly, the particles contained in the binder material in its cured or solid state and their orientation-dependent reflectivity can be perceived through the binder material at some wavelengths within this range. Preferably, the cured binder material is at least partially transparent to electromagnetic radiation of a range of wavelengths comprised between 200 nm and 800 nm, more preferably comprised between 400 nm and 700 nm. Herein, the term "transparent" denotes that the transmission of electromagnetic radiation through a layer of 20 μm of the cured binder material as present in the OEL (not including the non-spherical magnetic or magnetizable pigment particles, but all other optional components of the OEL in case such components are present) is at least 50%, more preferably at least 60%, even more preferably at least 70%, at the wavelength(s) concerned. This can be determined for example by measuring the transmittance of a test piece of the cured binder material (not including the non-spherical magnetic or magnetizable pigment particles) in accordance with well-established test methods, e.g. DIN 5036-3 (1979-11). If the OEL serves as a covert security feature, then typically technical means will be necessary to detect the (complete) optical effect generated by the OEL under respective illuminating conditions comprising the selected non-visible wavelength; said detection requiring that the wavelength of incident radiation is selected outside the visible range, e.g. in the near UV-range.

Suitable examples of non-spherical, preferably platelet-shaped, magnetic or magnetizable pigment particles described herein include without limitation pigment particles comprising a magnetic metal selected from the group consisting of cobalt (Co), iron (Fe), and nickel (Ni); a magnetic alloy of iron, manganese, cobalt, nickel or a mixture of two or more thereof; a magnetic oxide of chromium, manganese, cobalt, iron, nickel or a mixture of two or more thereof; or a mixture of two or more thereof. The term "magnetic" in reference to the metals, alloys and oxides is directed to ferromagnetic or ferrimagnetic metals, alloys and oxides. Magnetic oxides of chromium, manganese, cobalt, iron, nickel or a mixture of two or more thereof may be pure or mixed oxides. Examples of magnetic oxides include without limitation iron oxides such as hematite ($Fe_2O_3$), magnetite ($Fe_3O_4$), chromium dioxide ($CrO_2$), magnetic ferrites ($MFe_2O_4$), magnetic spinels ($MR_2O_4$), magnetic hexaferrites ($MFe_{12}O_{19}$), magnetic orthoferrites ($RFeO_3$), magnetic garnets $M_3R_2(AO_4)_3$, wherein M stands for two-valent metal, R stands for three-valent metal, and A stands for four-valent metal.

Examples of non-spherical, preferably platelet-shaped, magnetic or magnetizable pigment particles described herein include without limitation pigment particles comprising a magnetic layer M made from one or more of a magnetic metal such as cobalt (Co), iron (Fe), or nickel (Ni); and a magnetic alloy of iron, cobalt or nickel, wherein said magnetic or magnetizable pigment particles may be multi-layered structures comprising one or more additional layers. Preferably, the one or more additional layers are layers A independently made from one or more selected from the group consisting of metal fluorides such as magnesium fluoride ($MgF_2$), silicon oxide (SiO), silicon dioxide ($SiO_2$), titanium oxide ($TiO_2$), and aluminum oxide ($Al_2O_3$), more preferably silicon dioxide ($SiO_2$); or layers B independently made from one or more selected from the group consisting of metals and metal alloys, preferably selected from the group consisting of reflective metals and reflective metal alloys, and more preferably selected from the group consisting of silver (Ag), aluminum (Al), chromium (Cr), and nickel (Ni), and still more preferably aluminum (Al); or a combination of one or more layers A such as those described hereabove and one or more layers B such as those described hereabove. Typical examples of the platelet-shaped magnetic or magnetizable pigment particles being multilayered structures described hereabove include without limitation A/M multilayer structures, A/M/A multilayer structures, A/M/B multilayer structures, A/B/M/A multilayer structures, A/B/M/B multilayer structures, A/B/M/B/A/multilayer structures, B/M multilayer structures, B/M/B multilayer structures, B/A/M/A multilayer structures, B/A/M/B multilayer structures, B/A/M/B/A/multilayer structures, wherein the layers A, the magnetic layers M and the layers B are chosen from those described hereabove.

The radiation curable coating composition described herein may comprise non-spherical, preferably platelet-shaped, optically variable magnetic or magnetizable pigment particles, and/or non-spherical, preferably platelet-shaped, magnetic or magnetizable pigment particles having no optically variable properties. Preferably, at least a part of the magnetic or magnetizable pigment particles described herein is constituted by non-spherical, preferably platelet-shaped, optically variable magnetic or magnetizable pigment particles. In addition to the overt security provided by the colorshifting property of the optically variable magnetic or magnetizable pigment particles, which allows easily detecting, recognizing and/or discriminating an article or security document carrying an ink, coating composition, or coating layer comprising the optically variable magnetic or magnetizable pigment particles described herein from their possible counterfeits using the unaided human senses, the optical properties of the optically variable magnetic or magnetizable pigment particles may also be used as a machine readable tool for the recognition of the OEL. Thus, the optical properties of the optically variable magnetic or magnetizable pigment particles may simultaneously be used as a covert or semi-covert security feature in an authentication process wherein the optical (e.g. spectral) properties of the pigment particles are analyzed and thus increase the counterfeiting resistance.

The use of non-spherical, preferably platelet-shaped, optically variable magnetic or magnetizable pigment particles in coating layers for producing an OEL enhances the significance of the OEL as a security feature in security document applications, because such materials are reserved to the security document printing industry and are not commercially available to the public.

As mentioned above, preferably at least a part of the non-spherical, preferably platelet-shaped, magnetic or magnetizable pigment particles is constituted by non-spherical, preferably platelet-shaped, optically variable magnetic or magnetizable pigment particles. These are more preferably selected from the group consisting of magnetic thin-film interference pigment particles, magnetic cholesteric liquid crystal pigment particles, interference coated pigment particles comprising a magnetic material and mixtures of two or more thereof.

Magnetic thin film interference pigment particles are known to those skilled in the art and are disclosed e.g. in U.S. Pat. No. 4,838,648; WO 2002/073250 A2; EP 0 686 675 B1; WO 2003/000801 A2; U.S. Pat. No. 6,838,166; WO 2007/131833 A1; EP 2 402 401 B1; WO 2019/103937 A1; WO 2020/006286 A1 and in the documents cited therein. Preferably, the magnetic thin film interference pigment particles comprise pigment particles having a five-layer Fabry-Perot multilayer structure and/or pigment particles having a six-layer Fabry-Perot multilayer structure and/or pigment particles having a seven-layer Fabry-Perot multilayer structure and/or pigments particles having a multilayer structure combining one or more multilayer Fabry-Perot structures.

Preferred five-layer Fabry-Perot multilayer structures consist of absorber/dielectric/reflector/dielectric/absorber multilayer structures wherein the reflector and/or the absorber is also a magnetic layer, preferably the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

Preferred six-layer Fabry-Perot multilayer structures consist of absorber/dielectric/reflector/magnetic/dielectric/absorber multilayer structures.

Preferred seven-layer Fabry Perot multilayer structures consist of absorber/dielectric/reflector/magnetic/reflector/dielectric/absorber multilayer structures such as disclosed in U.S. Pat. No. 4,838,648.

Preferred pigments particles having a multilayer structure combining one or more Fabry-Perot structures are those described in WO 2019/103937 A1 and consist of combinations of at least two Fabry-Perot structures, said two Fabry-Perot structures independently comprising a reflector layer, a dielectric layer and an absorber layer, wherein the reflector and/or the absorber layer can each independently comprise one or more magnetic materials and/or wherein a magnetic layer is sandwich between the two structures. WO 2020/006/286 A1 and EP 3 587 500 A1 disclose further preferred pigment particles having a multilayer structure.

Preferably, the reflector layers described herein are independently made from one or more selected from the group consisting of metals and metal alloys, preferably selected from the group consisting of reflective metals and reflective metal alloys, more preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminum (Al), chromium (Cr), nickel (Ni) and alloys thereof, and still more preferably aluminum (Al). Preferably, the dielectric layers are independently made from one or more selected from the group consisting of metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), and metal oxides such as silicon oxide (SiO), silicium dioxide ($SiO_2$), titanium oxide ($TiO_2$), aluminum oxide ($Al_2O_3$), more preferably selected from the group consisting of magnesium fluoride ($MgF_2$) and silicon dioxide ($SiO_2$) and still more preferably magnesium fluoride ($MgF_2$). Preferably, the absorber layers are independently made from one or more selected from the group consisting of aluminum (Al), silver (Ag), copper (Cu), palladium (Pd), platinum (Pt), titanium (Ti), vanadium (V), iron (Fe), tin (Sn), tungsten (W), molybdenum (Mo), rhodium (Rh), Niobium (Nb), chromium (Cr), nickel (Ni), metal oxides thereof, metal sulfides thereof, metal carbides thereof, and metal alloys thereof, more preferably selected from the group consisting of chromium (Cr), nickel (Ni), metal oxides thereof, and metal alloys thereof, and still more preferably selected from the group consisting of chromium (Cr), nickel (Ni), and metal alloys thereof. Preferably, the magnetic layer comprises nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co). When magnetic thin film interference pigment particles comprising a seven-layer Fabry-Perot structure are preferred, it is particularly preferred that the magnetic thin film interference pigment particles comprise a seven-layer Fabry-Perot absorber/dielectric/reflector/magnetic/reflector/dielectric/absorber multilayer structure consisting of a $Cr/MgF_2/Al/Ni/Al/MgF_2/Cr$ multilayer structure.

The magnetic thin film interference pigment particles described herein may be multilayer pigment particles being considered as safe for human health and the environment and being based for example on five-layer Fabry-Perot multilayer structures, six-layer Fabry-Perot multilayer structures, seven-layer Fabry-Perot multilayer structures and pigments particles having a multilayer structure combining one or more multilayer Fabry-Perot structures, wherein said pigment particles include one or more magnetic layers comprising a magnetic alloy having a substantially nickel-free composition including about 40 wt-% to about 90 wt-% iron, about 10 wt-% to about 50 wt-% chromium and about 0 wt-% to about 30 wt-% aluminum. Typical examples of multilayer pigment particles being considered as safe for human health and the environment can be found in EP 2 402 401 B1 whose content is hereby incorporated by reference in its entirety.

Suitable magnetic cholesteric liquid crystal pigment particles exhibiting optically variable characteristics include without limitation magnetic monolayered cholesteric liquid crystal pigment particles and magnetic multilayered cholesteric liquid crystal pigment particles. Such pigment particles are disclosed for example in WO 2006/063926 A1, U.S. Pat. Nos. 6,582,781 and 6,531,221. WO 2006/063926 A1 discloses monolayers and pigment particles obtained therefrom with high brilliance and colorshifting properties with additional particular properties such as magnetizability. The disclosed monolayers and pigment particles, which are obtained therefrom by comminuting said monolayers, include a three-dimensionally crosslinked cholesteric liquid crystal mixture and magnetic nanoparticles. U.S. Pat. Nos. 6,582,781 and 6,410,130 disclose platelet-shaped cholesteric multilayer pigment particles which comprise the sequence $A^1/B/A^2$, wherein $A^1$ and $A^2$ may be identical or different and each comprises at least one cholesteric layer, and B is an interlayer absorbing all or some of the light transmitted by the layers $A^1$ and $A^2$ and imparting magnetic properties to said interlayer. U.S. Pat. No. 6,531,221 discloses platelet-shaped cholesteric multilayer pigment particles which comprise the sequence A/B and optionally C, wherein A and C are absorbing layers comprising pigment particles imparting magnetic properties, and B is a cholesteric layer.

Suitable interference coated pigments comprising one or more magnetic materials include without limitation structures consisting of a substrate selected from the group consisting of a core coated with one or more layers, wherein at least one of the core or the one or more layers have magnetic properties. For example, suitable interference coated pigments comprise a core made of a magnetic material such as those described hereabove, said core being coated with one or more layers made of one or more metal oxides, or they have a structure consisting of a core made of synthetic or natural micas, layered silicates (e.g. talc, kaolin and sericite), glasses (e.g. borosilicates), silicon dioxides ($SiO_2$), aluminum oxides ($Al_2O_3$), titanium oxides ($TiO_2$), graphites and mixtures of two or more thereof. Furthermore, one or more additional layers such as coloring layers may be present.

The non-spherical, preferably platelet-shaped, magnetic or magnetizable pigment particles described herein preferably have a size d50 between about 2 m and about 50 m (as measured by direct optical granulometry).

The non-spherical, preferably platelet-shaped, magnetic or magnetizable pigment particles described herein may be surface treated so as to protect them against any deterioration that may occur in the coating composition and coating layer and/or to facilitate their incorporation in said coating composition and coating layer; typically corrosion inhibitor materials and/or wetting agents may be used.

As mentioned herein, the method described herein comprises the step c) and e) of at least partially curing the coating layer (×10) to a second state so as to fix the magnetic or magnetizable pigment particles in their adopted positions and orientations. The first liquid state of the radiation curable coating composition wherein the magnetic or magnetizable pigment particles can move and rotate and the second state wherein the magnetic or magnetizable pigment particles are fixed are provided by using a certain type of radiation curable coating composition. For example, the components of the radiation curable coating composition other than the non-spherical magnetic or magnetizable pigment particles may take the form of an ink or radiation curable coating composition such as those which are used in security applications, e.g. for banknote printing. The aforementioned first and second states are provided by using a material that shows an increase in viscosity in reaction to an exposure to an electromagnetic radiation. That is, when the fluid binder material is cured or solidified, said binder material converts into the second state, where the non-spherical magnetic or magnetizable pigment particles are fixed in their current positions and orientations and can no longer move nor rotate within the binder material. As used herein, by "at least partially curing the coating layer (×10)", it means that the non-spherical, preferably platelet-shaped, magnetic or magnetizable pigment particles are fixed/frozen in their adopted positions and orientations and cannot move and rotate anymore (also referred in the art as "pinning" of the particles).

The radiation curable coating composition used to produce the coating layer (×10) described herein comprises the non-spherical, preferably platelet-shaped, magnetic or magnetizable pigment particles described herein and the one or more compounds not absorbing in an range from about 350 nm to about 470 nm described herein. Radiation curing, in particular UV-Vis curing, advantageously leads to an instantaneous increase in viscosity of the coating composition after exposure to the irradiation, thus preventing any further movement of the pigment particles and in consequence any loss of information after the magnetic orientation step.

The radiation curable coating composition comprising the non-spherical, preferably platelet-shaped, magnetic or magnetizable pigment particles described herein and the one or more photo-reactive compounds not absorbing in an range from about 350 nm to about 470 nm described herein is a cationically curable composition. In other words, the radiation curable coating composition, preferably the UV-Vis curable coating composition, comprises monomers and/or oligomers being cationically curable compounds.

Cationically curable compositions comprises one or more cationically compounds which are cured by cationic mechanisms typically including the activation by radiation of one or more compounds which liberate cationic species, such as acids, which in turn initiate the curing so as to react and/or cross-link the monomers and/or oligomers to thereby harden the coating composition. Preferably, the one or more cationically curable compounds are selected from the group consisting of vinyl ethers, propenyl ethers, cyclic ethers such as epoxides, oxetanes, glycidyl ethers and tetrahydrofuranes, lactones, cyclic thioethers, vinyl thioethers, propenyl thioethers, hydroxyl-containing compounds and mixtures thereof, preferably cationically curable compounds selected from the group consisting of vinyl ethers, propenyl ethers, cyclic ethers such as epoxides, oxetanes and tetrahydrofuranes, lactones, and mixtures thereof.

Preferably, the radiation curable coating composition comprising the non-spherical, preferably platelet-shaped, magnetic or magnetizable pigment particles described herein comprises one or more cycloaliphatic epoxides which may be difunctional or polyfunctional and may optionally further comprise one or more components selected from the group consisting of vinyl ethers, oxetanes, polyhydroxy compounds and mixtures thereof.

Preferably, the one or more cycloaliphatic epoxides described herein independently comprise at least one cyclohexane group, and at least two epoxide groups. Preferred cycloaliphatic epoxides comprise more than one (i.e. at least two) cyclohexane groups and have the structural formula (I):

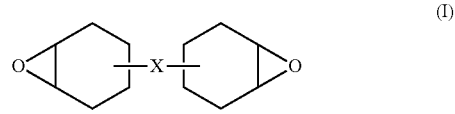

(I)

where —X— is represents a single bond or a divalent group comprising one or more atoms.

According to one embodiment, X is a divalent hydrocarbon group being a straight- or branched-chain alkylene group comprising from one to eighteen carbon atoms, wherein examples of said straight- or branched-chain alkylene group include without limitation methylene group, methylmethylene group, dimethylmethylene group, ethylene group, propylene group, and trimethylene group.

According to one embodiment, X is a divalent alicyclic hydrocarbon group or cycloalkydene group such as 1,2-cyclopentylene group, 1,3-cyclopentylene group, cyclopentylidene group, 1,2-cyclohexylene group, 1,3-cyclohexylene group, 1,4-cyclohexylene group, and cyclohexylidene group.

According to one embodiment, X is a divalent group comprising one or more oxygen-containing linkage groups being —CO—, —O—CO—O—, —COO— and —O—. According to one embodiment, preferred epoxy derivatives comprising more than one cyclohexane oxide groups and having the structural formula (I), wherein X is a divalent group comprising one or more oxygen-containing linkage groups being —CO—, —O—CO—O—, —COO—, —O—, have the structural formula (II), (III) or (IV):

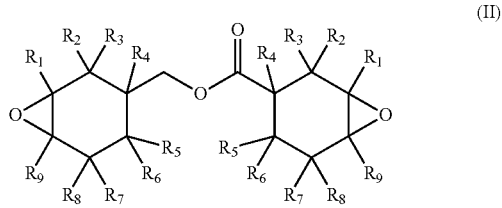

(II)

which corresponds to 3,4-epoxycyclohexylmethyl-3,4-epoxycyclohexane carboxylates wherein $R_1$-$R^9$ independently are hydrogen or linear or branched alkyl radicals containing from one to twelve carbon atoms and preferably containing from one to three carbon atoms (such as methyl, ethyl, n-propyl, i-propyl, n-butyl, i-butyl, s-butyl, t-butyl, hexyl, octyl, decyl and dodecyl), preferably cycloaliphatic epoxides having the structural formula (II) are 3,4-epoxycyclohexylmethyl-3,4-epoxycyclohexanecarboxylate, 3,4-epoxy-6-methyl-cyclohexylmethyl-3,4-epoxy-6-methylcyclohexanecarboxylate, 3,4-epoxy-2-methyl-cyclohexylmethyl-3,4-epoxy-2-methylcyclohexanecarboxylate, and 3,4-epoxy-4-methyl-cyclohexylmethyl-3,4-epoxy-4-methylcyclohexanecarboxylate;

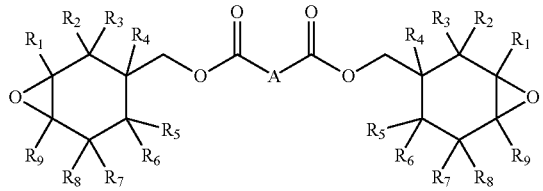
(III)

which corresponds to cycloaliphatic diepoxide esters of dicarboxylic acids, wherein $R_1$-$R^9$ independently are hydrogen or linear or branched alkyl radicals containing from one to twelve carbon atoms and preferably containing from one to three carbon atoms (such as methyl, ethyl, n-propyl, isopropyl, butyl, hexyl, octyl, and decyl) and A is a valence bond or a linear or branched divalent hydrocarbon radical generally containing from one to twelve carbon atoms and preferably containing from 3 to 8 carbon atoms, such as alkylene radicals (such as for example trimethylene, tetramethylene, hexamethylene and 2-ethylhexylene) and cycloaliphatic radicals (such as 1,4-cyclohexane, 1,3-cyclohexane and 1,2-cyclohexane); preferably cycloaliphatic diepoxide esters of dicarboxylic acids having the structural formula (III) are bis(3,4-epoxycyclohexylmethyl)adipate, bis(3,4-epoxy-6-methylcyclohexylmethyl)adipate, bis(3,4-epoxycyclohexylmethyl)oxalate, bis(3,4-epoxycyclohexylmethyl)pimelate, and bis(3,4-epoxycyclohexylmethyl) sebacate;

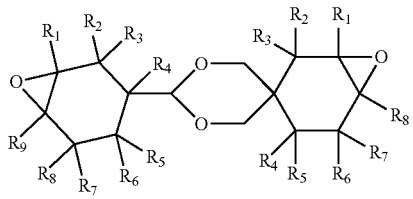
(IV)

wherein $R_1$-$R_9$ independently are hydrogen or linear or branched hydrocarbon radicals containing one to three carbon atoms; a preferred example of cycloaliphatic diepoxides having the structural formula (IV) is 2-(3,4-epoxycyclohexyl-5,5-spiro-3,4-epoxy)cyclohexane-meta-dioxane.

According to one embodiment, the one or more cycloaliphatic epoxides described herein have the structural formula (V) or (VI):

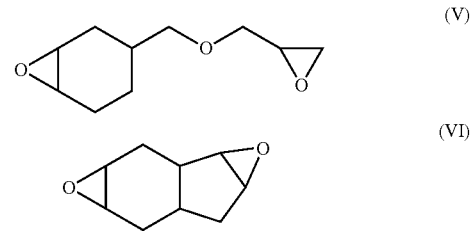

The one or more cycloaliphatic epoxides described herein may be hydroxy modified or (meth)acrylate modified. Examples are commercially available under the name Cyclomer A400 (CAS: 64630-63-3) and Cyclomer M100 (CAS: 82428-30-6) by Daicel Corp., or TTA 15 and TTA16 by TetraChem/Jiangsu.

For embodiments wherein the radiation curable coating composition comprises the one or more vinyl ethers described herein, said one or more vinyl ethers are preferably present in an amount less than about 25 wt-%, preferably in an amount larger than or equal to about 3 wt-% and less than or equal to about 20 wt-%, the weight percents being based on the total weight of the radiation curable coating composition. Vinyl ethers are known in the art to accelerate curing and reduce tackiness, thus limiting the risk of blocking and set-off when the printed sheets are put in stacks just after printing and curing. They also improve the physical and chemical resistance of the printed security element and enhance the flexibility of the printed and cured ink layer, which may be advantageous when the security ink of the invention is printed on plastic or polymer substrates. Vinyl ethers also help reducing the viscosity of the ink while strongly co-polymerizing with the ink vehicle.

Examples of preferred vinyl ethers include methyl vinyl ether, ethyl vinyl ether, n-propyl vinyl ether, n-butyl vinyl ether, iso-butyl vinyl ether, ethylhexyl vinyl ether, octadecyl vinyl ether, dodecyl vinyl ether, isopropyl vinyl ether, tert-butyl vinyl ether, tert-amyl vinyl ether, cyclohexyl vinyl ether, cyclohexanedimethanol monovinyl ether, cyclohexanedimethanol divinyl ether, 4-(vinyloxy methyl)cyclohexylmethyl benzoate, phenyl vinyl ether, methylphenyl vinyl ether, methoxyphenyl vinyl ether, 2-chloroethyl vinyl ether, 2-hydroxyethyl vinyl ether, 4-hydroxybutyl vinyl ether, 1,6-hexanediol monovinyl ether, ethylene glycol divinyl ether, ethylene glycol monovinyl ether, 1, 4-butanediol divinyl ether, 1,6-hexanediol divinyl ether, 4-(vinyloxy) butyl benzoate, bis[4-(vinyl oxy)butyl]adipate, bis[4-(vinyloxy)butyl]succinate, bis[4-(vinyloxymethyl)cyclohexylmethyl]glutarate, 4-(vinyloxy)butyl stearate, trimethylolpropane trivinyl ether, propenyl ether of propylene carbonate, diethylene glycol monovinyl ether, diethylene glycol divinyl ether, ethylene glycol butylvinyl ether, dipropylene glycol divinyl ether, triethylene glycol divinyl ether, triethylene glycol methyl vinyl ether, triethylene glycol monobutyl vinyl ether, tetraethylene glycol divinyl ether, poly(tetrahydrofuran) divinyl ether, polyethyleneglycol-520 methyl vinyl ether, pluriol-E200 divinyl ether, tris[4-(vinyloxy)butyl]trimellitate, 1,4-bis(2-vinyloxyethoxy)benzene, 2,2-bis(4-vinyloxyethoxyphenyl)propane, bis[4-(vinyloxy)methyl]cyclohexyl]methyl] terephthalate, bis[4-(vinyloxy)methyl]cyclohexyl]methyl] isophthalate. Suitable vinyl ethers are commercially sold by BASF under the designation EVE, IBVE, DDVE, ODVE, BDDVE, DVE-2, DVE-3, CHVE, CHDM-di, HBVE. The one or more vinyl ethers described herein may be hydroxy modified or (meth)acrylate modified (for example: VEEA®, 2-(2-vinyloxyethoxy)ethyl acrylate from Nippon Shokubai (CAS: 86273-46-3)).

For embodiments wherein the radiation curable coating composition comprises the one or more oxetanes described herein, said one or more oxetanes are preferably present in an amount less than or equal to about 20 wt-%, preferably larger than or equal to about 3 wt-% and less than or equal to about 15 wt-%, the weight percents being based on the total weight of the radiation curable coating composition.

Oxetanes are known in the art to accelerate curing and reduce tackiness, thus limiting the risk of blocking and set-off when the printed sheets are put in stacks just after printing and curing. They also help reducing the viscosity of the ink while strongly co-polymerizing with the composition. Preferred examples of oxetanes include trimethylene oxide, 3,3-dimethyloxetane, trimethylolpropane oxetane, 3-ethyl-3-hydroxymethyl oxetane, 3-ethyl-3-[(2-ethylhexyloxy) methyl]oxetane, 3,3-dicyclomethyl oxetane, 3-ethyl-3-phenoxymethyl oxetane, bis ([1-ethyl(3-oxetanyl)]methyl) ether, 1,4-bis [3-ethyl-3-oxetanyl methoxy)methyl] benzene, 3,3-dimethyl-2(p-methoxy-phenyl)-oxetane, 3-ethyl-[(tri-ethoxysilyl propoxy)methyl]oxetane, 4,4-Bis (3-ethyl-3-oxetanyl)methoxymethyl]biphenyl and 3,3-dimethyl-2(p-methoxy-phenyl) oxetane. The one or more oxetanes described herein may be hydroxy modified or (meth) acrylate modified (for example: Uvi-Cure S170 CAS from Lambson (CAS: 37674-57-0)).

For embodiments wherein the radiation curable coating composition comprises the one or more polyhydroxy compounds described herein, said one or more polyhydroxy compounds are preferably present in an amount less than or equal to about 15 wt-%, more preferably in an amount between about 1 wt-% and about 10 wt-%, the weight percents being based on the total weight of radiation curable coating composition.

Polyhydroxy compounds are known in the art to improve adhesion to substrates known to exhibit poor adhesion properties, such as plastic or polymer substrates that become increasingly popular in the field of security documents, in particular banknotes.

The one or more polyhydroxy compounds described herein preferably comprise more than two hydroxyl groups and may be linear, branched or hyperbranched (also referred in the art as dendritic). Preferably, the one or more polyhydroxy compounds described herein are trifunctional, tetrafunctional compounds, hexafunctional compounds or multifunctional compounds.

The one or more polyhydroxy compounds described herein are preferably selected from the group consisting of polyhydroxy derivatives of aliphatic or aromatic polyethers, polyhydroxy derivatives of polyesters, polyhydroxy derivatives of polycarbonates, glycerol, trimethylolpropane, di-trimethylolpropane, pentaerytritol, dipentaerytritol and mixtures thereof.

The one or more polyhydroxy compounds described herein may be at least partially alkoxylated. The one or more polyhydroxy compounds described herein may therefore have alkoxylated units, preferably ethoxylated and/or propoxylated units.

According to a preferred embodiment, the one or more polyhydroxy compounds described herein are selected from the group consisting of trifunctional compounds, preferably glycerols and trimethylolpropanes, tetrafunctional compounds, preferably di-trimethylolpropanes and pentaerytritols, hexafunctional compounds, preferably dipentaerytritols, and mixtures thereof, wherein said compounds, preferably said trimethylolpropanes, pentaerytritols and dipentaerytritols, may be alkoxylated (ethoxylated and/or propoxylated).

For embodiments wherein the radiation curable coating composition comprises the one or more glycidyl ether compounds described herein, said one or more glycidyl ether are preferably present in an amount between about 1 wt-% and about 5 wt-%, the weight percents being based on the total weight of radiation curable coating composition, or between 1 wt-% and 25 wt-% based on the total weight of the top coating composition The use of epoxides in the UV-Vis radiation curable ink aids in accelerating curing and reducing tackiness, as well as in reducing the viscosity of the ink while strongly co-polymerizing with the ink vehicle. Preferred examples of an epoxide other than a cycloaliphaticepoxide as described herein include, but are not limited to, cyclohexane dimethanol diglycidylether, poly(ethyleneglycol) diglycidyl ether, poly(propyleneglycol) diglycidyl ether, butanediol diglycidyl ether, hexanediol diglycidyl ether, bisphenol-A diglycidyl ether, neopentylglycol diglycidylether, trimethylolpropane triglycidyl ether, glycerol triglycidyl ether, pentaerythritol tetraglycidyl ether, butyl glycidyl ether, p-tert-butyl phenyl glycidyl ether, hexadecyl glycidyl ether, 2-ethyl-hexyl glycidyl ether, octyl glycidyl ether, decyl glycidyl ether, dodecyl glycidyl ether, tetradecyl glycidyl ether, C12/C14-alkyl glycidyl ether, C13/C15-alkyl glycidyl ether and mixtures thereof. Suitable epoxides other than a cycloaliphatic epoxide are commercially sold by EMS Griltech under the trademark Grilonit® (e.g. Grilonit® V51-63 or RV 1806).

The radiation curable coating composition comprising the non-spherical, preferably platelet-shaped, magnetic or magnetizable pigment particles described herein may further comprise one or more coloring components selected from the group consisting of organic pigment particles, inorganic pigment particles, and organic dyes, and/or one or more additives. The latter include without limitation compounds and materials that are used for adjusting physical, rheological and chemical parameters of the coating composition such as the viscosity (e.g. solvents, thickeners and surfactants), the consistency (e.g. anti-settling agents, fillers and plasticizers), the foaming properties (e.g. antifoaming agents), the lubricating properties (waxes, oils), UV stability (photostabilizers), the adhesion properties, the antistatic properties, the storage stability (polymerization inhibitors) etc. Additives described herein may be present in the coating composition in amounts and in forms known in the art, including so-called nano-materials where at least one of the dimensions of the additive is in the range of 1 to 1000 nm.

The radiation curable coating composition comprising the non-spherical, preferably platelet-shaped, magnetic or magnetizable pigment particles described herein may further comprise one or more marker substances or taggants and/or one or more machine readable materials selected from the group consisting of magnetic materials (different from the magnetic or magnetizable pigment particles described herein), luminescent materials, electroluminescent materials, upconverting materials, electrically conductive materials and infrared-absorbing materials. As used herein, the term "machine readable material" refers to a material which exhibits at least one distinctive property which is detectable by a device or a machine, and which can be comprised in a coating so as to confer a way to authenticate said coating or article comprising said coating by the use of a particular equipment for its detection and/or authentication.

The radiation curable coating compositions described herein may be prepared by dispersing or mixing the magnetic or magnetizable pigment particles described herein and the one or more additives when present in the presence of the binder material described herein thus forming liquid compositions. When present, the one or more photoinitiators may be added to the composition either during the dispersing or mixing step of all other ingredients or may be added at a later stage, i.e. after the formation of the liquid coating composition.

The method described herein further comprises, subsequently to the step a) described herein, the step b) of applying the top coating composition described herein at least partially on top of the coating layer (×10) described herein. The top coating composition described herein is applied in the form of the one or more indicia (×30) described herein and partially overlaps (i.e. overlaps in at least one area) the coating layer (×10) described herein, wherein the radiation curable coating composition of the coating layer (×10) is still in a wet and unpolymerized state and the magnetic or magnetizable pigment particles are freely movable and rotatable.

As used herein, the term "indicia" shall mean continuous and discontinuous layers consisting of distinguishing markings or signs or patterns. Preferably, the one or more indicia (×30) described herein are selected from the group consisting of codes, symbols, alphanumeric symbols, motifs, geometric patterns (e.g. circles, triangles and regular or irregular polygons), letters, words, numbers, logos, drawings, portraits and combinations thereof. Examples of codes include encoded marks such as an encoded alphanumeric data, a one-dimensional barcode, a two-dimensional barcode, a QR-code, datamatrix and IR-reading codes. The one or more indicia (×30) described herein may be solids indicia and/or raster indicia.

The top coating composition described herein is applied in the form of the one or more indicia described herein (×30) by an application process preferably a contactless fluid microdispensing process, preferably selected from the group consisting of spray coating, aerosol jet printing, electrohydrodynamic printing, slot die coating and inkjet printing, more preferably by an inkjet printing process, wherein said contactless fluid microdispensing printing processes are variable information printing methods allowing for the unique production of the one or more indicia (×30) on or in the optical effect layers (OELs) described herein. The application process is chosen as a function of the design and resolution of the one or more indicia to be produced.

Inkjet printing might be advantageously used for producing optical effect layers (OELs) exhibiting the one or more indicia described herein comprising variable halftones. Inkjet halftone printing is a reprographic technique that simulates continuous-tone imagery, comprising an infinite number of colors or greys, by the application of variable inkjet deposits or grammages.

Spray coating is a technique involving forcing the composition through a nozzle whereby a fine aerosol is formed. A carrier gas and electrostatic charging may be involved to aid in directing the aerosol at the surface that is to be printed. Spray printing allows to print spots and lines. Suitable compositions for spray printing typically have a viscosity between about 10 mPa·s and about 1 Pa·s (25° C., 1000 s$^{-1}$). Resolution of spray coating printing lies in the millimeter range. Spray printing is described for example in F. C. Krebs, Solar Energy Materials & Solar Cells (2009), 93, page 407.

Aerosol jet printing (AJP) is an emerging contactless direct write approach aimed at the production of fine features on a wide range of substrates. AJP is compatible with a wide material range and freeform deposition, allows high resolution (in the order of about 10 micrometers) coupled with a relatively large stand-off distance (e.g. 1-5 mm), in addition to the independence of orientation. The technology involves aerosol generation using either ultrasonic or pneumatic atomizer to generate an aerosol from compositions typically having a viscosity between about 1 mPa·s and about 1 Pa·s (25° C., 1000 s$^{-1}$). Aerosol jet printing is described for example in N. J. Wilkinson et al., The International Journal of Advanced Manufacturing Technology (2019) 105:4599-4619.

Electrohydrodynamic inkjet printing is a high resolution inkjet printing technology. Electrohydrodynamic inkjet printing technology makes use of externally applied electric fields to manipulate droplets sizes, ejection frequencies and placement on the substrate to get higher resolution than convention inkjet printing, while keeping a high production speed. The resolution of electrohydrodynamic inkjet printing is about two orders of magnitude higher than conventional inkjet printing technology; thus, it can be used for the orienting of nano- and micro-scale patterns. Electrohydrodynamic inkjet printing may be used both in DOD or in continuous mode. Compositions for electrohydrodynamic inkjet printing typically have a viscosity between about 1 mPa·s and about 1 Pa·s (25° C., 1000 s$^{-1}$). Electrohydrodynamic inkjet printing technology is described for example P. V. Raje and N. C. Murmu, International Journal of Emerging Technology and Advanced Engineering, (2014), 4(5), pages 174-183.

Slot die-coating is a 1-dimensional coating technique. Slot-die coating allows for the coating of stripes of material which is well suited for making a multilayer coating with stripes of different materials layered on top of each other. The alignment of the pattern is produced by the coating head being translated along the direction perpendicular to the direction of the web movement. A slot die-coating head comprises a mask that defines the slots of the coating head through which the slot-die coating ink is dispersed. An example of a slot-die coating head is illustrated in F. C. Krebs, Solar Energy Materials & Solar Cells (2009), 93, page 405-406. Suitable compositions for slot die-coating typically have a viscosity between about 1 mPa·s and about 20 mPa·s (25° C., 1000 s$^{-1}$).

According to one embodiment, the top coating composition described herein is printed in the form of the one or more indicia (×30) described herein by an inkjet printing process, preferably a continuous inkjet (CI) printing process or a drop-on-demand (DOD) inkjet printing process, more preferably a drop-on-demand (DOD) inkjet printing process. Drop-on-demand (DOD) printing is a non-contact printing process, wherein the droplets are only produced when required for printing, and generally by an ejection mechanism rather than by destabilizing a jet. Depending on the mechanism used in the printhead to produce droplets, the DOD printing is divided in piezo impulse, thermal jet, valve jet (viscosity between about 1 mPa·s and about 1 Pa·s (25° C., 1000 s$^{-1}$)) and electrostatic process.

According to one embodiment, the top coating composition described herein comprises one or more monomers and/or oligomers being cationically curable compounds such as those described herein for the radiation curable coating composition comprising the magnetic or magnetizable pigment particles described herein, in particular selected from the group consisting of vinyl ethers, propenyl ethers, cyclic ethers such as epoxides, oxetanes, and tetrahydrofuranes, and mixtures thereof, and one or more solvents. For embodiments wherein the top coating composition is applied by an inkjet printing process, said top coating composition may further comprises conventional additives and ingredients such as for example wetting agents, antifoams, surfactants, (co-)solvents and mixtures thereof that are used in the field of radiation curable inkjet.

The top coating composition described herein may further comprise the one or more marker substances or taggants and/or the one or more machine readable materials such as those described for the radiation curable coating composition comprising the non-spherical magnetic or magnetizable pigment particles described herein, provided that the size of said substances, taggants, or machine readable materials is suitable for the application process described herein.

The methods for producing of the optical effect layers (OELs) exhibiting the one or more indicia (×30) thereof comprising the step of at least partially curing the one or more indicia (×30) and the one or more areas of the coating layer (×10) below said one or more indicia (×30) with the LED curing unit (×50) and the step of at least partially curing the coating layer (×10) with a curing unit (×60) at least emitting between 250 nm and 320 nm require specific combinations to allow the selective curing of the one or more indicia (×30) and coating layer (×10) at different stages of the method. Therefore, the one or more photo-reactive compounds not absorbing in the range from about 350 nm to about 470 nm of the radiation curable coating composition of step a) and the one or more compounds absorbing in the range from about 350 nm to about 470 nm of the top curable coating composition of step b) are selected according to one of the combinations described in the following embodiments.

According to a $1^{st}$ embodiment, the one or more photo-reactive compounds not absorbing in the range from about 350 nm to about 470 nm of the radiation curable coating composition of step a) are iodonium salts having a cationic moiety and an anionic moiety. Preferably, said one or more compounds of the radiation curable coating composition of step a) are iodonium salts, wherein the anionic moiety is preferably $SbF_6^-$ (hexafluoroantimonate, CAS Nr 17111-95-4); $PF_6^-$ (hexafluorophosphate, CAS Nr 16919-18-9); $AsF_6^-$ (hexafluoroarsenate, CAS Nr 16973-45-8); $F_4B^-$ (tetrafluoroborate, CAS Nr 14874-70-5); $(C_6F_5)_4B^-$ (tetrakis(pentafluorophenyl)borate, CAS Nr 47855-94-7); $(CF_3SO_2)_3C^-$ (tris(trifluoromethylsulfonyl)methide, CAS Nr 130447-45-9); $(CF_3)SO_3^-$ (trifluoromethanesulfonate, CAS Nr 37181-39-8); $(CH_3C_6H_4)SO_3^-$ (4-methylbenzenesulfonate, CAS Nr 16722-51-3); $(CF_3)CO_2^-$ (trifluoroacetate, CAS Nr 14477-72-6); $(C_4F_9)SO_3^-$ (1,1,2,2,3,3,4,4,4-nonafluoro-1-butanesulfonate, CAS Nr 45187-15-3); $(C_4F_9)CO_2^-$ (2,2,3,3,4,4,5,5,5-nonafluoro-1-pentanoate, CAS Nr 45167-47-3); preferably $SbF_6^-$, $PFs$ or $(C_6F_5)_4B^-$, and wherein the cationic moiety is preferably bis(4-dodecylphenyl)iodonium (CAS Nr 71786-69-1); bis[4-(1,1-dimethylethyl)phenyl]iodonium (CAS Nr 61267-44-5); (4-isopropylphenyl)(4-methylphenyl)iodonium (CAS Nr 178233-71-1); bis(4-methylphenyl)iodonium (CAS Nr 46449-56-3); (4-methylphenyl)[4-(2-methylpropyl)phenyl]iodonium (CAS Nr 344562-79-4); bis(2,4-dimethylphenyl)]iodonium (CAS Nr 78337-07-2); bis(3,4-dimethylphenyl)]iodonium (CAS Nr 66482-57-3); (4-methylphenyl)(2,4,6-trimethylphenyl)iodonium (CAS Nr 758629-51-5); bis[(4-(2-methylpropyl)phenyl]iodonium (CAS Nr 157552-66-4); bis(4-butylphenyl]iodonium (CAS Nr 76310-29-7); bis(2,4,6-trimethylphenyl)iodonium (CAS Nr 94564-97-3); bis(4-hexylylphenyl]iodonium (CAS Nr 249300-48-9); bis(4-decylphenyl)iodonium (CAS Nr 137141-44-7); (4-decylphenyl)(4-undecylphenyl)iodonium (CAS Nr 167997-83-3); bis(4-undecylphenyl)iodonium (CAS Nr 167997-61-7); bis(4-tridecylphenyl)iodonium (CAS Nr 124053-08-3); bis(4-tetradecylphenyl)iodonium (CAS Nr 167997-63-9); bis(4-hexadecylphenyl)iodonium (CAS Nr 137141-41-4); bis(4-heptadecylphenyl)iodonium (CAS Nr 144095-91-0); bis(4-octadecylphenyl)iodonium (CAS Nr202068-75-5); (4-decylphenyl)(4-dodecylphenyl)iodonium (CAS Nr 167997-67-3); (4-decylphenyl)(4-tridecylphenyl)iodonium (CAS Nr 167997-77-5); (4-decylphenyl)(4-tetradecylphenyl)iodonium (CAS Nr 167997-81-1); (4-dodecylphenyl)(4-undecylphenyl)iodonium (CAS Nr 167997-71-9); (4-dodecylphenyl)(4-tridecylphenyl)iodonium (CAS Nr 167997-69-5); (4-dodecylphenyl)(4-tetradecylphenyl)iodonium (CAS Nr 167997-65-1); (4-tridecylphenyl)(4-undecylphenyl)iodonium (CAS Nr 167997-73-1); (4-tetradecylphenyl)(4-undecylphenyl)iodonium (CAS Nr 167997-79-7); (4-tetradecylphenyl)(4-tridecylphenyl)iodonium (CAS Nr 167997-75-3); p-(octyloxyphenyl)phenyliodonium (CAS Nr 121239-74-5); [4-[(2-hydroxytetradecyl)oxy]phenyl]phenyliodonium (CAS Nr 139301-14-7); phenyl[3-(trifluoromethyl)phenyl]iodonium (CAS Nr 789443-26-1); bis(4-fluorophenyl)iodonium (CAS Nr 91290-88-9); (4-nitrophenyl) phenyliodonium (CAS Nr 46734-23-0); (4-nitrophenyl)(2,4,6-trimethylphenyl)iodonium (CAS Nr 1146127-10-7); more preferably bis(4-dodecylphenyl)iodonium (CAS Nr 71786-69-1); bis[4-(1,1-dimethylethyl)phenyl]iodonium (CAS Nr 61267-44-5); (4-isopropylphenyl)(4-methylphenyl)iodonium (CAS Nr 178233-71-1); bis(4-methylphenyl) iodonium (CAS Nr 46449-56-3); or (4-methylphenyl)[4-(2-methylpropyl)phenyl]iodonium (CAS Nr 344562-79-4). Preferably, the one or more compounds of the radiation curable coating composition of step a) are iodonium salts selected from the group consisting of bis(4-dodecylphenyl) iodonium hexafluoroantimonate (CAS Nr 71786-70-4); bis [4-(1,1-dimethylethyl)phenyl]iodonium hexafluorophosphate (CAS Nr 61358-25-6); (4-isopropylphenyl)(4-methylphenyl)iodonium tetrakis(pentafluorophenyl)borate (CAS Nr 178233-72-2); bis(4-methylphenyl)iodonium hexafluorophosphate (CAS Nr 60565-88-0); (4-methylphenyl)[4-(2-methylpropyl)phenyl]iodonium hexafluorophosphate (CAS Nr 344562-80-7) and mixtures thereof; more preferably selected from the group consisting of bis(4-dodecylphenyl)iodonium hexafluoroantimonate (CAS Nr 71786-70-4); bis(4-methylphenyl)iodonium hexafluorophosphate (CAS Nr 60565-88-0); and mixtures thereof. Particularly suitable examples of iodonium salts for the $1^{st}$ embodiment of the present invention are commercially available under the name SpeedCure 937 (CAS Nr 71786-70-4), SpeedCure 938 (CAS Nr 61358-25-6), SpeedCure 939 (CAS Nr 178233-72-2) from Lambson, OMNICAT 250 (CAS Nr 344562-80-7) and OMNICAT 440 (CAS Nr 60565-88-0) from IGM Resins and DEUTERON UV1240 (CAS Nr 71786-70-4) and DEUTERON UV1242 (CAS Nr 71786-70-4) from DEUTERON.

According to said $1^{st}$ embodiment, the one or more compounds absorbing in the range from about 350 nm to about 470 nm of the top curable coating composition of step b) are thioxanthone compounds being preferably selected from the group consisting of 2-isopropyl-9H-thioxanthen-9-one (CAS Nr 5495-84-1); 4-(1-methylethyl)-9H-thioxanthen-9-one (CAS Nr 83846-86-0); 2,4-diethyl-9H-thioxanthen-9-one (CAS Nr 82799-44-8); 2-chloro-9H-thioxanthen-9-one (CAS Nr 86-39-5); 1-chloro-4-propoxy- 9H-thioxanthen-9-one (CAS Nr 142770-42-1); 1,3-di[[α-[1-chloro-9-oxo-9H-thioxanthen-4-yl)oxy]acetylpoly[oxy(1-methylethylene)]]oxy]-2,2-bis[[α-[1-cloro-9-oxo-9H-thioxanthen-4-yl)oxy]acetylpoly[oxy(1-methylethylene)]] oxymethylpropane (CAS Nr 1003567-83-6); α-[2-[(9-oxo-9H-thioxanthenyl)oxy]acetyl]-ω-[[2-[(9-oxo-9H-thioxanthenyl)oxy]acetyl]oxy]-poly(oxy-1,4-butanediyl (CAS Nr 813452-37-8); 2-[2-[1-[2-[[2-(9-oxothioxanthen-2-yl)oxyacetyl]amino]-3-[1-[2-(2-prop-2-enoyloxyethoxy)ethoxy]ethoxy]-2-[1-[2-(2-prop-2-enoyloxyethoxy)ethoxy] ethoxymethyl]propoxy]ethoxy]ethoxy]ethyl prop-2-enoate (CAS Nr 1427388-03-1); α-[2-[(9-Oxo-9H-thioxanthenyl) oxy]acetyl]-ω-[[2-[(9-oxo-9H-thioxanthenyl)oxy]acetyl] oxy]-poly(oxy-1,4-butanediyl) (CAS Nr 813452-37-8); oligomeric and polymeric compounds thereof (CAS Nr 515139-51-2 and 2055335-46-9); and mixtures thereof; preferably selected from the group consisting of 2-isopropyl-9H-thioxanthen-9-one (CAS Nr 5495-84-1); 4-(1-methylethyl)-9H-thioxanthen-9-one (CAS Nr 83846-86-0); 1-chloro-4-propoxy-9H-thioxanthen-9-one (CAS Nr 142770-42-1); 1,3-di[[α-[1-chloro-9-oxo-9H-thioxanthen-4-yl)oxy]acetylpoly[oxy(1-methylethylene)]]oxy]-2,2-bis [[α-[1-chloro-9-oxo-9H-thioxanthen-4-yl)oxy]acetylpoly [oxy(1-methylethylene)]]oxymethylpropane (CAS Nr 1003567-83-6); oligomeric and polymeric compounds thereof (CAS Nr 2055335-46-9); and mixtures thereof. Particularly suitable examples of thioxanthone compounds for the 1st embodiment of present invention are commercially available under the name SpeedCure 2-ITX (CAS Nr 5495-84-1), 2-chloro-thioxanthone (CAS Nr 86-39-5), SpeedCure CPTX (CAS Nr 142770-42-1) and SpeedCure 7010/7010L (CAS Nr 1003567-83-6) from Lambson, Omnirad ITX (CAS Nr 5495-84-1 and 83846-86-0), Omnirad DETX (CAS Nr 82799-44-8), Omnipol TX (CAS Nr 813452-37-8), Omnipol 3 TX (CAS Nr 1427388-03-1) from IGM Resins and Genopol® TX-1 (CAS Nr515139-51-2), Genopol® TX-2 (CAS Nr2055335-46-9) from Rahn.

According to a 2nd embodiment, the one or more photoreactive compounds not absorbing in the range from about 350 nm to about 470 nm of the radiation curable coating composition of step a) are iodonium salts and are those described hereabove for the 1st embodiment.

According to said 2nd embodiment, the one or more compounds absorbing in the range from about 350 nm to about 470 nm of the top curable coating composition of step b) are anthracene compounds preferably selected from the group consisting of 9,10-diethoxy-anthracene (CAS Nr 68818-86-0); 9,10-dibutoxy-anthracene (CAS Nr 76275-14-4) and mixtures thereof, preferably 9,10-dibutoxy-anthracene (CAS Nr 76275-14-4). Particularly suitable examples of anthracene compounds for the 2nd embodiment of the present invention are commercially available under the name ANTHRACURE® UVS1101 (CAS Nr 68818-86-0), ANTHRACURE® UVS 1331 (CAS Nr 76275-14-4) from Kawasaki Kasei Chemicals Ltd.

According to a 3rd embodiment, the one or more photoreactive compounds not absorbing in the range from about 350 nm to about 470 nm of the radiation curable coating composition of step a) are iodonium salts and are those described hereabove for the 1st embodiment.

According to said 3rd embodiment, the one or more compounds absorbing in the range from about 350 nm to about 470 nm of the top curable coating composition of step b) are coumarin compounds, preferably 3-(4-dodecylbenzoyl)-5,7-dimethoxy-2H-1-benzopyran-2-one (CAS Nr 2170153-43-0), 3-(4-$C_{10}$-$C_{13}$-benzoyl)-5,7-dimethoxy-2H-1-benzopyran-2-one (CAS Nr 2243703-91-3). A particularly suitable example of coumarin compounds for the 3rd embodiment of the present invention is commercially available under the name ESACURE 3644 (CAS Nr 2243703-91-3) from IGM Resins.

According to a 4th embodiment, the one or more photoreactive compounds not absorbing in the range from about 350 nm to about 470 nm of the radiation curable coating composition of step a) are iodonium salts and are those described hereabove for the 1st embodiment.

According to said 4th embodiment, the one or more compounds absorbing in the range from about 350 nm to about 470 nm of the top curable coating composition of step b) are naphthalene compounds, preferably 9,10-diethoxy-naphthalene (CAS Nr 27294-37-7) and the top curable coating composition of step b) further comprises one or more anthracene compounds, preferably selected from the group consisting of 9,10-diethoxy-anthracene (CAS Nr68818-86-0); 9,10-dibutoxy-anthracene (CAS Nr 76275-14-4) and mixtures thereof, preferably 9,10-dibutoxy-anthracene (CAS Nr 76275-14-4). A particularly suitable example of naphthalene compounds for the 4th embodiment of the present invention is commercially available under the name ANTHRACURE® ET 2201 (CAS Nr 27294-37-7) from Kawasaki Kasei Chemicals Ltd. A particularly suitable examples of anthracene compounds for the 4th embodiment of the present invention is commercially available under the name ANTHRACURE® UVS 1331 (CAS Nr 76275-14-4) from Kawasaki Kasei Chemicals Ltd.

According to a 5th embodiment, the one or more photoreactive compounds not absorbing in the range from about 350 nm to about 470 nm of the radiation curable coating composition of step a) are sulfonium salts having a cationic moiety and an anionic moiety. Preferably, said one or more compounds of the radiation curable coating composition of step a) are sulfonium salts, wherein the anionic moiety is preferably $SbF_6^-$ (hexafluoroantimonate, CAS Nr 17111-95-4); $PF_6^-$ (hexafluorophosphate, CAS Nr 16919-18-9); AsFs (hexafluoroarsenate, CAS Nr 16973-45-8); $F_4B^-$ (tetrafluoroborate, CAS Nr 14874-70-5); $(C_6F_5)_4B^-$ (tetrakis(pentafluorophenyl)borate, CAS Nr 47855-94-7); $(CF_3SO_2)_3C^-$ (tris(trifluoromethylsulfonyl)methide, CAS Nr 130447-45-9); $(CF_3)SO_3^-$ (trifluoromethanesulfonate, CAS Nr 37181-39-8); $(CH_3CeH_4)SO_3^-$ (4-methylbenzenesulfonate, CAS Nr 16722-51-3); $(CF_3)CO_2^-$ (trifluoroacetate, CAS Nr 14477-72-6); $(C_4F_9)SO_3^-$ (1,1,2,2,3,3,4,4,4-nonafluoro-1-butanesulfonate, CAS Nr 45187-15-3); $(C_4F_9)CO_2^-$ (2,2,3,3,4,4,5,5,5-nonafluoro-1-pentanoate, CAS Nr 45167-47-3); preferably $SbF_6-$ or PFs and wherein the cationic moiety is preferably 4-(phenylthio)phenyldiphenyl-sulfonium (CAS Nr 47480-44-4); bis[4-(diphenylsulfonium)phenyl] sulfide (CAS Nr 74227-34-2); (4-methylphenyl)diphenyl-sulfonium (CAS Nr 47045-31-8); (3-methylphenyl)diphenyl-sulfonium (CAS Nr 347841-49-0); bis(4-methylphenyl)phenyl-sulfonium (CAS Nr 70082-58-5); [(4-(1,1-dimethylethyl)phenyl]diphenyl-sulfonium (CAS Nr 66482-54-0); bis[4-(1-methylethyl)phenyl]phenyl-sulfonium (CAS Nr 70084-21-8); [(4-(2-methylpropyl)phenyl]diphenyl-sulfonium (CAS Nr 255056-41-8); (4-methoxyphenyl)diphenyl-sulfonium (CAS Nr 70084-23-0); 1-naphthalenyldiphenyl-sulfonium (CAS Nr 116808-68-5); tris(4-methylphenyl)-sulfonium (CAS Nr 47197-43-3); (4-bromophenyl)diphenyl-sulfonium (CAS Nr 70244-60-9); (4-iodophenyl)diphenyl-sulfonium (CAS Nr 255056-45-2); (4-fluorophenyl)diphenyl-sulfonium (CAS Nr 70084-25-2); (4-chlorophenyl)diphenyl-sulfonium (CAS Nr 47045-32-9); (4-phenoxyphenyl)diphenyl-sulfonium (CAS Nr 82617-07-0); (4'-methyl[1,1'-biphenyl]-4-yl)diphenyl-sulfonium (CAS Nr 868610-38-2); tris(4-propylphenyl)-sulfonium (CAS Nr 935399-09-0); bis(4-butylphenyl)phenyl-sulfonium (CAS Nr 518991-23-6); tris[4(1-methylethyl]phenyl]-sulfonium (CAS Nr 592518-39-3); S,S'-1,3-phenylenbis[S,S'-diphenyl]-sulfonium (CAS Nr 641638-18-8); (4-dodecylphenyl) diphenyl-sulfonium (CAS Nr 108493-55-6); (4-benzoylphenyl)diphenyl-sulfonium (CAS Nr 127855-23-6); bis([1,1'-biphenyl]-4-yl)(4-methylphenyl)-sulfonium (CAS Nr 91815-48-4); tris[4-[1,1-dimethylethyl)phenyl]-sulfonium (CAS Nr 91815-56-4); triphenyl-sulfonium (CAS Nr 18393-55-0); 5-(4-methylphenyl)-dibenzothiophenium (CAS Nr 49867-39-2); 5-[4-(2-hydroxyethoxy)phenyl]-thianthrenium (CAS Nr 492466-55-4); 10-(4-methylphenyl)-9H-thioxanthenium (CAS Nr 66482-77-7); diphenyl[4-[[(4-phenylthiophenyl]thio]phenyl]-sulfonium (CAS Nr 101200-54-8); phenylbis[4-phenylthio)phenyl]-sulfonium (CAS Nr 101200-59-3); 5-[4-(phenylthio)phenyl]-thianthrenium (CAS Nr 101200-56-0); 5-[4-(phenylthio)phenyl]-dibenzothiophenium (CAS Nr 492466-67-8); 10-[4-(diphenylthio) phenyl]-9H-thioxanthenium (CAS Nr 903907-41-5); 5-phenyl-thianthrenium (CAS Nr 47041-10-1); 10-phenyl-9H-thioxanthenium (CAS Nr 53512-22-4); 5-(4-methylphenyl)-thianthrenium (CAS Nr 47124-94-7); 5-[1,1'-biphenyl]-4-yl-thianthrenium (CAS Nr 478774-67-3); or S,S'-(thiodi-4, 1-phenylene)bis[S,S'-bis[4-(2-hydroxyethoxy)]phenyl]-sulfonium (CAS Nr 106220-69-3); more preferably 4-(phenylthio)phenyldiphenyl-sulfonium (CAS Nr 47480-44-4) or bis[4-(diphenylsulfonium)phenyl] sulfide (CAS Nr 74227-34-2). Preferably, the one or more photo-reactive compounds not absorbing in the range from about 350 nm to about 470 nm of the radiation curable coating composition of step a) are sulfonium salts selected from the group consisting of 4-(phenylthio)phenyldiphenylsulfonium hexafluoroantimonate (CAS Nr 71449-78-0); bis[4-(diphenylsulfonium)phenyl] sulfide bishexafluoroantimonate (CAS Nr 89452-37-9); 4-(phenylthio)phenyldiphenylsulfonium hexafluorophosphate (CAS Nr 75482-18-7); bis[4-(diphenylsulfonium)phenyl] sulfide bis(hexafluorophosphate) (CAS Nr 74227-35-3); S,S'-(thiodi-4,1-phenylene)bis [S,S'-bis[4-(2-hydroxyethoxy)]phenyl]-sulfonium bis [hexafluorophosphate] (CAS Nr 106220-70-6); S,S'-(thiodi-4,1-phenylene)bis[S,S'-bis[4-(2-hydroxyethoxy)]phenyl]-sulfonium bis[hexafluoroantimonate] (CAS Nr 125054-47-9); 5-[4-(2-hydroxyethoxy)phenyl]thianthrenium hexafluorophosphate (CAS Nr 492466-56-5); and mixtures thereof; more preferably selected from the group consisting of 4-(phenylthio)phenyldiphenylsulfonium hexafluoroantimonate (CAS Nr 71449-78-0); bis[4-(diphenylsulfonium) phenyl] sulfide bishexafluoroantimonate (CAS Nr 89452-37-9); and mixtures thereof. Particularly suitable examples of sulfonium salts for the 5$^{th}$ embodiment of the present invention are commercially available under the name Speed-Cure 976 (CAS Nr 71449-78-0 and 89452-37-9) and Speed-Cure 992 (CAS Nr 75482-18-7 and 74227-35-3) from Lambson, DoubleCure® 1172 (CAS Nr 617711-03-2) from DoubleBond, ESACURE 1187 (CAS Nr 492466-56-5) from IGM Resins, and Optomer SP 150 (CAS Nr 106220-70-6), Optomer SP 170 (CAS Nr 125054-47-9) from Adeka.

According to said 5$^{th}$ embodiment, the one or more compounds absorbing in the range from about 350 nm to about 470 nm of the top curable coating composition of step b) are anthracene compounds being those described for the 2$^{nd}$ embodiment.

According to a 6$^{th}$ embodiment, the one or more photo-reactive compounds not absorbing in the range from about 350 nm to about 470 nm of the radiation curable coating composition of step a) are sulfonium salts and are those described hereabove for the 5$^{th}$ embodiment.

According to said 6$^{th}$ embodiment, the one or more compounds absorbing in the range from about 350 nm to about 470 nm of the top curable coating composition of step b) are thioxanthone compounds being those described hereabove for the 1$^{st}$ embodiment and the top curable coating composition of step b) further comprises one or more compounds being iodonium salts being those described hereabove for the 1$^{st}$ embodiment.

According to a 7$^{th}$ embodiment, the one or more photo-reactive compounds not absorbing in the range from about 350 nm to about 470 nm of the radiation curable coating composition of step a) are sulfonium and are those described hereabove for the 5$^{th}$ embodiment.

According to said 7$^{th}$ embodiment, the one or more compounds of the top curable coating composition of step b) are naphthalene compounds being those described hereabove for the 4$^{th}$ embodiment and the top curable coating composition of step b) further comprises one or more anthracene compounds being those described hereabove for the 4$^{th}$ embodiment.

According to a 8$^{th}$ embodiment, the one or more photo-reactive compounds not absorbing in the range from about 350 nm to about 470 nm of the radiation curable coating composition of step a) are sulfonium salts and are those described hereabove for the 5$^{th}$ embodiment.

According to said 8$^{th}$ embodiment, the one or more compounds absorbing in the range from about 350 nm to about 470 nm of the top curable coating composition of step b) are coumarin compounds being those described hereabove for the 3$^{rd}$ embodiment and the top curable coating composition of step b) further comprises one or more compounds being iodonium salts being those described hereabove for the 1$^{st}$ embodiment.

According to a 9$^{th}$ embodiment, the one or more photo-reactive compounds not absorbing in the range from about 350 nm to about 470 nm of the radiation curable coating composition of step a) are selected from the group consisting of iodonium salts, sulfonium salts being those described hereabove for the 5$^{th}$ embodiment, and mixtures thereof. Non-limiting examples of iodonium salts are those described herein as well as other which can be found in standard textbooks, wherein the textbooks include "Chemistry & Technology of UV & EB Formulation for Coatings, Inks & Paints", Volume III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited; non-limiting examples of sulfonium salts are those described hereabove for the 5$^{th}$ embodiment.

According to said 9$^{th}$ embodiment, the one or more compounds absorbing in the range from about 350 nm to about 470 nm of the top curable coating composition of step b) are iodonium salts having a cationic moiety and an anionic moiety. Preferably, the one or more compounds absorbing in the range from about 350 nm to about 470 nm of the top curable coating composition of step b) are iodonium salts wherein the anionic moiety is preferably SbF$_6^-$ (hexafluoroantimonate, CAS Nr 17111-95-4); PF$_6^-$ (hexafluorophosphate, CAS Nr 16919-18-9); AsFs-(hexafluoroarsenate, CAS Nr 16973-45-8); F$_4$B$^-$ (tetrafluoroborate, CAS Nr 14874-70-5); (C$_6$F$_5$)$_4$B$^-$ (tetrakis(pentafluorophenyl)borate, CAS Nr 47855-94-7); (CF$_3$SO$_2$)$_3$C$^-$ (tris(trifluoromethylsulfonyl)methide, CAS Nr 130447-45-9); (CF$_3$)SO$_3^-$ (trifluoromethanesulfonate, CAS Nr 37181-39-8); (CH$_3$C$_6$H$_4$)SO$_3^-$ (4-methylbenzenesulfonate, CAS Nr 16722-51-3); $(CF_3)CO_2^-$ (trifluoroacetate, CAS Nr 14477-72-6); $(C_4F_9)SO_3^-$ (1,1,2,2,3,3,4,4,4-nonafluoro-1-butanesulfonate, CAS Nr 45187-15-3); $(C_4F_9)CO_2^-$ (2,2,3,3,4,4,5,5,5-nonafluoro-1-pentanoate, CAS Nr 45167-47-3); preferably $SbF_6^-$ or PFs and wherein the cationic moiety is [(7-methoxy-4-methyl-2-oxo-2H-1-benzopyran-3-yl)phenyl]iodonium (CAS Nr 2091854-11-2). Preferably, the radiation curable coating composition of step b) comprise one or more iodonium salts selected from the group consisting of [(7-methoxy-4-methyl-2-oxo-2H-1-benzopyran-3-yl)phenyl]iodonium hexafluorophosphate (CAS Nr 2091854-12-3); [(7-methoxy-4-methyl-2-oxo-2H-1-benzopyran-3-yl)phenyl]iodonium hexafluoroantimonate (CAS Nr 2091854-13-4); and mixtures thereof. Particularly suitable examples of iodonium salts for the $9^{th}$ embodiment of the present invention are commercially available under the name Sylanto® 7 MP (CAS Nr 2091854-12-3) and Sylanto® 7 MS (CAS Nr 2091854-13-4) from Synthos Group S.A.

According to a $10^{th}$ embodiment, the one or more photoreactive compounds not absorbing in the range from about 350 nm to about 470 nm of the radiation curable coating composition of step a) are selected from the group consisting of iodonium salts, sulfonium salts being those described hereabove for the $5^{th}$ embodiment, and mixtures thereof. Non-limiting examples of iodonium salts are those described herein as well as other which can be found in standard textbooks, wherein the textbooks include "Chemistry & Technology of UV & EB Formulation for Coatings, Inks & Paints", Volume III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited; non-limiting examples of sulfonium salts are those described hereabove for the $5^{th}$ embodiment.

According to said $10^{th}$ embodiment, the one or more compounds absorbing in the range from about 350 nm to about 470 nm of the top curable coating composition of step b) are oxonium salts having a cationic moiety and an anionic moiety, wherein the anionic moiety is preferably $SbF_6^-$ (hexafluoroantimonate, CAS Nr 17111-95-4); $PF_6^-$ (hexafluorophosphate, CAS Nr 16919-18-9); $AsF_6^-$ (hexafluoroarsenate, CAS Nr 16973-45-8); $F_4B^-$ (tetrafluoroborate, CAS Nr 14874-70-5); $(C_6F_5)_4B^-$ (tetrakis(pentafluorophenyl)borate, CAS Nr 47855-94-7); $(CF_3SO_2)_3C^-$ (tris(trifluoromethylsulfonyl)methide, CAS Nr 130447-45-9); $(CF_3)SO_3^-$ (trifluoromethanesulfonate, CAS Nr 37181-39-8); $(CH_3C_6H_4)SO_3^-$ (4-methylbenzenesulfonate, CAS Nr 16722-51-3); $(CF_3)CO_2^-$ (trifluoroacetate, CAS Nr 14477-72-6); $(C_4F_9)SO_3^-$ (1,1,2,2,3,3,4,4,4-nonafluoro-1-butanesulfonate, CAS Nr 45187-15-3); $(C_4F_9)CO_2^-$ (2,2,3,3,4,4,5,5,5-nonafluoro-1-pentanoate, CAS Nr 45167-47-3); preferably $F_4B^-$ and wherein the cationic moiety is preferably 2,4,6-triphenylpyrylium (CAS Nr 15959-35-0); 2,4,6-tris(4-methylphenyl)-pyrylium (CAS Nr 47551-87-1); 2,4,6-tris(4-methoxyphenyl)-pyrylium (CAS Nr 47659-08-5); 2,6-bis(4-fluorophenyl)-4-(4-methoxyphenyl)-pyrylium (CAS Nr 1621587-27-6); 3-methyl-2,4,6-triphenyl-pyrylium (CAS Nr 33225-59-1); 2,4,6-tris([1,1'-biphenyl]-4-yl)-pyrylium (CAS Nr 14987-61-0); 4-[4-(dimethylamino)phenyl]-2,6-diphenyl-pyrylium (CAS Nr 47551-72-4) or 2,4-bis(4-methoxyphenyl)-6-phenyl-pyrylium (CAS Nr47589-11-7); more preferably 2,4,6-triphenylpyrylium (CAS Nr 15959-35-0). Preferably, at least one of the one or more compounds of the top curable coating composition of step b) is 2, 4, 6-triphenylpyrylium tetrafluoroborate (CAS Nr. 448-61-3).

According to a $11^{th}$ embodiment, the one or more photoreactive compounds not absorbing in the range from about 350 nm to about 470 nm of the radiation curable coating composition of step a) are selected from the group consisting of iodonium salts, sulfonium salts being those described hereabove for the $5^{th}$ embodiment, and mixtures thereof. Non-limiting examples of iodonium salts are those described herein as well as other which can be found in standard textbooks, wherein the textbooks include "Chemistry & Technology of UV & EB Formulation for Coatings, Inks & Paints", Volume III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited; non-limiting examples of sulfonium salts are those described hereabove for the $5^{th}$ embodiment.

According to said $11^{th}$ embodiment, the one or more compounds absorbing in the range from about 350 nm to about 470 nm of the top curable coating composition of step b) are sulfonium salts having a cationic moiety and an anionic moiety. Preferably, the one or more compounds absorbing in the range from about 350 nm to about 470 nm of the top curable coating composition of step b) are sulfonium salts wherein the anionic moiety is preferably $SbF_6^-$ (hexafluoroantimonate, CAS Nr 17111-95-4); $PF_6^-$ (hexafluorophosphate, CAS Nr 16919-18-9); AsFs- (hexafluoroarsenate, CAS Nr 16973-45-8); $F_4B^-$ (tetrafluoroborate, CAS Nr 14874-70-5); $(C_6F_5)_4B^-$ (tetrakis(pentafluorophenyl)borate, CAS Nr 47855-94-7); $(CF_3SO_2)_3C^-$ (tris(trifluoromethylsulfonyl)methide, CAS Nr 130447-45-9); $(CF_3)SO_3^-$ (trifluoromethanesulfonate, CAS Nr 37181-39-8); $(CH_3C_6H_4)SO_3^-$ (4-methylbenzenesulfonate, CAS Nr 16722-51-3); $(CF_3)CO_2^-$ (trifluoroacetate, CAS Nr 14477-72-6); $(C_4F_9)SO_3^-$ (1,1,2,2,3,3,4,4,4-nonafluoro-1-butanesulfonate, CAS Nr 45187-15-3); $(C_4F_9)CO_2^-$ (2,2,3,3,4,4,5,5,5-nonafluoro-1-pentanoate, CAS Nr 45167-47-3); preferably $SbF_6^-$ or PFs and wherein the cationic moiety is preferably tris[4-(4-acetylphenylsulfanyl)phenyl]-sulfonium (CAS Nr 953084-12-3); 10-[1,1'-biphenyl]-4-yl-2-(1-methylethyl)-9-oxo-9H-thioxanthenium (CAS Nr 591773-91-0); or (9-oxo-9H-thioxanthen-2-yl)diphenyl-sulfonium (CAS Nr 1140908-08-2); more preferably tris[4-(4-acetylphenylsulfanyl)phenyl]-sulfonium (CAS Nr 953084-12-3) or 10-[1,1'-biphenyl]-4-yl-2-(1-methylethyl)-9-oxo-9H-thioxanthenium (CAS Nr 591773-91-0). Preferably, the one or more photoreactive compounds absorbing in the range from about 350 nm to about 470 nm of the top curable coating composition of step b) are sulfonium salts selected from the group consisting of tris[4-(4-acetylphenylsulfanyl) phenyl]-sulfonium hexafluorophosphate (CAS Nr 953084-13-4); 10-[1,1'-biphenyl]-4-yl-2-(1-methylethyl)-9-oxo-9H-thioxanthenium hexafluorophosphate (CAS Nr 591773-92-1); and mixtures thereof. Particularly suitable examples of sulfonium salts for the $11^{th}$ embodiment of the present invention are commercially available under the name OMNICAT 270 (CAS Nr 953084-13-4) and OMNICAT 550 (CAS Nr 591773-92-1) from IGM RESINS.

For the $1^{st}$, $2^{nd}$, $3^{rd}$, $4^{th}$, $5^{th}$, $7^{th}$, $9^{th}$, and $10^{th}$ embodiments described herein, the top curable coating composition of step b) may further comprise one or more iodonium salts being those described hereabove for the $1^{st}$ embodiment, and/or one or more sulfonium salts being those described hereabove for the $5^{th}$ embodiment.

For the $11^{th}$ embodiment described herein, the top curable coating composition of step b) may further comprise one or more iodonium salts being those described hereabove for the $1^{st}$ embodiment, and/or one or more thioxanthones being those described hereabove for the 1st embodiment, and/or one or more mixtures of iodonium salts and anthracenes being those described hereabove for the 6th embodiment, and/or one or more anthracenes being those described hereabove for the 2nd embodiment, and/or one or more coumarins being those described hereabove for the 3rd embodiment, and/or one or more mixtures of naphthalenes and anthracenes being those described hereabove for the 4th embodiment, and/or one or more sulfonium salts being those described hereabove for the 5th embodiment, and/or one or more iodonium salts having a cationic and an anionic moiety and being those described above for the 9th embodiment, and/or one or more oxonium salts being those described hereabove for the 10th embodiment.

Preferred embodiments are those described hereabove for the 1st, 2nd, 3rd, 4th, 5th, 6th, 7th, and 11th embodiments described herein.

Preferred examples of the 1st embodiment described herein are combinations, wherein of at least one of the one or more compounds of the radiation curable coating composition of step a) is an iodonium salt being bis(4-methylphenyl)iodonium hexafluorophosphate (CAS Nr 60565-88-0) or bis(4-dodecylphenyl)iodonium hexafluoroantimonate (CAS Nr 71786-70-4) and at least one of the one or more compounds of the top curable coating composition of step b) is a thioxanthone compound being 1-chloro-4-propoxy-9H-thioxanthen-9-one (CAS Nr 142770-42-1), 2-isopropyl-9H-thioxanthen-9-one, 2-(1-methylethyl)-9H-thioxanthen-9-one (CAS Nr5495-84-1), a mixture 2-(1-methylethyl)-9H-thioxanthen-9-one (CAS Nr 5495-84-1) and 4-(1-methylethyl)-9H-thioxanthen-9-one (CAS Nr 83846-86-0), a thioxanthone oligomer or polymer (CAS Nr 2055335-46-9) or 1,3-di[[α-[1-chloro-9-oxo-9H-thioxanthen-4-yl)oxy]acetylpoly[oxy(1-methylethylene)]]oxy]-2,2-bis[[α-[1-cloro-9-oxo-9H-thioxanthen-4-yl)oxy]acetylpoly[oxy(1-methylethylene)]]oxymethylpropane (CAS Nr 1003567-83-6); more preferably combinations, wherein at least one of the one or more compounds of the radiation curable coating composition of step a) is an iodonium salt being bis(4-methylphenyl)iodonium hexafluorophosphate (CAS Nr 60565-88-0) and at least one of the one or more compounds of the top curable coating composition of step b) is a thioxanthone compound being 1-chloro-4-propoxy-9H-thioxanthen-9-one (CAS Nr 142770-42-1); at least one of the one or more compounds of the radiation curable coating composition of step a) is an iodonium salt being bis(4-methylphenyl)iodonium hexafluorophosphate (CAS Nr 60565-88-0) and at least one of the one or more compounds of the top curable coating composition of step b) is a thioxanthone oligomer or polymer (CAS Nr 2055335-46-9); at least one of the one or more compounds of the radiation curable coating composition of step a) is an iodonium salt being bis(4-dodecylphenyl) iodonium hexafluoroantimonate (CAS Nr 71786-70-4) and at least one of the one or more compounds of the top curable coating composition of step b) is 2-isopropyl-9H-thioxanthen-9-one (CAS Nr 5495-84-1) or 4-(1-methylethyl)-9H-thioxanthen-9-one (CAS Nr 83846-86-0); or at least one of the one or more compounds of the radiation curable coating composition of step a) is an iodonium salt being bis(4-dodecylphenyl)iodonium hexafluoroantimonate (CAS Nr 71786-70-4) and at least one of the one or more compounds of the top curable coating composition of step b) is a thioxanthone being 1,3-di[[α-[1-chloro-9-oxo-9H-thioxanthen-4-yl)oxy]acetylpoly[oxy(1-methylethylene)]]oxy]-2,2-bis[[α-[1-cloro-9-oxo-9H-thioxanthen-4-yl)oxy]acetylpoly[oxy(1-methylethylene)]]oxymethylpropane (CAS Nr 1003567-83-6).

Preferred examples of the 2nd embodiment described herein are combinations, wherein at least one of the one or more compounds of the radiation curable coating composition of step a) is bis(4-methylphenyl)iodonium hexafluorophosphate (CAS Nr 60565-88-0) and at least one of the one or more compounds of the top curable coating composition of step b) is 9,10-dibutoxy-anthracene (CAS Nr 76275-14-4).

Preferred examples of the 3rd embodiment described herein are combinations, wherein at least one of the one or more compounds of the radiation curable coating composition of step a) is bis(4-methylphenyl)iodonium hexafluorophosphate (CAS Nr 60565-88-0) and at least one of the one or more compounds of the top curable coating composition of step b) is 3-(4-dodecylbenzoyl)-5,7-dimethoxy-2H-1-benzopyran-2-one (CAS Nr 2243703-91-3).

Preferred examples of the 4th embodiment described herein are combinations, wherein at least one of the one or more compounds of the radiation curable coating composition of step a) is bis(4-methylphenyl)iodonium hexafluorophosphate (CAS Nr 60565-88-0) and at least one of the one or more compounds of the top curable coating composition of step b) is 9,10-dibutoxy-anthracene (CAS Nr 76275-14-4) and at last another one is a naphthalene compound being 9,10-diethoxy-naphthalene (CAS Nr 27294-37-7).

Preferred examples of the 5th embodiment described herein are combinations, wherein at least one of the one or more compounds of the radiation curable coating composition of step a) is 4-(phenylthio)phenyldiphenylsulfonium hexafluoroantimonate (CAS Nr 71449-78-0) and/or bis[4-(diphenylsulfonium)phenyl] sulfide bishexafluoroantimonate (CAS Nr 89452-37-9) and at least one of the one or more compounds of the top curable coating composition of step b) is 9,10-dibutoxy-anthracene (CAS Nr 76275-14-4).

Preferred examples of the 6th embodiment described herein are combinations, wherein at least one of the one or more compounds of the radiation curable coating composition of step a) is 4-(phenylthio)phenyldiphenylsulfonium hexafluoroantimonate (CAS Nr 71449-78-0) and/or bis[4-(diphenylsulfonium)phenyl] sulfide bishexafluoroantimonate (CAS Nr 89452-37-9) and at least one of the one or more compounds of the top curable coating composition of step b) is 1-chloro-4-propoxy-9H-thioxanthen-9-one (CAS Nr 142770-42-1) and at least another one is bis(4-methylphenyl)iodonium hexafluorophosphate (CAS Nr 60565-88-0).

Preferred examples of the 7th embodiment described herein are combinations, wherein at least one of the one or more compounds of the radiation curable coating composition of step a) is 4-(phenylthio)phenyldiphenylsulfonium hexafluoroantimonate (CAS Nr 71449-78-0) or bis[4-(diphenylsulfonium)phenyl] sulfide bishexafluoroantimonate (CAS Nr 89452-37-9) and at least one of the one or more compounds of the top curable coating composition of step b) is 9,10-dibutoxy-anthracene (CAS Nr 76275-14-4) and at last another one is a naphthalene compound being 9,10-diethoxy-naphthalene (CAS Nr 27294-37-7).

Preferred examples of the 8th embodiment described herein are combinations, wherein at least one of the one or more compounds of the radiation curable coating composition of step a) is 4-(phenylthio)phenyldiphenylsulfonium hexafluoroantimonate (CAS Nr 71449-78-0) or bis[4-(diphenylsulfonium)phenyl] sulfide bishexafluoroantimonate (CAS Nr 89452-37-9) and at least one of the one or more compounds of the top curable coating composition of step b) is 3-(4-$C_{10}$-$C_{13}$-benzoyl)-5,7-dimethoxy-2H-1-benzopyran-2-one (CAS Nr 2243703-91-3) and at last another one is bis(4-methylphenyl)iodonium hexafluorophosphate (CAS Nr 60565-88-0).

Preferred examples of the 9th embodiment described herein are combinations, wherein at least one of the one or more compounds of the radiation curable coating composition of step a) is bis(4-methylphenyl)iodonium hexafluorophosphate (CAS Nr 60565-88-0), or is 4-(phenylthio)phenyldiphenylsulfonium hexafluoroantimonate (CAS Nr 71449-78-0) or bis[4-(diphenylsulfonium)phenyl] sulfide bishexafluoroantimonate (CAS Nr 89452-37-9), and at least one of the one or more compounds of the top curable coating composition of step b) is [(7-methoxy-4-methyl-2-oxo-2H-1-benzopyran-3-yl)phenyl]iodonium hexafluoroantimonate (CAS Nr 2091854-13-4).

Preferred examples of the 10th embodiment described herein are combinations, wherein at least one of the one or more compounds of the radiation curable coating composition of step a) is bis(4-methylphenyl)iodonium hexafluorophosphate (CAS Nr 60565-88-0), or is 4-(phenylthio)phenyldiphenylsulfonium hexafluoroantimonate (CAS Nr 71449-78-0) or bis[4-(diphenylsulfonium)phenyl] sulfide bishexafluoroantimonate (CAS Nr 89452-37-9), and at least one of the one or more compounds of the top curable coating composition of step b) is 2, 4, 6-triphenylpyrylium tetrafluoroborate (CAS Nr. 448-61-3).

Preferred examples of the 11th embodiment described herein are combinations, wherein at least one of the one or more compounds of the radiation curable coating composition of step a) is bis(4-methylphenyl)iodonium hexafluorophosphate (CAS Nr 60565-88-0), or is 4-(phenylthio)phenyldiphenylsulfonium hexafluoroantimonate (CAS Nr 71449-78-0) or bis[4-(diphenylsulfonium)phenyl] sulfide bishexafluoroantimonate (CAS Nr 89452-37-9), and at least one of the one or more compounds of the top curable coating composition of step b) is tris[4-(4-acetylphenylsulfanyl)phenyl]-sulfonium hexafluorophosphate (CAS Nr 953084-13-4).

The method described herein comprises, partially simultaneously with or subsequently to the step b) described herein, a step c) of at least partially curing the one or more indicia (×30) and the one or more areas of the coating layer (×10) below said one or more indicia (×30) with a light-emitting-diode (LED) curing unit (×50). On the contrary to medium-pressure mercury lamps that have emission bands in the UV-A, UV-B and UV-C regions of the electromagnetic spectrum, UV-LED lamps emit radiation in the UV-A region and/or visible (Vis) region, e.g. in the range from about 350 nm to about 470 nm. Moreover, current UV-LED and Vis-LED lamps emit quasi monochromatic radiation, i.e. only emit at one wavelength, such as 365 nm, 385 nm, 395 nm, 405 nm or 450 nm. The step c) of at least partially curing the one or more indicia (×30) is carried out by exposure to UV light with the LED curing unit (×50), preferably to one or more wavelengths between about 355 nm and about 415 nm, more preferably by exposure to UV light at 365 nm and/or 385 nm and/or 395 nm, emitted from the LED curing unit (×50). By "partially simultaneously", it is meant that both steps are partly performed simultaneously, i.e. the times of performing each of the steps partially overlap. In the context described herein, when curing is performed partially simultaneously with the application step b), it must be understood that curing becomes effective after the formation of the one or more indicia (×30) before the complete or partial curing. Should the step c) being carried out subsequently to the step b) described herein, the time between said two steps is preferably less than 10 seconds and more preferably less than 5 seconds.

The method described herein comprises, subsequently to the step c) described herein, the step d) of exposing the coating layer (×10) to the magnetic field of the magnetic-field generating device described herein so as to orient at least a part of the non-spherical magnetic or magnetizable pigment particles. According to one embodiment, the step d) is carried out to so as to mono-axially orient at least a part of the magnetic or magnetizable pigment particles described herein. According to another embodiment, the step d) is carried out so as to bi-axially orient at least a part of the platelet-shaped magnetic or magnetizable pigment particles, preferably so as to bi-axially orient at least a part of the platelet-shaped magnetic or magnetizable pigment particles to have both their X-axes and Y-axes substantially parallel to the substrate surface. For embodiments wherein the method described herein comprises the step of exposing the coating layer (×10) to the magnetic field of the magnetic-field generating device described herein so as to bi-axially orient at least a part of the magnetic or magnetizable pigment particle, the coating layer (×10) may be subsequently exposed more than one time to said magnetic-field generating device.

For embodiments of the method described herein wherein the steps of exposing the coating layer (×10) to the magnetic field of the magnetic-field generating device described herein is carried out so as to bi-axially orient at least a part of the magnetic or magnetizable pigment particles, at least a part of the non-spherical magnetic or magnetizable pigment particles described herein is required to consist of platelet-shaped magnetic or magnetizable pigment particles having an X-axis and a Y-axis defining a plane of predominant extension of the particles. In contrast to needle-shaped pigment particles which can be considered as one-dimensional particles, platelet-shaped pigment particles have an X-axis and a Y-axis defining a plane of predominant extension of the particles. In other words, platelet-shaped pigment particles may be considered to be two-dimensional particles due to the large aspect ratio of their dimensions as can be seen in FIG. 1. As shown in FIG. 1, a platelet-shaped pigment particle can be considered as a two-dimensional structure wherein the dimensions X and Y are substantially larger than dimension Z. Platelet-shaped pigment particles are also referred in the art as oblate particles or flakes. Such pigment particles may be described with a main axis X corresponding to the longest dimension crossing the pigment particle and a second axis Y perpendicular to X which also lies within said pigment particles.

During the magnetic orientation steps described herein of the non-spherical magnetic or magnetizable pigment particles, the substrate (×20) carrying the coating layer (×10) may be disposed on a non-magnetic supporting plate (×40) which is made of one or more non-magnetic materials.

During the magnetic orientation steps described herein of the magnetic or magnetizable pigment particles, the position of the magnetic-field-generating devices is not limited and depends on the choice and the design of the magnetic orientation pattern to be produced. Depending on the choice and the design of the magnetic orientation pattern to be produced, the magnetic-field-generating devices (B1, B2, B3) may be placed below the substrate (×20) or on top of the coating layer (×10).

In contrast to a mono-axial orientation wherein magnetic or magnetizable pigment particles are orientated in such a way that only their main axis is constrained by the magnetic field, carrying out a bi-axial orientation means that the platelet-shaped magnetic or magnetizable pigment particles are made to orientate in such a way that their two main axes are constrained. That is, each platelet-shaped magnetic or magnetizable pigment particle can be considered to have a major axis in the plane of the pigment particle and an orthogonal minor axis in the plane of the pigment particle. The major and minor axes of the platelet-shaped magnetic or magnetizable pigment particles are each caused to orient according to the magnetic field. Effectively, this results in neighboring platelet-shaped magnetic pigment particles that are close to each other in space to be essentially parallel to each other. Put another way, bi-axial orientation aligns the planes of the platelet-shaped magnetic or magnetizable pigment particles so that the planes of said pigment particles are oriented to be essentially parallel relative to the planes of neighboring (in all directions) platelet-shaped magnetic or magnetizable pigment particles. The magnetic-field generating devices and the methods described herein allow to bi-axially orient the platelet-shaped magnetic or magnetizable pigment particles described herein such that the platelet-shaped magnetic or magnetizable pigment particles form a sheet-like structure with their X and Y axes preferably substantially parallel to the substrate (×20) surface and are planarized in said two dimensions.

Suitable magnetic-field generating devices for mono-axially orienting the magnetic or magnetizable pigment particles described herein are not limited and include for example dipole magnets, quadrupolar magnets and combinations thereof. The following devices are provided herein as illustrative examples.

Optical effects known as flip-flop effects (also referred in the art as switching effect) include a first printed portion and a second printed portion separated by a transition, wherein pigment particles are aligned parallel to a first plane in the first portion and pigment particles in the second portion are aligned parallel to a second plane. Methods and magnets for producing said effects are disclosed for example in in US 2005/0106367 and EP 1 819 525 B1.

Optical effects known as rolling-bar effects as disclosed in US 2005/0106367 may also be produced. A "rolling bar" effect is based on pigment particles orientation imitating a curved surface across the coating. The observer sees a specular reflection zone which moves away or towards the observer as the image is tilted. The pigment particles are aligned in a curving fashion, either following a convex curvature (also referred in the art as negative curved orientation) or a concave curvature (also referred in the art as positive curved orientation). Methods and magnets for producing said effects are disclosed for example in EP 2 263 806 A1, EP 1 674 282 B1, EP 2 263 807 A1, WO 2004/007095 A2, WO 2012/104098 A1, and WO 2014/198905 A2.

Optical effects known as Venetian-blind effects may also be produced. Venetian-blind effects include pigment particles being oriented such that, along a specific direction of observation, they give visibility to an underlying substrate surface, such that indicia or other features present on or in the substrate surface become apparent to the observer while they impede the visibility along another direction of observation Methods and magnets for producing said effects are disclosed for example in U.S. Pat. No. 8,025,952 and EP 1 819 525 B1.

Optical effects known as moving-ring effects may also be produced. Moving-ring effects consists of optically illusive images of objects such as funnels, cones, bowls, circles, ellipses, and hemispheres that appear to move in any x-y direction depending upon the angle of tilt of said optical effect layer. Methods and magnets for producing said effects are disclosed for example in EP 1 710 756 A1, U.S. Pat. No. 8,343,615, EP 2 306 222 A1, EP 2 325 677 A2, WO 2011/092502 A2, US 2013/0084411, WO 2014 108404 A2 and WO2014/108303 A1.

Optical effects providing an optical impression of a pattern of moving bright and dark areas upon tilting said optical effect layer may also be produced. Methods and magnets for producing said effects are disclosed for example in WO 2013/167425 A1.

Optical effects providing an optical impression of a loop-shaped body having a size that varies upon tilting said optical effect layer may also be produced. Methods and magnets for producing these optical effects are disclosed for example in WO 2017/064052 A1, WO 2017/080698 A1 and WO 2017/148789 A1.

Optical effects providing an optical impression of one or more loop-shaped bodies having a shape that varies upon tilting the optical effect layer may also be produced. Methods and magnets for producing said effects are disclosed for example in WO 2018/054819 A1.

Optical effects providing an optical impression of a moon crescent moving and rotating upon tilting may also be produced. Methods and magnets for producing said effects are disclosed for example in WO 2019/215148 A1.

Optical effects providing an optical impression of a loop-shaped body having a size and shape that varies upon tilting may be produced. Methods and magnets for producing said effects are disclosed for example in the co-pending PCT patent application WO 2020/052862 A1.

Optical effects providing an optical impression of an ortho-parallactic effect, i.e. in the present case under the form of a bright reflective vertical bar moving in a longitudinal direction when the substrate is tilted about a horizontal/latitudinal axis or moving in a horizontal/latitudinal direction when the substrate is tilted about a longitudinal axis may be produced. Methods and magnets for producing said effects are disclosed for example in the co-pending PCT patent application PCT/EP2020/052265.

Optical effects providing an optical impression of one loop-shaped body surrounded by one or more loop-shaped bodies, wherein said one or more loop-shaped bodies have their shape and/or their brightness varying upon tilting may be produced. Methods and magnets for producing said effects are disclosed for example in the co-pending PCT patent application PCT/EP2020/054042.

Optical effects providing an optical impression of a plurality of dark spots and a plurality of bright spots moving and/or appearing and/or disappearing not only in a diagonal direction when the substrate is tilted about a vertical/longitudinal axis but also moving and/or appearing and/or disappearing in a diagonal direction when the substrate is tilted may be produced. Methods and magnets for producing said effects are disclosed for example in the co-pending EP patent applications EP19205715.6 and EP19205716.4.

The magnetic-field generating devices described herein may be at least partially embedded in a non-magnetic supporting matrix which is made of one or more non-magnetic materials.

The non-magnetic materials of the non-magnetic supporting plate (×40) described herein and the non-magnetic supporting matrix described herein are preferably independently selected from the group consisting of non-magnetic metals and engineering plastics and polymers. Non-magnetic metals include without limitation aluminum, aluminum alloys, brasses (alloys of copper and zinc), titanium, titanium alloys and austenitic steels (i.e. non-magnetic steels). Engineering plastics and polymers include without limitation polyaryletherketones (PAEK) and its derivatives polyetheretherketones (PEEK), polyetherketoneketones (PEKK), polyetheretherketoneketones (PEEKK) and polyetherketoneetherketoneketone (PEKEKK); polyacetals, polyamides, polyesters, polyethers, copolyetheresters, polyimides, polyetherimides, high-density polyethylene (HDPE), ultra-high molecular weight polyethylene (UHMWPE), polybutylene terephthalate (PBT), polypropylene, acrylonitrile butadiene styrene (ABS) copolymer, fluorinated and perfluorinated polyethylenes, polystyrenes, polycarbonates, polyphenylenesulfide (PPS) and liquid crystal polymers. Preferred materials are PEEK (polyetheretherketone), POM (polyoxymethylene), PTFE (polytetrafluoroethylene), Nylon® (polyamide) and PPS.

The magnetic-field generating devices described herein may comprise a magnetic plate carrying one or more reliefs, engravings or cut-outs. WO 2005/002866 A1 and WO 2008/046702 A1 are examples for such engraved magnetic plates.

The magnetic-field generating devices described herein may be a soft magnetic plate carrying one or more indicia in the form of indentations and/or protrusions or a soft magnetic plate comprising one or more voids having the shape of one or more indicia, wherein the orientation step is carried out by forming an assembly of the substrate (×20) carrying the coating layer (×10) above the soft magnetic plate and wherein said assembly is moved through an inhomogeneous magnetic field of a static magnetic-field-generating device (×40) so as to bi-axially orient at least a part of the platelet-shaped magnetic or magnetizable pigment particles as described in WO 2018/019594 A1 and WO 2018/033512 A1.

The magnetic-field generating devices described herein may be a magnetic assembly (×30) comprising a soft magnetic plate comprising one or more voids for receiving one or more dipole magnets and comprising one or more indentations and/or one or more protrusions forming one or more continuous loop-shaped indicia and/or one or more discontinuous loop-shaped indicia as described in WO 2020/025218 A1 or a magnetic assembly a soft magnetic comprising one or more voids and one or more dipole magnets being disposed within the one or more voids and/or are facing said one or more voids and/or one or more pairs of two dipole magnets being disposed below the soft magnetic plate and being spaced apart from the one or more voids as described in WO 2020/025482 A1.

Suitable magnetic-field generating devices for bi-axially orienting the platelet-shaped magnetic or magnetizable pigment particles described herein are not limited.

Particularly preferred devices for bi-axially orienting the pigment particles are disclosed in EP 2 157 141 A1. Upon motion of a substrate carrying a coating layer comprising pigment particles, the device disclosed in EP 2 157 141 A1 provides a dynamic magnetic field that changes its direction forcing the pigment particles to rapidly oscillate until both main axes, X-axis and Y-axis, become substantially parallel to the substrate surface, i.e. the pigment particles rotate until they come to the stable sheet-like formation with their X and Y axes substantially parallel to the substrate surface and are planarized in said two dimensions.

Other particularly preferred devices for bi-axially orienting the pigment particles comprise linear permanent magnet Halbach arrays, i.e. devices comprising a plurality of magnets with different magnetization directions and cylinder devices. Detailed description of Halbach permanent magnets was given by Z. Q. Zhu and D. Howe (Halbach permanent magnet machines and applications: a review, IEE. Proc. Electric Power Appl., 2001, 148, p. 299-308). The magnetic field produced by such a Halbach array has the properties that it is concentrated on one side while being weakened almost to zero on the other side. Linear Halbach arrays are disclosed for example in WO 2015/086257 A1 and WO 2018/019594 A1 and Halbach cylinder devices are disclosed in EP 3 224 055 B1.

Other particularly preferred devices for bi-axially orienting the pigment particles are spinning magnets, said magnets comprising disc-shaped spinning magnets or magnetic-field generating devices that are essentially magnetized along their diameter. Suitable spinning magnets or magnetic-field generating devices are described in US 2007/0172261 A1, said spinning magnets or magnetic-field generating devices generate radially symmetrical time-variable magnetic fields, allowing the bi-orientation of magnetic or magnetizable pigment particles of a not yet cured coating composition. These magnets or magnetic-field generating devices are driven by a shaft (or spindle) connected to an external motor. CN 102529326 B discloses examples of devices comprising spinning magnets that might be suitable for bi-axially orienting magnetic or magnetizable pigment particles. In a preferred embodiment, suitable devices for bi-axially orienting magnetic or magnetizable pigment particles are shaft-free disc-shaped spinning magnets or magnetic-field generating devices constrained in a housing made of non-magnetic, preferably non-conducting, materials and are driven by one or more magnet-wire coils wound around the housing. Examples of such shaft-free disc-shaped spinning magnets or magnetic-field generating devices are disclosed in WO 2015/082344 A1, WO 2016/026896 A1 and WO2018/141547 A1.

Figure 3A:
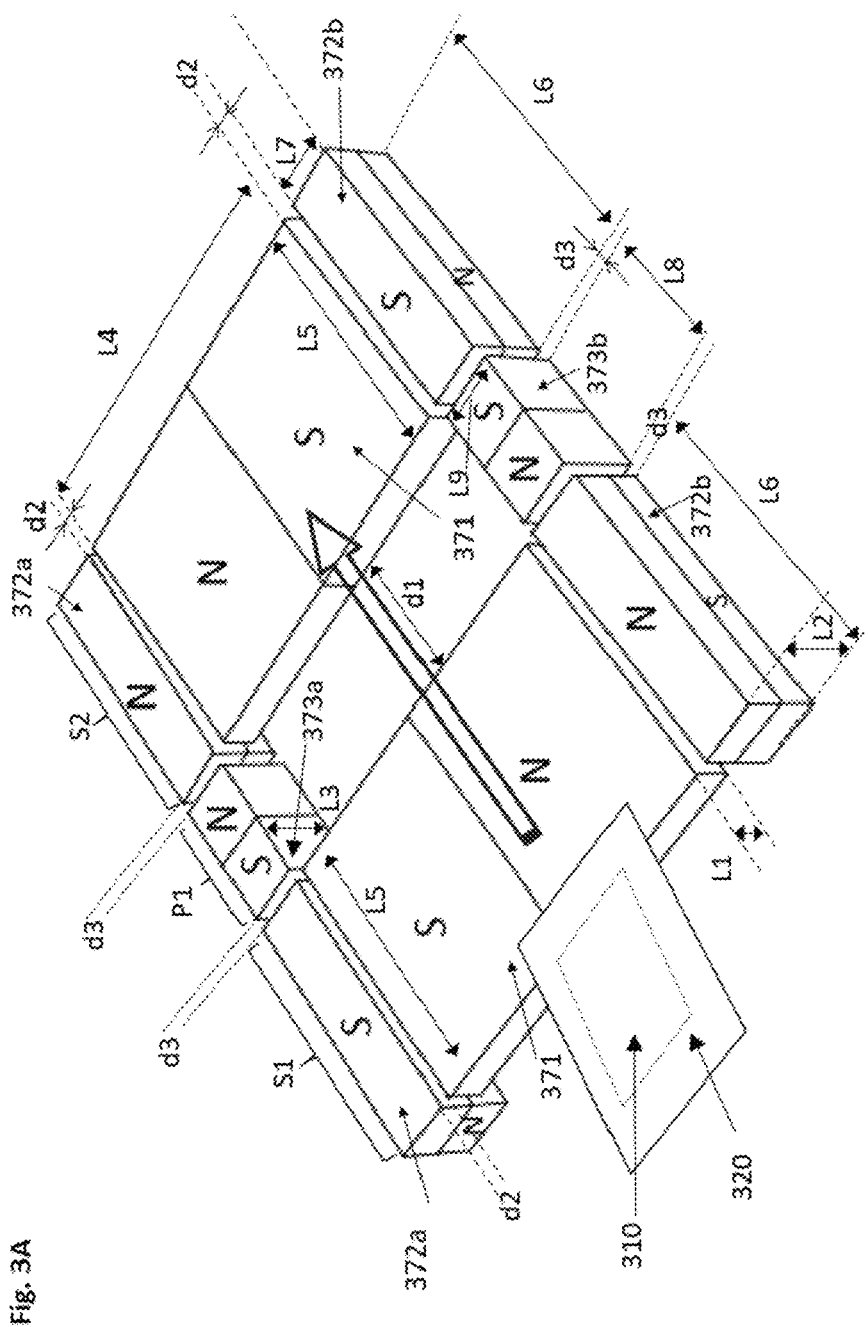
FIG. 3A-B schematically illustrates a magnetic-field generating device to bi-axially (FIG. 3A) or mono-axially (FIG. 3B) orient magnetic or magnetizable pigment particles in a coating layer (310) on a substrate (320).

Other particularly preferred devices for bi-axially orienting the pigment particles are shown in FIG. 3A and comprise a) at least a first set (S1) and a second set (S2), each of the first and second sets (S1, S2) comprising one first bar dipole magnet having its magnetic axis oriented to be substantially parallel to the substrate during the magnetic orientation and two second bar dipole magnets having their magnetic axes oriented to be substantially perpendicular to the substrate; and b) a pair (P1) of third bar dipole magnets having their magnetic axes oriented to be substantially parallel to the substrate such as those disclosed in the co-pending European Patent application EP20176506.2.

The method described herein comprises, partially simultaneously with or subsequently to the step d) described herein, a step e) of at least partially curing the coating layer (×10) with a curing unit (×60) at least emitting between 250 nm and 320 nm.

The method described herein comprises, partially simultaneously with or subsequently to the step d) described herein, a step e) of at least partially curing the coating layer (×10) with a curing unit (×60) at least emitting between 250 nm and 320 nm. By "partially simultaneously", it is meant that both steps are partly performed simultaneously, i.e. the times of performing each of the steps partially overlap. In the context described herein, when curing is performed partially simultaneously with the application step c), it must be understood that curing becomes effective after the orientation of the non-spherical magnetic or magnetizable pigment particles in the coating layer (×10) before the complete or partial curing.

Figures 1, 2A:
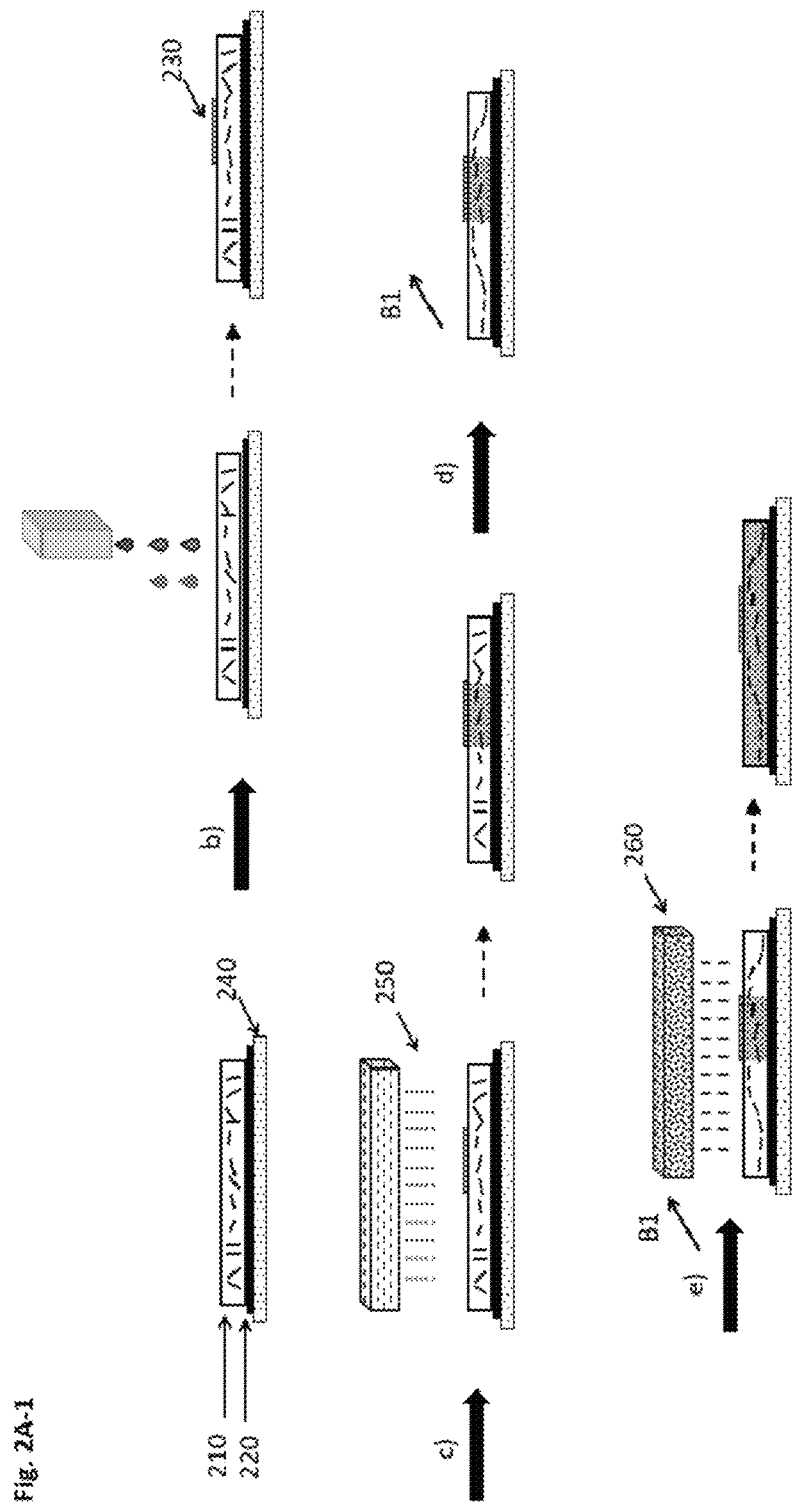
Figures 2, 2A:
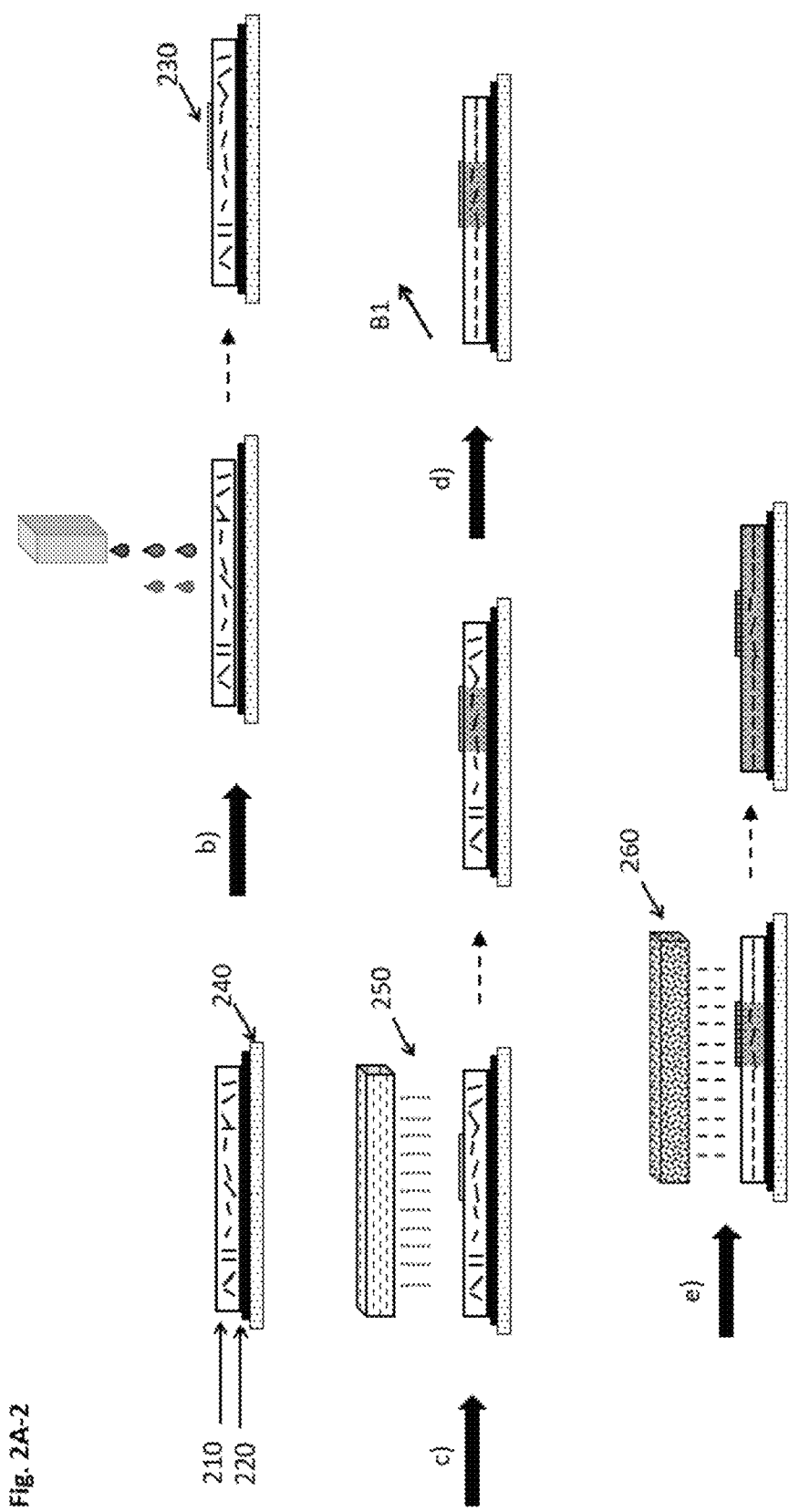

According to one embodiment and as shown for example in FIGS. 2A1 and 2A2, the method described herein consists of the following steps:

the step a) of applying on the substrate (×20) surface the radiation curable coating composition comprising the non-spherical magnetic or magnetizable pigment particles described herein; subsequently to step a), the step b) of applying the top coating composition in the form of one or more indicia (×30) on top of the coating layer (×10) described herein, partially simultaneously with or subsequently to step b), the step c) of at least partially curing the one or more indicia (×30) and the one or more areas of the coating layer (×10) below said one or more indicia (×30) with the LED curing unit (×50) described herein, subsequently to step c), the step d) of exposing the coating layer (×10) to the magnetic field of a magnetic-field generating device (B1) so as to orient at least a part of the magnetic or magnetizable pigment particles described herein in the areas of the coating layer (×10) not below said one or more indicia (×30), wherein said step d) may carried out to so as to mono-axially orient (FIG. 2A1), bi-axially orient (FIG. 2A2), bi-axially then mono-axially orient (two steps, not shown) or simultaneously bi-axially and mono-axially orient (one step, not shown) at least a part of the magnetic or magnetizable pigment particles described herein; and partially simultaneously with or subsequently to step d), the step e) of at least partially curing the coating layer (×10) with the curing unit (×60) at least emitting between 250 nm and 320 nm described herein.

According to one embodiment, the method described herein may further comprise a step of exposing the coating layer (×10) to a magnetic field of a magnetic-field generating device so as to orient at least a part of the magnetic or magnetizable pigment particles, said step being carried out subsequently to or partially simultaneously with step b) and prior to step c).

Figure 2B:
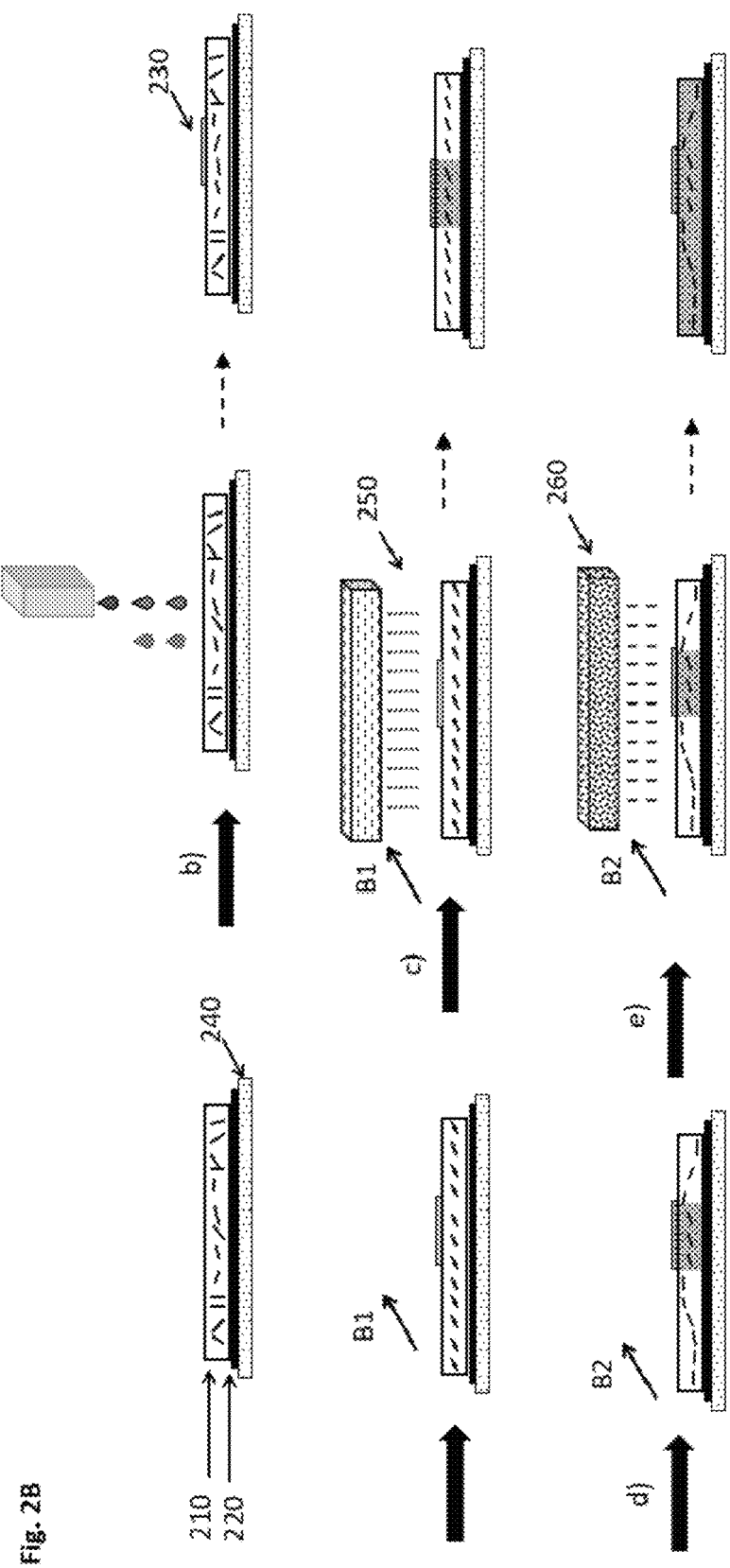
FIG. 2B schematically illustrates a method for producing an optical effect layer (OEL) on a substrate (220) according to the present invention. The method comprises a step b) of applying a top coating composition on top of the coating layer (210), wherein said top coating composition is applied in the form of one or more indicia (230); subsequently to step b), a step of exposing the coating layer (210) to a magnetic field of a magnetic-field generating device (B1) so as to orient at least a part of the non-spherical magnetic or magnetizable pigment particles; partially simultaneously with said orientation step, a step c) of at least partially curing the one or more indicia (230) and the one or more areas of the coating layer (210) below said one or more indicia (230) with a LED curing unit (250) while maintaining the magnetic-field generating device (B1) in the vicinity of the coating layer (210); subsequently to step c), a step d) exposing the coating layer (210) to a magnetic field of a second magnetic-field generating device (B2) so as to orient at least a part of the magnetic or magnetizable pigment particles in the not yet cured areas of the coating layer (210); and partially simultaneously with to step d), a step e) of at least partially curing the coating layer (210) with a Hg curing unit (260) while maintaining the magnetic-field generating device (B2) in the vicinity of the coating layer (210).

According to one embodiment shown for example in FIG. 2B, the method described herein consists of the following steps:

the step a) of applying on the substrate (×20) surface the radiation curable coating composition comprising the non-spherical magnetic or magnetizable pigment particles described herein; subsequently to step a), the step b) of applying the top coating composition in the form of one or more indicia (×30) on top of the coating layer (×10) described herein, subsequently to or partially simultaneously with step b), a step of exposing the coating layer (×10) to the magnetic field of a magnetic-field generating device (B1) so as to orient at least a part of the magnetic or magnetizable pigment particles described herein, wherein said step may be carried out to so as to mono-axially orient (FIG. 2B), bi-axially orient (not shown), bi-axially then mono-axially orient (two steps, not shown) or simultaneously bi-axially and mono-axially orient (one step, not shown) at least a part of the magnetic or magnetizable pigment particles described herein subsequently to step b) and the orientation step with the magnetic-field generating device (B1) described above, the step c) of at least partially curing the one or more indicia (×30) and the one or more areas of the coating layer (×10) below said one or more indicia (×30) with the LED curing unit (×50) described herein, subsequently to step c), the step d) of exposing the coating layer (×10) to the magnetic field of a second magnetic-field generating device (B2) so as to orient at least a part of the magnetic or magnetizable pigment particles described herein in the areas of the coating layer (×10) not below said one or more indicia (×30), wherein said step d) may carried out to so as to mono-axially orient (FIG. 2B), bi-axially orient (not shown), bi-axially then mono-axially orient (two steps, not shown) or simultaneously bi-axially and mono-axially orient (one step, not shown) at least a part of the magnetic or magnetizable pigment particles described herein; and partially simultaneously with or subsequently to step d), the step e) of at least partially curing the coating layer (×10) with the curing unit (×60) at least emitting between 250 nm and 320 nm described herein.

According to another embodiment, the method described herein may further comprise a step of exposing the coating layer (×10) to a magnetic field of a magnetic-field generating device so as to orient at least a part of the magnetic or magnetizable pigment particles, said step being carried out subsequently to step a) and prior to step b).

According to one embodiment shown for example in FIG. 2C/2D/2E/2J/2K, the method described herein consists of the following steps:

the step a) of applying on the substrate (×20) surface the radiation curable coating composition comprising the non-spherical magnetic or magnetizable pigment particles described herein;

subsequently to step a), a step of exposing the coating layer (×10) to the magnetic field of a magnetic-field generating device (B1) so as to orient at least a part of the magnetic or magnetizable pigment particles described herein, wherein said step may carried out so as to mono-axially orient (FIGS. 2C and D), bi-axially orient (FIG. 2E), bi-axially then mono-axially orient (two steps, FIGS. 2J and 2K) or simultaneously bi-axially and mono-axially orient (one step, not shown) at least a part of the magnetic or magnetizable pigment particles described herein, partially simultaneously with or subsequently to the orientation step with the magnetic-field generating device (B1) described above, the step b) of applying the top coating composition in the form of one or more indicia (×30) on top of the coating layer (×10) described herein, subsequently to step b), the step c) of at least partially curing the one or more indicia (×30) and the one or more areas of the coating layer (×10) below said one or more indicia (×30) with the LED curing unit (×50) described herein, subsequently to step c), the step d) of exposing the coating layer (×10) to the magnetic field of a second magnetic-field generating device (B2, FIG. 2C/2E), of a third magnetic-field generating device (B3, FIG. 2J/2K), or of a second and third magnetic-field generating devices B2 and then B3 FIG. 2D) so as to orient at least a part of the magnetic or magnetizable pigment particles described herein, wherein said step d) may carried out to so as to mono-axially orient (FIG. 2C/2E/2J/2K), bi-axially orient (not shown), bi-axially then mono-axially orient (two steps, FIG. 2D) or simultaneously bi-axially and mono-axially orient (one step, not shown) at least a part of the magnetic or magnetizable pigment particles described herein in the areas of the coating layer (×10) not below said one or more indicia (×30); and partially simultaneously with or subsequently to step d), the step e) of at least partially curing the coating layer (×10) with the curing unit (×60) at least emitting between 250 nm and 320 nm described herein.

Figure 2F:
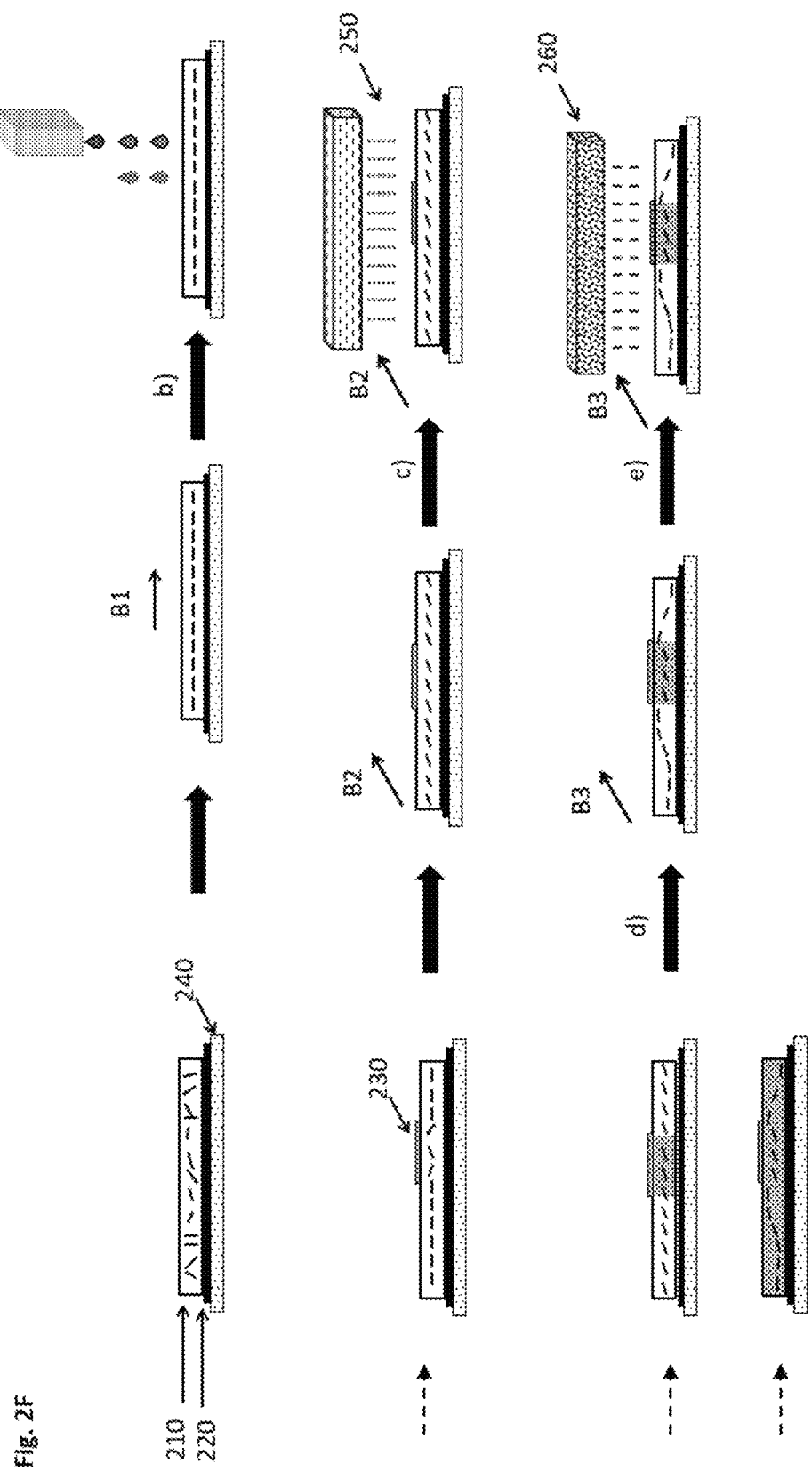
Figure 21:
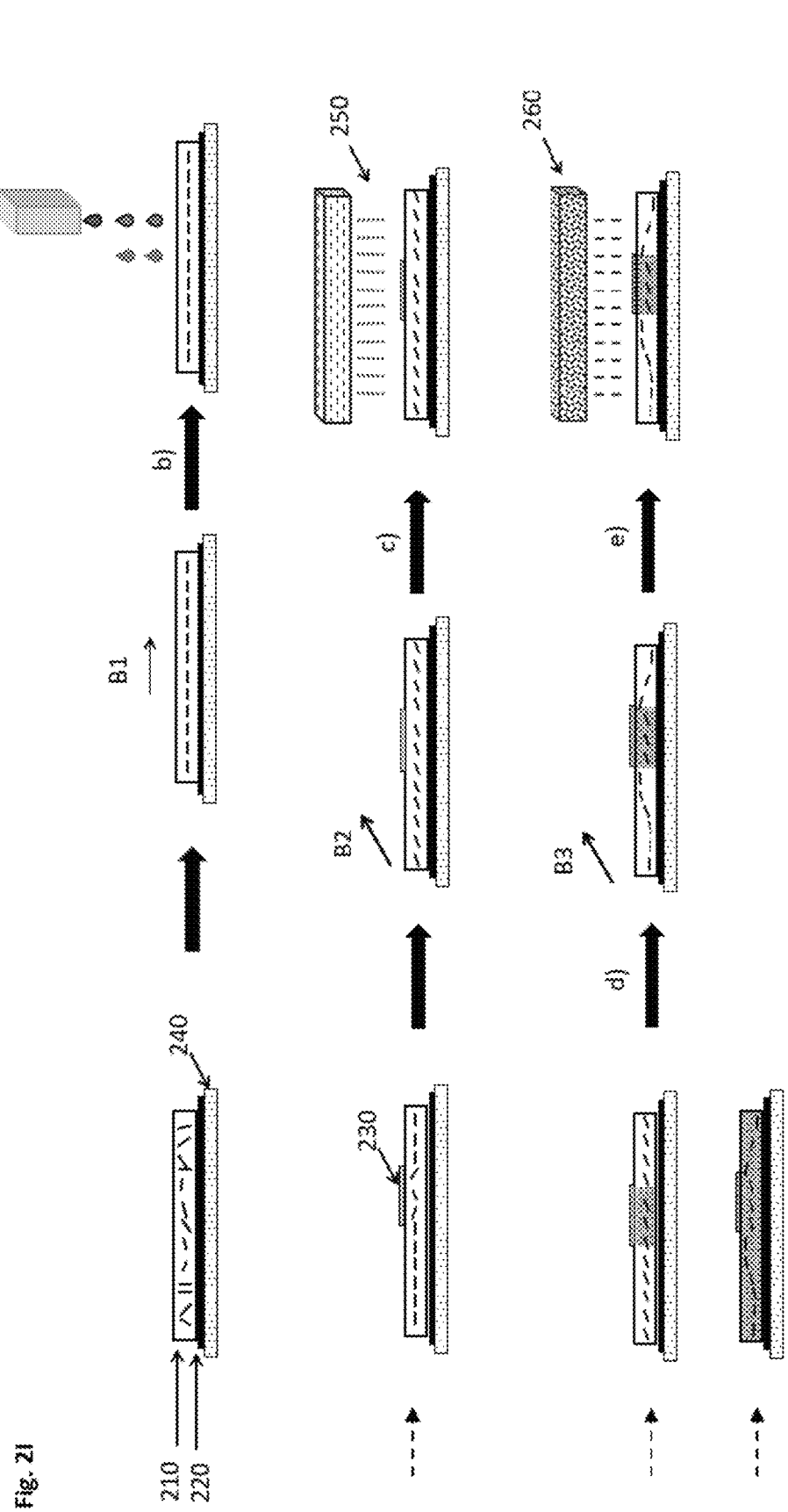

According to one embodiment shown for example in FIGS. 2F/2G/2H/2I, the method described herein consists of the following steps:

- the step a) of applying on the substrate (×20) surface the radiation curable coating composition comprising the non-spherical magnetic or magnetizable pigment particles described herein; subsequently to step a), a step of exposing the coating layer (×10) to the magnetic field of a magnetic-field generating device (B1) so as to orient at least a part of the magnetic or magnetizable pigment particles described herein, wherein said step may carried out to so as to mono-axially orient (not shown), bi-axially orient (FIGS. 2F/2G/2H/2I), bi-axially then mono-axially orient (two steps, not shown) or simultaneously bi-axially and mono-axially orient (one step, not shown) at least a part of the magnetic or magnetizable pigment particles described herein,
- partially simultaneously with or subsequently to the orientation step with the magnetic-field generating device (B1) described above, the step b) of applying the top coating composition in the form of one or more indicia (×30) on top of the coating layer (×10) described herein,
- subsequently to step b), the step of exposing the coating layer (×10) to the magnetic field of a second magnetic-field generating device (B2) so as to orient at least a part of the magnetic or magnetizable pigment particles described herein, wherein said step may carried out to so as to mono-axially orient (FIGS. 2F/2G/2H/2I), bi-axially orient (not shown), bi-axially then mono-axially orient (two steps, not shown) or simultaneously bi-axially and mono-axially orient (one step, not shown) at least a part of the magnetic or magnetizable pigment particles described herein;
- partially simultaneously with or subsequently to the step of exposing the coating layer (×10) to the magnetic field of a second magnetic-field generating device (B2), the step c) of at least partially curing the one or more indicia (×30) and the one or more areas of the coating layer (×10) below said one or more indicia (×30) with the LED curing unit (×50) described herein,
- subsequently to the step c), the step d) of exposing the coating layer (×10) to the magnetic field of a third magnetic-field generating device (B3) so as to orient at least a part of the magnetic or magnetizable pigment particles described herein in the areas of the coating layer (×10) not below said one or more indicia (×30), wherein said step d) may be carried out to so as to mono-axially orient (FIGS. 2F/2G/2H/2I), bi-axially orient (not shown), bi-axially then mono-axially orient (two steps, not shown) or simultaneously bi-axially and mono-axially orient (one step, not shown) at least a part of the magnetic or magnetizable pigment particles described herein; and
- partially simultaneously with or subsequently to step d), the step e) of at least partially curing the coating layer (×10) with the curing unit (×60) at least emitting between 250 nm and 320 nm described herein.

The three following steps: step a) of applying on the substrate (×20) surface the radiation curable coating composition comprising the non-spherical magnetic or magnetizable pigment particles described herein; subsequently to step a), the step b) of applying the top coating composition in the form of one or more indicia (×30) on top of the coating layer (×10) described herein, partially simultaneously with or subsequently to step b), the step c) of at least partially curing the one or more indicia (×30) and the one or more areas of the coating layer (×10) below said one or more indicia (×30) with the LED curing unit (×50) described herein may be carried out more than once, wherein said method with more than one steps a)-c) described herein further comprise, subsequently to the last step c), the step d) of exposing the coating layer (×10) to the magnetic field of a magnetic-field generating device (B1) so as to orient at least a part of the magnetic or magnetizable pigment particles described herein in the areas of the coating layer (×10) not below said one or more indicia (×30), wherein said step d) may carried out to so as to mono-axially orient, bi-axially orient, bi-axially then mono-axially orient or simultaneously bi-axially and mono-axially orient at least a part of the magnetic or magnetizable pigment particles described herein; and partially simultaneously with or subsequently to step d), the step e) of at least partially curing the coating layer (×10) with the curing unit (×60) at least emitting between 250 nm and 320 nm described herein.

Alternatively, the steps a) and b) may be interchanged, i.e. the method the method described herein consists of the following steps:

- the step of applying on the substrate surface the top coating composition in the form of the one or more indicia described herein,
- the step of applying the radiation curable coating composition comprising the non-spherical magnetic or magnetizable pigment particles described herein on top of the one or more indicia;
- the step of exposing the coating layer to the magnetic field of a magnetic-field generating device so as to orient at least a part of the magnetic or magnetizable pigment particles described herein, wherein said step may carried out to so as to mono-axially orient, bi-axially orient or bi-axially then mono-axially, or simultaneously bi-axially and mono-axially orient at least a part of the magnetic or magnetizable pigment particles described herein;
- partially simultaneously with or subsequently to the orientation step, the step of at least partially curing the one or more indicia and the one or more areas of the coating layer (×10) on top of said one or more indicia (×30) with the LED curing unit (×50) described herein,
- subsequently the step of exposing the coating layer (×10) to the magnetic field of a magnetic-field generating device so as to orient at least a part of the magnetic or magnetizable pigment particles described herein in the areas of the coating layer (×10) not above said one or more indicia (×30), wherein said step may carried out to so as to mono-axially orient, bi-axially orient or bi-axially then mono-axially or simultaneously bi-axially and mono-axially orient at least a part of the magnetic or magnetizable pigment particles described herein; and
- partially simultaneously with or subsequently to the orientation step, the step of at least partially curing the coating layer (×10) with the curing unit (×60) at least emitting between 250 nm and 320 nm described herein.

Alternatively, the step of at least partially curing the coating layer (×10) with the curing unit (×60) at least emitting between 250 nm and 320 nm described herein may be replaced by a step of at least partially curing the coating layer (×10) with the LED curing unit (×50) described herein provided that a second step of applying a top coating composition as described herein on the whole surface of the coating layer (×10) is carried out after the step of at least partially curing the one or more indicia (×30) and the one or more areas of the coating layer (×10) below said one or more indicia (×30) with the LED curing unit (×50). For example, the method described herein consists of the following steps:

the step of applying on the substrate surface the radiation curable coating composition comprising the non-spherical magnetic or magnetizable pigment particles described herein;

subsequently to said step, a step of exposing the coating layer (×10) to the magnetic field of a magnetic-field generating device (B1) so as to orient at least a part of the magnetic or magnetizable pigment particles described herein, wherein said step may carried out to so as to mono-axially orient, bi-axially orient, bi-axially then mono-axially orient or simultaneously bi-axially and mono-axially orient, preferably so as to bi-axially orient, at least a part of the magnetic or magnetizable pigment particles described herein, partially simultaneously with or subsequently to the orientation step with the magnetic-field generating device (B1) described above, the step of applying a top coating composition as described herein in the form of one or more indicia (×30) on top of the coating layer (×10) described herein, subsequently to said step, the step of exposing the coating layer (×10) to the magnetic field of a second magnetic-field generating device (B2) so as to orient at least a part of the magnetic or magnetizable pigment particles described herein, wherein said step may carried out to so as to mono-axially orient bi-axially then mono-axially orient or simultaneously bi-axially and mono-axially orient, preferably mono-axially orient, at least a part of the magnetic or magnetizable pigment particles described herein;

partially simultaneously with or subsequently to the step of exposing the coating layer (×10) to the magnetic field of a second magnetic-field generating device (B2), a step of at least partially curing the top coating composition and the underlying coating layer (×10) with a LED curing unit (×50) described herein;

subsequently to said step, the step of applying a top coating composition as described herein on top of the whole surface of the coating layer (×10) described herein;

subsequently to said step, the step of exposing the coating layer (×10) to the magnetic field of a third magnetic-field generating device (B3) so as to orient at least a part of the magnetic or magnetizable pigment particles described herein, wherein said step may carried out to so as to mono-axially orient bi-axially orient or simultaneously bi-axially and mono-axially orient, preferably mono-axially orient, at least a part of the magnetic or magnetizable pigment particles described herein; and partially simultaneously with or subsequently to said step, the step of at least partially curing the top coating composition and the coating layer (×10) with the LED curing unit (×50) described herein.

The present invention provides the methods described herein to produce optical effect layers (OELs) exhibiting one or more indicia (×30) on the substrates (×20) described herein and substrates (×20) comprising one or more optical effect layers (OELs) obtained thereof. The substrate (×20) described herein is preferably selected from the group consisting of papers or other fibrous materials (including woven and non-woven fibrous materials), such as cellulose, paper-containing materials, glasses, metals, ceramics, plastics and polymers, metallized plastics or polymers, composite materials and mixtures or combinations of two or more thereof. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents. According to another embodiment, the substrate (×20) described herein is based on plastics and polymers, metallized plastics or polymers, composite materials and mixtures or combinations of two or more thereof. Suitable examples of plastics and polymers include polyolefins such as polyethylene (PE) and polypropylene (PP) including biaxially oriented polypropylene (BOPP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate. Typical examples of metalized plastics or polymers include the plastic or polymer materials described hereabove having a metal disposed continuously or discontinuously on their surface. Typical examples of metals include without limitation aluminum (Al), chromium (Cr), copper (Cu), gold (Au), silver (Ag), alloys thereof and combinations of two or more of the aforementioned metals. The metallization of the plastic or polymer materials described hereabove may be done by an electrodeposition process, a high-vacuum coating process or by a sputtering process. Typical examples of composite materials include without limitation multilayer structures or laminates of paper and at least one plastic or polymer material such as those described hereabove as well as plastic and/or polymer fibers incorporated in a paper-like or fibrous material such as those described hereabove. Of course, the substrate can comprise further additives that are known to the skilled person, such as fillers, sizing agents, whiteners, processing aids, reinforcing or wet strengthening agents, etc. When the OELs exhibiting one or more indicia (×30) produced according to the present invention are used for decorative or cosmetic purposes including for example fingernail lacquers, said OEL may be produced on other type of substrates including nails, artificial nails or other parts of an animal or human being.

Also described herein are methods of manufacturing a security document or a decorative element or object, comprising a) providing a security document or a decorative element or object, and b) providing the one or more optical effect layers described herein, in particular such as those obtained by the method described herein, so that it is comprised by the security document or decorative element or object.

Should the OEL produced according to the present invention be on a security document or article, and with the aim of further increasing the security level and the resistance against counterfeiting and illegal reproduction of said security document or article, the substrate may comprise printed, coated, or laser-marked or laser-perforated indicia, watermarks, security threads, fibers, planchettes, luminescent compounds, windows, foils, decals and combinations of two or more thereof. With the same aim of further increasing the security level and the resistance against counterfeiting and illegal reproduction of security documents and articles, the substrate may comprise one or more marker substances or taggants and/or machine readable substances (e.g. luminescent substances, UV/visible/IR absorbing substances, magnetic substances and combinations thereof).

If desired, a primer layer may be applied to the substrate prior to the step a). This may enhance the quality of the OEL described herein or promote adhesion. Examples of such primer layers may be found in WO 2010/058026 A2.

With the aim of increasing the durability through soiling or chemical resistance and cleanliness and thus the circulation lifetime of a security document, article or a decorative element or object comprising the OEL obtained by the method described herein, or with the aim of modifying their aesthetical appearance (e.g. optical gloss), one or more protective layers may be applied on top of the OEL. When present, the one or more protective layers are typically made of protective varnishes. Protective varnishes may be radiation curable compositions, thermal drying compositions or any combination thereof. Preferably, the one or more protective layers are radiation curable compositions, more preferable UV-Vis curable compositions. The protective layers are typically applied after the formation of the OEL.

The present invention further provides optical effect layers (OELs) exhibiting the one or more indicia (×30) described herein and produced by the methods described herein. The shape of the optical effect layers (OELs) described herein may be continuous or discontinuous. According to one embodiment, the shape of the coating layer (×10) represent one or more indicia, dots and/or lines, wherein said indicia may have the same shape as the one or more indicia (×30) made of the top coating composition described herein or may have a different shape.

The OEL exhibiting one or more indicia (×30) described herein may be provided directly on a substrate on which it shall remain permanently (such as for banknote applications). Alternatively, an optical effect layer may also be provided on a temporary substrate for production purposes, from which the OEL is subsequently removed. This may for example facilitate the production of the optical effect layer (OEL), particularly while the binder material is still in its fluid state. Thereafter, after curing of the coating composition for the production of the OEL, the temporary substrate may be removed from the OEL.

Alternatively, in another embodiment an adhesive layer may be present on the exhibiting one or more indicia (×30) or may be present on the substrate comprising the OEL, said adhesive layer being on the side of the substrate opposite to the side where the OEL is provided or on the same side as the OEL and on top of the OEL. Therefore, an adhesive layer may be applied to the OEL or to the substrate, said adhesive layer being applied after the curing step has been completed. Such an article may be attached to all kinds of documents or other articles or items without printing or other processes involving machinery and rather high effort. Alternatively, the substrate described herein comprising the OEL described herein may be in the form of a transfer foil, which can be applied to a document or to an article in a separate transfer step. For this purpose, the substrate is provided with a release coating, on which the OELs are produced as described herein. One or more adhesive layers may be applied over the so produced optical effect layer.

Also described herein are substrates comprising more than one, i.e. two, three, four, etc. optical effect layers (OELs) obtained by the method described herein.

Also described herein are articles, documents, in particular security documents, decorative elements and decorative objects comprising the optical effect layer (OEL) produced according to the present invention. The articles, in particular security documents, decorative elements or objects, may comprise more than one (for example two, three, etc.) OELs produced according to the present invention.

As mentioned hereabove, the OEL produced according to the present invention may be used for decorative purposes as well as for protecting and authenticating a security document.

Typical examples of decorative elements or objects include without limitation luxury goods, cosmetic packaging, automotive parts, electronic/electrical appliances, furniture and fingernail articles.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets, academic diploma or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals. It is pointed out that the disclosed substrates, value documents and value commercial goods are given exclusively for exemplifying purposes, without restricting the scope of the invention.

Alternatively, the optical effect layer (OEL) described herein may be produced onto an auxiliary substrate such as for example a security thread, security stripe, a foil, a decal, a window or a label and consequently transferred to a security document in a separate step.

The skilled person can envisage several modifications to the specific embodiments described above without departing from the spirit of the present invention. Such modifications are encompassed by the present invention.

Further, all documents referred to throughout this specification are hereby incorporated by reference in their entirety as set forth in full herein.

EXAMPLES

The present invention is now described in more details with reference to non-limiting examples. The Examples below provide more details for the production of optical effects layers (OELs) exhibiting one or more indicia in the form of a rectangle. Screen printing compositions comprising magnetic pigment particles (7-layers green-to-blue platelet-shaped optically variable magnetic pigment particles having a flake shape of diameter $d_{50}$ about 10.7 μm and thickness about 1 μm, obtained from VIAVI Solutions, Santa Rosa, CA; and 5-layer silver magnetic pigment particles having a flake shape of diameter $d_{50}$ about 19 μm and thickness about 1 μm, obtained from VIAVI Solutions, Santa Rosa, CA) have been prepared and are described in Table 1A. Top coating inkjet printing composition have been prepared and are described in Tables 1 B-1 and 1 B-2.

TABLE 1A

| ingredients | screen printing composition | | | | | | | |
|---|---|---|---|---|---|---|---|---|
| | SP0a | SP0b | SP1 | SP2 wt-% | SP3 | SP4 | SP5 | SP6 |
| UviCure S105ES; 7-oxabicyclo[4.1.0]hept-3-ylmethyl 7-oxabicyclo[4.1.0]heptane-3-carboxylate) (Lambson) [CAS Nr 2386-87-0] | 60.6 | 56.2 | 56.2 | 56.2 | 56.2 | 56.2 | 56.2 | 56.2 |
| diethylene glycol divinyl ether; (BASF) [CAS Nr 764-99-8] | 4.3 | 4.0 | 4.0 | 4.0 | 4.0 | 4.0 | 4.0 | 4.0 |
| POLYOL R4631; ethoxylated and propoxylated pentaerythritol (Perstorp) [CAS Nr 30374-35-7] | 8.8 | 8.2 | 8.2 | 8.2 | 8.2 | 8.2 | 8.2 | 8.2 |
| UviCure S130; 3-ethyloxetane-3-methanol (Lambson) [CAS Nr 3047-32-3] | 4.3 | 4.0 | 4.0 | 4.0 | 4.0 | 4.0 | 4.0 | 4.0 |
| Aerosil ® 200; fumed silica (Evonik) | 1.7 | 1.6 | 1.6 | 1.6 | 1.6 | 1.6 | 1.6 | 1.6 |
| TEGO ® Airex 900; anti-foaming agent (Evonik) [CAS Nr 67762-90-7] | 2.2 | 2.0 | 2.0 | 2.0 | 2.0 | 2.0 | 2.0 | 2.0 |
| propylene carbonate [CAS Nr 108-32-7] | 1.6 | 4.5 | 4.5 | 4.5 | 1.5 | 4.5 | 7.2 | 4.2 |
| magnetic pigment particles 7-layers | 16.5 | 16.5 | 16.5 | | 16.5 | 16.5 | 16.5 | 16.5 |
| magnetic pigment particles 5-layers | | | | 16.5 | | | | |
| bis(4-methylphenyl)iodonium hexafluorophosphate [CAS Nr 60565-88-0]* (from OMNICAT 440, IGM) | | | 3.0 | 3.0 | | | | 3.0 |
| bis(4-dodecylphenyl)iodonium hexafluoroantimonate [CAS Nr 71786-70-4]* (from DEUTERON UV1242, (DEUTERON) | | | | | | 6.0 | | |
| tris[4-(4-acetylphenylsulfanyl)phenyl]-sulfonium hexafluorophosphate [CAS Nr 953084-13-4]* (from OMNICAT 270, IGM) | | 3.0 | | | | | | |
| bis[4-(diphenylsulfonium)phenyl] sulfide bishexafluoroantimonate [CAS Nr 89452-37-9)]* and 4-(phenylthio)phenyldiphenylsulfonium hexafluoroantimonate [CAS Nr 71449-78-0]* (from SpeedCure 976, Lambson) | | | | | | | 3.0 | |
| 1-chloro-4-propoxy-9H-thioxanthen-9-one [CAS Nr 142770-42-1]* (from SpeedCure CPTX, Lambson) | | | | | | | 0.3 | 0.3 |
| Viscosity/mPas | 242 | 485 | 302 | 362 | 461 | 287 | 227 | 310 |

*the wt-% provided in the table correspond to the active compound described by its CAS number.

TABLE 1B-1

| ingredients | \multicolumn{15}{c}{inkjet top coating composition wt-%} |
|---|---|---|---|---|---|---|---|---|---|---|---|---|---|---|---|

| ingredients | I0 | I1 | I2 | I3 | I4 | I5 | I6 | I7 | I8 | I9 | I10 | I11 | I12 | I13 | I14 |
|---|---|---|---|---|---|---|---|---|---|---|---|---|---|---|---|
| UviCure S140; 3-ethyl-3-[(phenylmethoxy)methyl]-oxetane (Lambson) [CAS Nr 18933-99-8] | 100 | 98.8 | 98.8 | 98.8 | 98.8 | 98.8 | 98.8 | 98.8 | | | 86.8 | 74.8 | 98.8 | 98.8 | 86.8 |
| propylene carbonate [CAS Nr 108-32-7] | | | | | | | | | 88 | 76 | | | | | |
| 1-chloro-4-propoxy-9H-thioxanthan-9-one [CAS Nr 142778-42-1]* (from SpeedCure CPTX, Lambson) | | 1.2 | | | | | | | | | 1.2 | 1.2 | | | 1.2 |
| 4-(1-methylethyl)-9H-thioxanthen-9-one [CAS Nr 83846-86-0]* and 4-(1-methylethyl)-9H-thioxanthen-9-one [CAS Nr 83846-86-0]* (from Omnirad ITX, IGM) | | | 1.2 | | | | | | | | | | | | |
| Polymeric thioxanthone [CAS Nr 2055335-46-9] (from Genopol ® TX-2, Rahn) | | | | 1.2 | | | | | | | | | | | |
| 1,3-di[[α-[1-chloro-9-oxo-9H-thioxanthen-4-yl)oxy]acetylpoly[oxy(1-methylethylene)]]oxy]-2,2-bis[[α-[1-cloro-9-oxo-9H-thioxanthen-4-yl)oxy]acetylpoly[oxy(1-methylethylene)]]oxymethylpropane [CAS Nr 1003567-83-6]* (from SpeedCure 7010, Lambson) | | | | | 1.2 | | | | | | | | | | |
| 9,10-dibutoxy-anthracene [CAS Nr 76275-14-4]* (from ANTHRACURE ® UVS 1331, Kawasaki Kasei Chemicals Ltd) | | | | | | 1.2 | | | | | | | | 0.3 | |
| 3-(4-C10-C13-benzoyl)-5,7-dimethoxy-2H-1-benzopyran-2-one [CAS Nr 2243703-91-3]* (from ESACURE 3644, IGM) | | | | | | | 1.2 | | | | | | | | |
| 9,10-diethoxy-naphthalene) [CAS Nr 27294-37-7]* (from ANTHRACURE ® ET 2201, Kawasaki Kasei Chemicals | | | | | | | | 1.2 | | | | | 1.2 | 0.9 | |
| bis(4-methylphenyl)iodonium hexafluorophosphate [CAS Nr 60565-88-0]* (from OMNICAT 440, IGM) | | | | | | | | | 12 | | 12 | | | | |
| bis[4-(diphenylsulfonium)phenyl] sulfide bishexafluoroantimonate [CAS Nr 89452-37-91 and 4-(phenylthio)phenyldiphenylsulfonium hexafluoroantimonate [CAS Nr 71449-78-0]* (from SpeedCure 976, Lambson) | | | | | | | | | | 24 | | 24 | | | |
| tris[4-(4-acetylphenylsultanyl)phenyl]-sulfonium hexafluorophosphate [CAS Nr 953084-13-4]* (from OMNICAT 270, IGM) | | | | | | | | | | | | | | | 12 |
| Viscosity/mPas | 8.9 | 8.9 | 8.9 | 8.9 | 8.9 | 8.9 | 8.9 | 8.9 | 4.2 | 3.9 | 8.9 | 8.9 | 8.9 | 8.9 | 8.9 |

*the wt-% provided in the table correspond to the active compound described by its CAS number.

TABLE 1B-2

| ingredients | I15 | I16 | I17 | I18 |
|---|---|---|---|---|
| UviCure S140; 3-ethyl-3-[(phenylmethoxy)methyl]-oxetane (Lambson) [CAS Nr 18933-98-8] | 86.8 | | 48.8 | 88 |
| propylene carbonate [CAS Nr 108-32-7] | | 95 | 50 | |
| 1-chloro-4-propoxy-9H-thioxanthen-9-one [CAS Nr 142770-42-1]* (from SpeedCure CPTX, Lambson) | | | | |
| 4-(1-methylethyl)-9H-thioxanthen-9-one [CAS Nr 83846-86-0]* and 4-(1-methylethyl)-9H-thioxanthen-9-one [CAS Nr 83846-86-0]* (from Omnirad ITX, IGM) | | | | |
| Polymeric thioxanthone (CAS Nr 2055335-46-9] (from Genopol ® TX-2, Rahn) | | | | |

TABLE 1B-2-continued

| | inkjet top coating composition | | | |
|---|---|---|---|---|
| ingredients | I15 | I16 | I17 | I18 |
| 1,3-di[[α-[1-chloro-9-oxo-9H-thioxanthen-4-yl)oxy]acetylpoly[oxy(1-methylethylene)]]oxy]-2,2-bis[[α-[1-cloro-9-oxo-9H-thioxanthen-4-yl)oxy]acetylpoly[oxy(1-methylethylene)]]oxymethylpropane [CAS Nr 1003567-83-6]* (from SpeedCure 7010, Lambson) | | | | |
| 9,10-dibutoxy-anthracene [CAS Nr 76275-14-4]* (from ANTHRACURE ® UVS 1331, Kawasaki Kasei Chemicals Ltd) | | | | |
| 3-(4-$C_{10}$-$C_{13}$-benzoyl)-5,7-dimethoxy-2H-1-benzopyran-2-one [CAS Nr 2243703-91-3]* (from ESACURE 3644, IGM) | 1.2 | | | |
| 9,10-diethoxy-naphthalene ) [CAS Nr 27294-37-7]* (from ANTHRACURE ® ET 2201, Kawasaki Kasei Chemicals | | | | |
| bis(4-methylphenyl)iodonium hexafluorophosphate [CAS Nr 60565-88-0]* (from OMNICAT 440, IGM) | 12 | | | |
| bis[4-(diphenylsulfonium)phenyl] sulfide bishexafluoroantimonate [CAS Nr 89452-37-9] and 4-(phenylthio)phenyldiphenylsulfonium hexafluoroantimonate [CAS Nr 71448-78-0]* (from SpeedCure 976, Lambson) | | | | |
| tris(4-(4-acetylphenylsulfanyl)phenyl]-sulfonium hexafluorophosphate [CAS Nr 953084-13-4]* (from OMNICAT 270, IGM) | | | 12 | |
| [(7-methoxy-4-methyl-2-oxo-2H-1-benzopyran-3-yl)phenyl]iodonium hexafluoroantimonate [CAS Nr 2091854-13-4] (Sylanto ® 7MS, Synthos Group S.A.) | | 5 | | |
| 2,4,6-triphenylpyrylium tetrafluoroborate [CAS Nr. 448-61-3] (Sigma) | | | 1.2 | |
| Viscosity/mPas | 8.9 | 2.5 | 4.4 | 8.9 |

*the wt-% provided in the table correspond to the active compound described by its CAS number.

TABLE 2

| Primer composition/Ingredients | wt % |
|---|---|
| UviCure S105ES 7-oxabicyclo[4.1.0]hept-3-ylmethyl 7-oxabicyclo[4.1.0]heptane-3-carboxylate (Lambson) [CAS Nr 2386-87-0] | 46.05 |
| VINNOL ® H14/36 (Wacker Polymer Systems Gmbh & Co. KG) (CAS Nr not available) | 6.2 |
| Diethylene glycol divinyl ether (BASF) [CAS Nr 764-99-8] | 18.8 |
| EBECRYL ® 2959 (epoxy acrylate oligomer) (Allnex) (CAS Nr not available) | 3.8 |
| MIRAMER M4004 pentaerythritol (EO)$_n$ tetraacrylate (Rahn) [CAS Nr 51728-26-8] | 3.8 |
| TEGO ® Airex 900 anti-foaming agent (Evonik) [CAS Nr 67762-90-7] | 0.2 |
| GENORAD* 16 polymerization inhibitor (Rahn) (CAS Nr not available) | 0.5 |
| AEROSIL ® R972 fumed silica post-treated with dimethyldichlorosilane (Evonik) [CAS Nr 68 911-44-9] | 1.9 |
| ACEMATT ® OK 607 high performance silica (Evonik) [CAS Nr 11 2926-008-8] | 5.4 |
| SilForce* UV9388C bis(4-tert-butylphenyl)iodonium hexafluorophosphate (Momentive) [CAS Nr 61358-25-6] | 1.7 |
| OMNIRAD 1173-hydroxy-2-methylpropiophenone (IGM) [CAS Nr 7473-98-5] | 2.3 |
| SpeedCure CPTX 1-Chloro-4-propoxythioxanthone (Lambson) [CAS Nr 142770-42-1] | 0.15 |
| Ethyl 3-ethoxypropionate [CAS Nr 763-69-9] | 1.6 |
| Terathane 1000 (Invista) [CAS Nr 25190-06-1] | 5.7 |
| Butanol [CAS Nr 71-36-3] | 1.9 |
| Viscosity/mPas | 400 |

Preparation of the Compositions

The screen printing compositions were independently prepared by mixing the ingredients listed in Table 1A for 10 minutes at 2000 rpm using Dispermat CV-3.

The inkjet top coating printing compositions were independently prepared by mixing the ingredients listed in Tables 1 B1 and 1 B2 for 10 minutes at room temperature and at 1000 rpm using a Dispermat LC220-12.

The primer composition was prepared by mixing the ingredients listed in Table 2 for 10 minutes at 2000 rpm using Dispermat CV-3.

The viscosities of the compositions were independently measured at 25° C. on a Brookfield viscometer (model "DV-I Prime", spindle S27 at 100 rpm for screen printing compositions and primer composition, and S00 at 50 rpm for top coating inkjet printing compositions) and are provided in Tables 1A/B and Table 2.

Methods of Preparation of the Optical Effect Layers (OELs)

Optical effect layers (OELs) have been prepared according to methods of the invention (E1-E36) and according to comparative methods (C1-C26). Tables 5A1-5A4 provide summaries of i) the combination of compositions used during the methods, ii) the figure schematically illustrating the method itself, iii) the substrate onto which the screen printing composition was applied and iv) the magnetic-field generating device(s) used during the magnetic orientation step(s).

TABLE 5A1

| | screen printing ink composition described in Table 1A | inkjet printing composition described in Table 1B-1 | Method described in | Substrate | Magnetic-field-generating device (B1) |
|---|---|---|---|---|---|
| E1 | SP1 | I1 | FIG. 2A1 | S1 | MD2 |
| E2 | SP2 | I1 | FIG. 2A1 | S1 | MD2 |
| E3 | SP1 | I3 | FIG. 2A1 | S1 | MD2 |
| E4 | SP1 | I10 | FIG. 2A1 | S1 | MD2 |
| E5 | SP1 | I5 | FIG. 2A1 | S1 | MD2 |

TABLE 5A1-continued

| screen printing ink composition described in Table 1A | inkjet printing composition described in Table 1B-1 | Method described in | Substrate | Magnetic-field-generating device (B1) |
|---|---|---|---|---|
| E6 | SP1 | I6 | FIG. 2A1 | S1 | MD2 |
| E7 | SP1 | I13 | FIG. 2A1 | S1 | MD2 |
| E8 | SP3 | I2 | FIG. 2A1 | S1 | MD2 |
| E9 | SP3 | I4 | FIG. 2A1 | S1 | MD2 |
| E10 | SP4 | I5 | FIG. 2A1 | S1 | MD2 |
| E11 | SP4 | I10 | FIG. 2A1 | S1 | MD2 |
| E12 | SP4 | I13 | FIG. 2A1 | S1 | MD2 |
| E13 | SP1 | I14 | FIG. 2A1 | S1 | MD2 |
| E14 | SP4 | I14 | FIG. 2A1 | S1 | MD2 |
| C1 | SP1 | I0 | method 1 | S1 | MD2 |
| C2 | SP1 | I7 | method 1 | S1 | MD2 |
| C3 | SP3 | I7 | method 1 | S1 | MD2 |
| C4 | SP4 | I0 | method 1 | S1 | MD2 |
| C5 | SP4 | I1 | method 1 | S1 | MD2 |
| C6 | SP4 | I11 | method 1 | S1 | MD2 |
| C7 | SP4 | I7 | method 1 | S1 | MD2 |
| C8 | SP4 | I6 | method 1 | S1 | MD2 |
| C9 | SP5 | I0 | method 1 | S1 | MD2 |
| C10 | SP5 | I8 | method 1 | S1 | MD2 |
| C11 | SP5 | I9 | method 1 | S1 | MD2 |
| C12 | SP5 | I10 | method 1 | S1 | MD2 |
| C13 | SP5 | I11 | method 1 | S1 | MD2 |
| C14 | SP6 | I0 | method 1 | S1 | MD2 |
| C15 | SP0-a | I8 | method 1 | S1 | MD2 |
| C16 | SP0-a | I9 | method 1 | S1 | MD2 |
| C17 | SP0-a | I10 | method 1 | S1 | MD2 |
| C18 | SP0-a | I11 | method 1 | S1 | MD2 |
| C19 | SP0-a | I0 | method 1 | S1 | MD2 |
| C20 | SP0-b | I6 | method 1 | S1 | MD2 |

TABLE 5A2

Figure 2K:
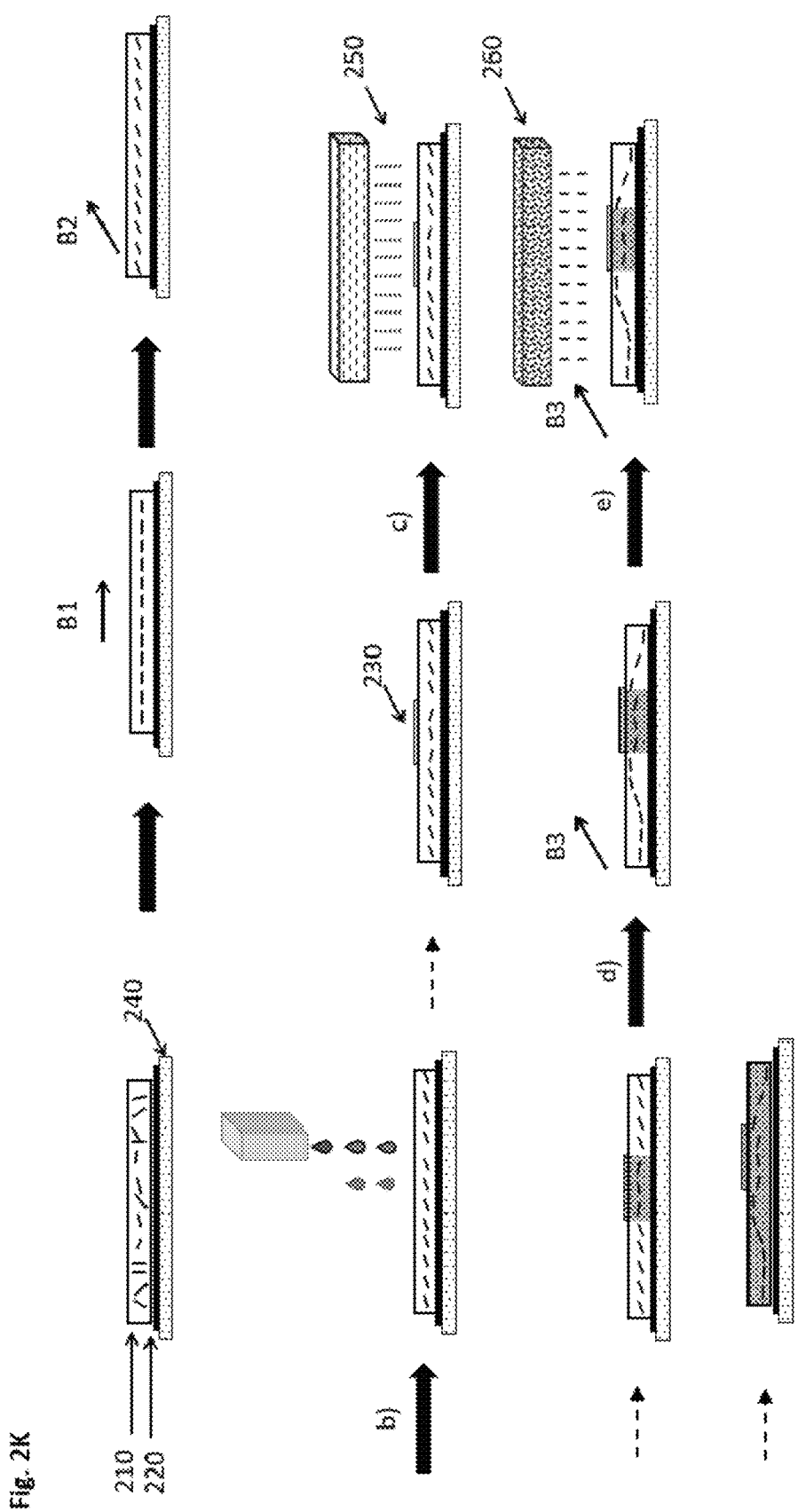
FIG. 2K schematically illustrates a method for producing an optical effect layer (OEL) on a substrate (220) according to the present invention. The method comprises a step of exposing the coating layer (210) to a magnetic field of a magnetic-field generating device (B1) so as to bi-axially orient at least a part of the non-spherical magnetic or magnetizable pigment particles; subsequently to said step, step of exposing the coating layer (210) to a magnetic field of a second magnetic-field generating device (B2) so as to orient at least a part of the non-spherical magnetic or magnetizable pigment particles; subsequently to said step, a step b) of applying a top coating composition on top of the coating layer (210), wherein said top coating composition is applied in the form of one or more indicia (230); subsequently to step b), a step c) of at least partially curing the one or more indicia (×30) and the one or more areas of the coating layer (210) below said one or more indicia (230) with a LED curing unit (250); subsequently to step c), a step d) of exposing the coating layer (210) to a magnetic field of a third magnetic-field generating device (B3) so as to orient at least a part of the non-spherical magnetic or magnetizable pigment particles in the not yet cured areas of the coating layer (210); and partially simultaneously with step d), a step e) of at least partially curing the coating layer (×10) with a curing unit (260) at least emitting between 250 nm and 320 nm while maintaining the third magnetic-field generating device (B3) in the vicinity of the coating layer (210).

| screen printing ink composition described in Table 1A | inkjet printing composition described in Table 1B-1 | Method described in | Substrate | Magnetic-field-generating device (B1/B2/B3) |
|---|---|---|---|---|
| E15 | SP1 | I1 | FIG. 2B | S1 | MD3/MD2/— |
| E16 | SP1 | I1 | FIG. 2C | S1 | MD3/MD2/— |
| E17 | SP1 | I1 | FIG. 2D | S1 | MD3/MD1/MD2 |
| E18 | SP1 | I1 | FIG. 2E | S1 | MD1/MD2/— |
| E19 | SP1 | I1 | FIG. 2G | S1 | MD1/MD3/MD2 |
| E20 | SP1 | I1 | FIG. 2H | S1 | MD1/MD3/MD2 |
| E21 | SP1 | I1 | FIG. 2I | S1 | MD1/MD3/MD2 |
| E22 | SP1 | I1 | FIG. 2J | S1 | MD1/MD3/MD2 |
| E23 | SP1 | I1 | FIG. 2K | S1 | MD1/MD3/MD2 |
| E24 | SP1 | I5 | FIG. 2F | S1 | MD1/MD3/MD2 |
| E25 | SP4 | I5 | FIG. 2F | S1 | MD1/MD3/MD2 |
| C21 | SP4 | I1 | method 2 | S1 | MD1/MD3/MD2 |
| C22 | SP1 | I0 | method 3 | S1 | MD2/—/— |
| C23 | SP1 | I0 | method 4 | S1 | MD1/MD2/— |
| C24 | SP6 | I0 | method 3 | S1 | MD2/—/— |
| C25 | SP6 | I0 | method 4 | S1 | MD1/MD2/— |
| C26 | SP1 | I1 | method 5 | S1 | MD1/MD3/MD2 |

TABLE 5A3

| screen printing ink composition described in Table 1A | inkjet printing composition described in Table 1B-1 | Method described in FIG. | Substrate | Magnetic-field-generating device (B1/B2/B3) |
|---|---|---|---|---|
| E1 | SP1 | I1 | 2A1 | S1 | MD2/—/— |
| E26 | SP1 | I1 | 2A1 | S2 | MD2/—/— |
| E27 | SP1 | I1 | 2F | S1 | MD1/MD3/MD2 |
| E28 | SP1 | I1 | 2F | S3 | MD1/MD3/MD2 |
| E29 | SP1 | I1 | 2F | S4 | MD1/MD3/MD2 |

TABLE 5A4

| screen printing ink composition described in Table 1A | inkjet printing composition described in Table 1B-1 | Method described in FIG. | Substrate | Magnetic-field-generating device (B1/B2/B3) |
|---|---|---|---|---|
| E30 | SP4 | I15 | FIG. 2A1 | S1 | MD2 |
| E31 | SP1 | I16 | FIG. 2A1 | S1 | MD2 |
| E32 | SP4 | I16 | FIG. 2A1 | S1 | MD2 |
| E33 | SP1 | I17 | FIG. 2A1 | S1 | MD2 |
| E34 | SP4 | I17 | FIG. 2A1 | S1 | MD2 |
| E35 | SP1 | I18 | FIG. 2A1 | S1 | MD2 |
| E36 | SP4 | I18 | FIG. 2A1 | S1 | MD2 | wherein magnetic-field generating devices were the following ones

MD1: magnetic assembly described hereabove and shown in FIG. 3A (for bi-axial orientation)

MD2: bar dipole magnet described herebelow (for mono-axial orientation)

Figure 3B:
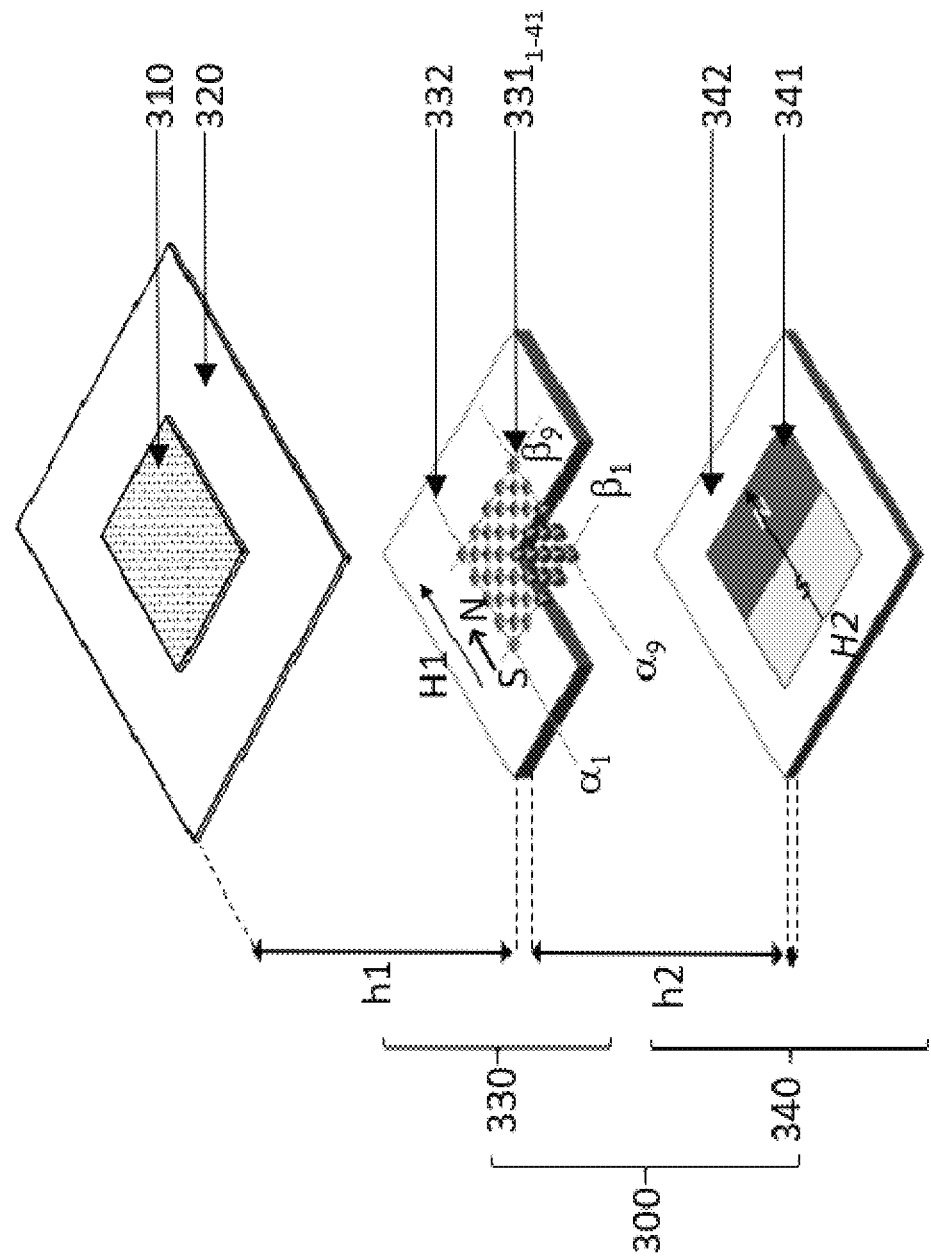

MD3: magnetic assembly described herebelow and shown in FIG. 3B (for mono-axial orientation)

wherein substrates (×20) No S1-S4 were the following ones:

substrate no S1 is a polymer substrate (Guardian™ from CCL Secure), substrate no S2 is hybrid substrate (LongLife™ from Louisenthal)

substrate no S3 is a fiduciary paper (Louisenthal BNP paper 100 g/m$^2$), substrate no S4 is a fiduciary paper (Louisenthal BNP paper 100 g/m$^2$) coated by hand screen printing using a T90 screen with a primer composition disclosed in Table 2 (primer thickness 20 μm) that was cured by UV-irradiation using curing units at least emitting between 250 nm and 320 nm (two lamps: iron-doped mercury lamp 200 W/cm$^2$+mercury lamp 200 W/cm$^2$ from IST Metz GmbH; 2 passes 100 m/min).

In FIG. 2A1, the method comprised the following steps:

the step a) (not shown in the Fig.) of screen printing the screen printing composition on the substrate (220) so as to form the coating layer (210), subsequently to the step a), the step b) of inkjet printing the top coating inkjet printing composition so as to form the indicium (230), subsequently to step b), the step c) of at least partially curing the indicium (230) and the area of the coating layer (210) below said indicium (230) with the LED curing unit (250), subsequently to the step c), the step d) of exposing the coating layer (210) to the magnetic field of the magnetic-field generating device (B1) so as to mono-axially orient at least a part of the magnetic or magnetizable pigment particles in the not yet cured areas of the coating layer (210), partially simultaneously with the step d), the step e) of curing the coating layer (210) with the Hg curing unit (260) while maintaining the magnetic-field generating device (B1) in the vicinity of the coating layer (210), so as to form the optical effect layer.

In FIG. 2B, the method comprised the following steps:

the step a) (not shown in the Fig.) of screen printing the screen printing composition on the substrate (220) so as to form the coating layer (210), subsequently to the step a), the step b) of inkjet printing the top coating inkjet printing composition so as to form the indicium (230), subsequently to step b), the step of exposing the coating layer (210) to the magnetic field of the first magnetic-field generating device (B1) so as to mono-axially orient at least a part of the magnetic or magnetizable pigment particles, partially simultaneously with the step b), the step c of at least partially curing the indicium (230) and the area of the coating layer (210) below said indicium (230) with the LED curing unit (250) while maintaining the first magnetic-field generating device (B1) in the vicinity of the coating layer (210), subsequently to the step c), the step d) of exposing the coating layer (210) to the magnetic field of the second magnetic-field generating device (B2) so as to mono-axially orient at least a part of the magnetic or magnetizable pigment particles described herein in the not yet cured areas of the coating layer (210), partially simultaneously with the step d), the step e) of curing the coating layer (210) with the Hg curing unit (260), while maintaining the magnetic-field generating device (B2) in the vicinity of the coating layer (210), so as to form the optical effect layer.

In FIG. 2C, the method comprised the following steps:

the step a) (not shown in the Fig.) of screen printing the screen printing composition on the substrate (220) so as to form the coating layer (210), subsequently to the step a), the step of exposing the coating layer (210) to the magnetic field of the first magnetic-field generating device (B1) so as to mono-axially orient at least a part of the magnetic or magnetizable pigment particles, partially simultaneously with the step of exposing the coating layer (210) to the magnetic field of the first magnetic-field generating device (B1), the step b) of inkjet printing the top coating inkjet printing composition on top of the coating layer (210) so as to form the indicium (230) while maintaining the first magnetic-field generating device (B1) in the vicinity of the coating layer (210), subsequently to the step b), the step c of at least partially curing the indicium (230) and the area of the coating layer (210) below said indicium (230) with the LED curing unit (250) while maintaining the magnetic-field generating device (B1) in the vicinity of the coating layer (210), subsequently to the step c), the step d) of exposing the coating layer (210) to the magnetic field of the second magnetic-field generating device (B2) so as to mono-axially orient at least a part of the magnetic or magnetizable pigment particles in the not yet cured areas of the coating layer (210), partially simultaneously with the step d), the step e) of curing the coating layer (210) with the Hg curing unit (260), while maintaining the magnetic-field generating device (B2) in the vicinity of the coating layer (210), so as to form the optical effect layer.

In FIG. 2D, the method comprised the following steps:

the step a) (not shown in the Fig.) of screen printing the screen printing composition on the substrate (220) so as to form the coating layer (210), subsequently to the step a), the step of exposing the coating layer (210) to the magnetic field of the first magnetic-field generating device (B1) so as to mono-axially orient at least a part of the magnetic or magnetizable pigment particles, partially simultaneously with the step of exposing the coating layer (210) to the magnetic field of the first magnetic-field generating device (B1), the step b) of inkjet printing the top coating inkjet printing composition on top of the coating layer (210) so as to form the indicium (230) while maintaining the first magnetic-field generating device (B1) in the vicinity of the coating layer (210), subsequently to the step b), the step c of at least partially curing the indicium (230) and the area of the coating layer (210) below said indicium (230) with the LED curing unit (250) while maintaining the first magnetic-field generating device (B1) in the vicinity of the coating layer (210), subsequently to the step c), the step d) of exposing the coating layer (210) to the magnetic field of the second magnetic-field generating device (B2) so as to bi-axially orient at least a part of the magnetic or magnetizable pigment particles in the not yet cured areas of the coating layer (210), subsequently to the step d), the step of exposing the coating layer (210) to the magnetic field of the third magnetic-field generating device (B3) so as to mono-axially orient at least a part of the magnetic or magnetizable pigment particles in the not yet cured areas of the coating layer (210), subsequently to the step of exposing the coating layer (210) to the magnetic field of the third magnetic-field generating device (B3), the step e) of curing the coating layer (210) with the Hg curing unit (260) so as to form the optical effect layer. For the example E17 made according to the method shown in FIG. 2D, about 0.5 seconds occurred between the orientation step with the third magnetic-field generating device (B3) and the step e).

In FIG. 2E, the method comprised the following steps:

the step a) (not shown in the Fig.) of screen printing the screen printing composition on the substrate (220) so as to form the coating layer (210), subsequently to the step a), the step of exposing the coating layer (210) to the magnetic field of the first magnetic-field generating device (B1) so as to bi-axially orient at least a part of the magnetic or magnetizable pigment particles, subsequently to the step of exposing the coating layer (210) to the magnetic field of the magnetic-field generating device (B1), the step b) of inkjet printing the top coating inkjet printing composition on top of the coating layer (210) so as to form the indicium (230), subsequently to the step b), the step c of at least partially curing the indicium (230) and the area of the coating layer (210) below said indicium (230) with the LED curing unit (250), subsequently to the step c), the step d) of exposing the coating layer (210) to the magnetic field of the second magnetic-field generating device (B2) so as to mono-axially orient at least a part of the magnetic or magnetizable pigment particles in the not yet cured areas of the coating layer (210), partially simultaneously with the step of exposing the coating layer (210) to the magnetic field of the second magnetic-field generating device (B2), the step e) of curing the coating layer (210) with the Hg curing unit (260), while maintaining the second magnetic-field generating device (B2) in the vicinity of the coating layer (210), so as to form the optical effect layer.

In FIG. 2F, the method comprised the following steps:

the step a) (not shown in the Fig.) of screen printing the screen printing composition on the substrate (220) so as to form the coating layer (210), subsequently to the step a), the step of exposing the coating layer (210) to the magnetic field of the first magnetic-field generating device (B1) so as to bi-axially orient at least a part of the magnetic or magnetizable pigment particles, subsequently to the step of exposing the coating layer (210) to the magnetic field of the first magnetic-field generating device (B1), the step b) of inkjet printing the top coating inkjet printing composition on top of the coating layer (210) so as to form the indicium (230), subsequently to the step b), the step of exposing the coating layer (210) to the magnetic field of the second magnetic-field generating device (B2) so as to mono-axially orient at least a part of the magnetic or magnetizable pigment particles, partially simultaneously with the step b), the step c of at least partially curing the indicium (230) and the area of the coating layer (210) below said indicium (230) with the LED curing unit (250) while maintaining the second magnetic-field generating device (B2) in the vicinity of the coating layer (210), subsequently to the step c), the step d) of exposing the coating layer (210) to the magnetic field of the third magnetic-field generating device (B3) so as to mono-axially orient at least a part of the magnetic or magnetizable pigment particles in the not yet cured areas of the coating layer (210), partially simultaneously with the step of exposing the coating layer (210) to the magnetic field of the third magnetic-field generating device (B3), the step e) of curing the coating layer (210) with the Hg curing unit (260) while maintaining the third magnetic-field generating device (B3) in the vicinity of the coating layer (210), so as to form the optical effect layer.

In FIG. 2G, the method comprised the following steps:

the step a) (not shown in the Fig.) of screen printing the screen printing composition on the substrate (220) so as to form the coating layer (210), subsequently to the step a), the step of exposing the coating layer (210) to the magnetic field of the first magnetic-field generating device (B1) so as to bi-axially orient at least a part of the magnetic or magnetizable pigment particles, subsequently to the step of exposing the coating layer (210) to the magnetic field of the first magnetic-field generating device (B1), the step b) of inkjet printing the top coating inkjet printing composition on top of the coating layer (210) so as to form the indicium (230), subsequently to the step b), the step of exposing the coating layer (210) to the magnetic field of the second magnetic-field generating device (B2) so as to mono-axially orient at least a part of the magnetic or magnetizable pigment particles, partially simultaneously with the step of exposing the coating layer (210) to the magnetic field of the second magnetic-field generating device (B2), the step c) of at least partially curing the indicium (230) and the area of the coating layer (210) below said indicium (230) with the LED curing unit (250) while maintaining the second magnetic-field generating device (B2) in the vicinity of the coating layer (210), subsequently to the step c), the step d) of exposing the coating layer (210) to the magnetic field of the third magnetic-field generating device (B3) so as to mono-axially orient at least a part of the magnetic or magnetizable pigment particles in the not yet cured areas of the coating layer (210), subsequently to the step of exposing the coating layer (210) to the magnetic field of the third magnetic-field generating device (B3), the step e) of curing the coating layer (210) with the Hg curing unit (260) so as to form the optical effect layer. For the example E19 made according to the method shown in FIG. 2G, about 0.5 seconds occurred between the orientation with the third magnetic-field generating device (B3) and the step e).

In FIG. 2H, the method comprised the following steps:

the step a) (not shown in the Fig.) of screen printing the screen printing composition on the substrate (220) so as to form the coating layer (210), subsequently to the step a), the step of exposing the coating layer (210) to the magnetic field of the first magnetic-field generating device (B1) so as to bi-axially orient at least a part of the magnetic or magnetizable pigment particles, subsequently to the step of exposing the coating layer (210) to the magnetic field of the first magnetic-field generating device (B1), the step b) of inkjet printing the top coating inkjet printing composition on top of the coating layer (210) so as to form the indicium (230), subsequently to the step b), the step of exposing the coating layer (210) to the magnetic field of the second magnetic-field generating device (B2) so as to mono-axially orient at least a part of the magnetic or magnetizable pigment particles, subsequently to the step b), the step c of at least partially curing the indicium (230) and the area of the coating layer (210) below said indicium (230) with the LED curing unit (250), subsequently to the step c), the step d) of exposing the coating layer (210) to the magnetic field of the third magnetic-field generating device (B3) so as to mono-axially orient at least a part of the magnetic or magnetizable pigment particles in the not yet cured areas of the coating layer 210, partially simultaneously with the step of exposing the coating layer (210) to the magnetic field of the third magnetic-field generating device (B3), the step e) of curing the coating layer (210) with the Hg curing unit (260), while maintaining the magnetic-field generating device (B3) in the vicinity of the coating layer (210), so as to form the optical effect layer.

In FIG. 2I, the method comprised the following steps:

the step a) (not shown in the Fig.) of screen printing the screen printing composition on the substrate (220) so as to form the coating layer (210), subsequently to the step a), the step of exposing the coating layer (210) to the magnetic field of the first magnetic-field generating device (B1) so as to bi-axially orient at least a part of the magnetic or magnetizable pigment particles, subsequently to the step of exposing the coating layer (210) to the magnetic field of the first magnetic-field generating device (B1), the step b) of inkjet printing the top coating inkjet printing composition on top of the coating layer (210) so as to form the indicium (230), subsequently to the step b), the step of exposing the coating layer (210) to the magnetic field of the second magnetic-field generating device (B2) so as to mono-axially orient at least a part of the magnetic or magnetizable pigment particles, subsequently to said step of exposing the coating layer (210) to the magnetic field of the second magnetic-field generating device (B2), the step c) of at least partially curing the indicium (230) and the area of the coating layer (210) below said indicium (230) with the LED curing unit (250), subsequently to the step c), the step d) of exposing the coating layer (210) to the magnetic field of the third magnetic-field generating device (B3) so as to mono-axially orient at least a part of the magnetic or magnetizable pigment particles in the not yet cured areas of the coating layer (210), subsequently to the step of exposing the coating layer (210) to the magnetic field of the third magnetic-field generating device (B3), the step e) of curing the coating layer (210) with the Hg curing unit (260) so as to form the optical effect layer. For the example E21 made according to the method shown in FIG. 2I, about 0.5 seconds occurred between the orientation with the third magnetic-field generating device (B3) and the step e).

In FIG. 2J, the method comprised the following steps:

the step a) (not shown in the Fig.) of screen printing the screen printing composition on the substrate (220) so as to form the coating layer (210), subsequently to the step a), the step of exposing the coating layer (210) to the magnetic field of the first magnetic-field generating device (B1) so as to bi-axially orient at least a part of the magnetic or magnetizable pigment particles, subsequently to the step of the exposing the coating layer (210) to the magnetic field of the first magnetic-field generating device (B1), the step of exposing the coating layer (210) to the magnetic field of the second magnetic-field generating device (B2) so as to mono-axially orient at least a part of the magnetic or magnetizable pigment particles, partially simultaneously with the step of exposing the coating layer (210) to the magnetic field of the second magnetic-field generating device (B2), the step b) of inkjet printing the top coating inkjet printing composition on top of the coating layer (210) so as to form the indicium (230) while maintaining the second magnetic-field generating device (B2) in the vicinity of the coating layer (210), partially simultaneously with the step of the exposing the coating layer (210) to the magnetic field of the second magnetic-field generating device (B2), the step c) of at least partially curing the indicium (230) and the area of the coating layer (210) below said indicium (230) with the LED curing unit (250) while maintaining the second magnetic-field generating device (B2) in the vicinity of the coating layer (210), subsequently to the step c), the step d of exposing the coating layer (210) to the magnetic field of the third magnetic field generating device (B3) so as to mono axially orient at least a part of the magnetic or magnetizable pigment particles in the not yet cured areas of the coating layer (210), partially simultaneously with the step of exposing the coating layer (210) to the magnetic field of the third magnetic-field generating device (B3), the step e) of curing the coating layer (210) with the Hg curing unit (260), while maintaining the magnetic-field generating device (B3) in the vicinity of the coating layer (210), so as to form the optical effect layer.

In FIG. 2K, the method comprised the following steps:

the step a) (not shown in the Fig.) of screen printing the screen printing composition on the substrate (220) so as to form the coating layer (210), subsequently to the step a), the step of exposing the coating layer (210) to the magnetic field of the first magnetic-field generating device (B1) so as to bi-axially orient at least a part of the magnetic or magnetizable pigment particles, subsequently to the step of the exposing the coating layer (210) to the magnetic field of the first magnetic-field generating device (B1), the step of exposing the coating layer (210) to the magnetic field of the second magnetic-field generating device (B2) so as to mono-axially orient at least a part of the magnetic or magnetizable pigment particles, subsequently to the step of the exposing the coating layer (210) to the magnetic field of the first magnetic-field generating device (B2), the step b) of inkjet printing the top coating inkjet printing composition on top of the coating layer (210) so as to form the indicium (230), subsequently to the step b), the step c of at least partially curing the indicium (230) and the area of the coating layer (210) below said indicium (230) with the LED curing unit (250), subsequently to the step c), the step d) of the exposing the coating layer (210) to the magnetic field of the first magnetic-field generating device (B3) so as to mono-axially orient at least a part of the magnetic or magnetizable pigment particles in the not yet cured areas of the coating layer (210), partially simultaneously with the step of exposing the coating layer (210) to the magnetic field of the third magnetic-field generating device (B3), the step e) of curing the coating layer (210) and the indicium (230) with the Hg curing unit (260), while maintaining the magnetic-field generating device (B3) in the vicinity of the coating layer (210), so as to form the optical effect layer.

Comparative examples C1-C26 have been made according to the following methods:

Method 1 (C1-C20) comprising:

a step of screen printing the screen printing composition on the substrate so as to form the coating layer, subsequently, a step of inkjet printing the top coating inkjet printing composition so as to form the indicium, subsequently, a step of exposing the coating layer to the LED curing unit, subsequently, a step of exposing the coating layer to the magnetic field of a first magnetic-field generating device so as to mono-axially orient at least a part of the magnetic or magnetizable pigment particles in the not yet cured areas of the coating layer, partially simultaneously with the step of exposing the coating layer to the magnetic field of the first magnetic-field generating device, a step of exposing the coating layer to the Hg curing unit while maintaining the first magnetic-field generating device in the vicinity of the coating layer.

Method 2 (C21) comprising:

a step of screen printing the screen printing composition on the substrate so as to form the coating layer, subsequently, a step of exposing the coating layer to the magnetic field of the first magnetic-field generating device so as to bi-axially orient at least a part of the magnetic or magnetizable pigment particles, subsequently, a step of inkjet printing the top coating inkjet printing composition so as to form the indicium, subsequently, a step of exposing the coating layer to the magnetic field of a second magnetic-field generating device so as to mono-axially orient at least a part of the magnetic or magnetizable pigment particles, partially simultaneously, a step of exposing the coating layer to the LED curing unit while maintaining the second magnetic-field generating device in the vicinity of the coating layer, subsequently, a step of exposing the coating layer to the magnetic field of a third magnetic-field generating device so as to mono-axially orient at least a part of the magnetic or magnetizable pigment particles in the not yet cured areas of the coating layer, partially simultaneously, a step of exposing the coating layer to the Hg curing unit while maintaining the third magnetic-field generating device in the vicinity of the coating layer.

Method 3 (C22 and C24) comprising:

a step of screen printing the screen printing composition on the substrate so as to form the coating layer, subsequently, a step of inkjet printing the top coating inkjet printing composition so as to form the indicium, subsequently, a step of exposing the coating layer to the LED curing unit, subsequently, a step of exposing the coating layer to the magnetic field of the magnetic-field generating device so as to mono-axially orient at least a part of the magnetic or magnetizable pigment particles in the not yet cured areas of the coating layer, subsequently, a step of exposing the coating layer to the Hg curing unit.

Method 4 (C23 and C25) comprising:

a step of screen printing the screen printing composition on the substrate so as to form the coating layer, subsequently, a step of exposing the coating layer to the magnetic field of the first magnetic-field generating device so as to bi-axially orient at least a part of the magnetic or magnetizable pigment particles, subsequently, a step of inkjet printing the top coating inkjet printing composition so as to form the indicium, subsequently, a step of exposing the coating layer to the LED curing unit, subsequently, a step of exposing the coating layer to the magnetic field of the second magnetic-field generating device so as to mono-axially orient at least a part of the magnetic or magnetizable pigment particles in the not yet cured areas of the coating layer (210), partially simultaneously, a step of exposing the coating layer to the Hg curing unit while maintaining the second magnetic-field generating device in the vicinity of the coating layer.

Method 5 (C26) comprising:

a step of screen printing the screen printing composition on the substrate so as to form the coating layer, subsequently, a step of exposing the coating layer to the magnetic field of the first magnetic-field generating device so as to bi-axially orient at least a part of the magnetic or magnetizable pigment particles, subsequently, a step of inkjet printing the top coating inkjet printing composition so as to form the indicium, subsequently, a step of exposing the coating layer to the magnetic field of the second magnetic-field generating device so as to mono-axially orient at least a part of the magnetic or magnetizable pigment particles, partially simultaneously, a step of exposing the coating layer to the Hg curing unit while maintaining the second magnetic-field generating device in the vicinity of the coating layer, subsequently, a step of exposing the coating layer to the magnetic field of the third magnetic-field generating device so as to mono-axially orient at least a part of the magnetic or magnetizable pigment particles, partially simultaneously, a step of exposing the coating layer to the LED curing unit while maintaining the third magnetic-field generating device in the vicinity of the coating layer (210).

Screen Printing of the Screen Printing Compositions

The screen printing compositions described in Table 1A were independently applied by hand screen printing using a T90 screen on the substrate (×20) (70 mm×70 mm) described in Tables 5 so as to form a coating layer (×10) having the following dimensions: 25 mm×25 mm and a thickness of about 20 m.

Inkjet Printing of the Top Coating Inkjet Printing Compositions

The top coating inkjet printing compositions described in Tables 1B-1 and 1B2 were independently applied at about 5 g/m$^2$ by DOD inkjet printing using a Kyocera KJ4A-TA printhead (600 dpi) so as to form indicia having the shape of a rectangle having the following dimensions: 20 mm×12 mm.

Magnetic Orientation of the Screen Printing Compositions

The steps of exposing the coating layer (×10) to the magnetic field of the magnetic-field generating device described hereafter were independently carried out to orient at least a part of the magnetic or magnetizable pigment particles comprised in the coating layer made of the screen printing compositions.

Magnetic-Field Generating Device MD1 for Bi-Axial Orientation (Shown in FIG. 3A)

The magnetic-field generating device MD1 used to bi-axially orient at least a part of the magnetic or magnetizable pigment particles comprised a) a first set (S1) comprising a first bar dipole magnets (371) and two second bar dipole magnets (372$_a$ and 372$_b$) and a second set (S2) comprising a first bar dipole magnets (371) and two second bar dipole magnets (372$_a$ and 372$_b$) and b) a pair (P1) of third bar dipole magnets (373$_a$ and 373$_b$).

The upmost surface of the first bar dipole magnets (371) of the first and second sets (S1, S2), of the second bar dipole magnets (372$_a$ and 372$_b$) of the first and second sets (S1, S2) and of the third bar dipole magnets (373$_a$ and 373$_b$) of the pair (P1) were flush with each other.

The third bar dipole magnet ($373_a$) was aligned with the second bar dipole magnet ($372_a$) of the first set (S1) and with the second bar dipole magnet ($372_a$) of the second set (S2) so as form a line. The third bar dipole magnet ($373_b$) was aligned with the second bar dipole magnet ($372_b$) of the first set (S1) and with the second bar dipole magnet ($372_b$) of the second set (S2) so as form a line.

The first bar dipole magnets (371) of the first and second sets (S1, S2) had the following dimensions: first thickness (L1) of 5 mm, first length (L4) of 60 mm and first width (L5) of 40 mm. Each of the second bar dipole magnets ($372_a$ and $372_b$) of the first and second sets (S1, S2) had the following dimensions: second thickness (L2) of 10 mm, second length (L6) of 40 mm and second width (L7) of 10 mm. Each of the third bar dipole magnets ($373_a$ and $373_b$) of the pair (P1) had the following dimensions: third thickness (L3) of 10 mm, third length (L8) of 20 mm and third width (L9) of 10 mm.

The first bar dipole magnet (371) of the first set (S1) and the second bar dipole magnets ($372_a$ and $372_b$) of the first set (S1) were aligned to form a column and the first bar dipole magnet (371) of the second set (S2) and the second bar dipole magnets ($372_a$ and $372_b$) of the second set (S2) were aligned to form a column. For each set (S1, S2) and each column described herein, the first bar dipole magnet (371) and the two second bar dipole magnets ($372_a$ and $372_b$) were spaced apart by a second distance (d2) of 2 mm. For each line described herein, the third bar dipole magnets ($373_a$ and $373_b$) and the two second bar dipole magnets ($372_a$) were spaced apart by a third distance (d3) of 2 mm.

The first bar dipole magnets (371) of the first and second sets (S1, S2) had their magnetic axis oriented to be substantially parallel to the substrate (320), wherein the first bar dipole magnet (371) of the first set (S1) had its magnetic direction opposite to the magnetic direction of the first bar dipole magnet (371) of the second set (S2) and were spaced apart by a first distance (d1) of 24 mm (corresponding to the sum of the third length (L8) and the two third distances (d3)).

The two second bar dipole magnets ($372_a$ and $372_b$) of the first and second sets (S1, S2) had their magnetic axis oriented to be substantially perpendicular to the first plane and substantially perpendicular to the substrate (320). The South pole of the second bar dipole magnet ($372_a$) of the first set (S1) pointed towards the first plan and towards the substrate (320), the North pole of the second bar dipole magnet ($372_b$) of the first set (S1) pointed towards the substrate (320), the North pole of the first bar dipole magnets (371) of the first set (S1) pointed towards the second bar dipole magnet ($372_b$) of the first set (S1). The North pole of the second bar dipole magnet ($372_a$) of the second set (S2) pointed towards the first plan and towards the substrate (320), the South pole of the second bar dipole magnet ($372_b$) of the second set (S2) towards the substrate (320), the North pole of the first bar dipole magnets (371) of the second set (S2) pointed towards the second bar dipole magnet ($372_a$) of the second set (S2).

The South pole of the third bar dipole magnet ($373_a$) pointed towards the second bar dipole magnet ($372_a$) of the first set (S1), said second bar dipole magnet ($372_a$) having its South pole pointing towards the substrate (320); and the North pole of the third bar dipole magnet ($373_b$) pointed towards the second bar dipole magnet ($372_b$) of the first set (S1), said second bar dipole magnet ($372_b$) having its North pole pointing towards the substrate (320).

The first bar dipole magnets (371) of the first and second sets (S1, S2), the second bar dipole magnets ($372_a$ and $372_b$) of the first and second sets (S1, S2) and the third bar dipole magnets ($373_a$ and $373_b$) of the pair (P1) were made of NdFeB N42 and were embedded in a non-magnetic supporting matrix (not shown) made of polyoxymethylene (POM) having the following dimensions: 115 mm×115 mm×12 mm.

During the magnetic orientation, the substrate (320) carrying the coating layer (310) was disposed on a non-magnetic supporting plate made of POM described hereabove with the coating layer (310) facing the environment so as to form an assembly, wherein said non-magnetic supporting plate (340) had the following dimensions: 180 mm×130 mm×2 mm and comprised a centrally aligned aperture (48 mm×48 mm), with the coating layer (310) facing the magnetic-field generating device (300). The assembly was moved three times back and forth in the vicinity and on top of the magnetic-field-generating device (300) at a distance of about 2 mm from the top surface of said device.

Magnetic-Field Generating Device MD2 for Mono-Axial Orientation

The magnetic-field generating device MD2 used to mono-axially orient at least a part of the magnetic or magnetizable pigment particles comprised a bar dipole magnet having a length of about 30 mm, a width of about 24 mm and a thickness of about 6 mm, wherein said bar dipole was embedded in a matrix made of POM and having the following dimensions: 40 mm×40 mm×15 mm. The North-South magnetic axis of the bar dipole magnet was parallel to the substrate (320) surface and parallel to the width. The bar dipole magnet was made of NdFeB N42.

During the magnetic orientation, the substrate (320) carrying the coating layer (310) was disposed on the non-magnetic supporting plate made of POM described hereabove with the coating layer (310) facing the environment so as to form an assembly. The assembly was placed in the vicinity and on top of the magnetic-field-generating device so that the substrate (320) was at a distance of about 6 mm from the top surface of the bar dipole magnet surface.

Magnetic-Field Generating Device MD3 for Mono-Axial Orientation (Shown in FIG. 3B)

The magnetic-field generating device MD3 used to mono-axially orient at least a part of the magnetic or magnetizable pigment particles is disclosed in FIG. 6A of the co-pending European Patent Application EP19205715.6 and comprised a first magnetic-field generating device (330) embedded in a first square-shaped supporting matrix (332) and a second magnetic-field generating device (340) comprising a second dipole magnet (341) embedded in a second square-shaped supporting matrix (342), wherein the second magnetic-field generating device (340) was disposed below the first magnetic-field generating device (330) and wherein first magnetic-field generating device (330) was disposed between the substrate (320) carrying the coating layer (310) and the second magnetic-field generating device (340). The first magnetic-field generating device (330) and the second magnetic-field generating device (340) were centered with respect to one another.

The first magnetic-field generating device (330) comprised 41 first dipole magnets ($331_{1-41}$) having their respective centers arranged on the intersections of a grid comprising nine parallel straight lines $\alpha_i$ ($\alpha_{1-9}$) and nine parallel straight lines $\beta_j$ ($\rho_{1-9}$), wherein the straight lines $\alpha_i$ ($\alpha_{1-9}$) were parallel with respect to each other, the straight lines $\beta_j$ ($\beta_{1-9}$) were parallel with respect to each other and the straight lines $\alpha_i$ were perpendicular to the straight lines $\beta_j$. The nine lines $\alpha_i$ ($\alpha_{1-9}$) were equally spaced apart and neighboring lines were separated by a distance of 2.5 mm. Five lines $\alpha_i$ ($\alpha_{1/3/5/7/9}$) comprised five first dipole magnets and four lines $\alpha_i$ ($\alpha_{2/4/6/8}$) comprised four first dipole magnets so that the total number of first dipole magnets was 41 ($331_{1-41}$). The nine lines $\beta_j$ ($\beta_{1-9}$) were equally spaced apart and neighboring lines were separated by a distance of 2.5 mm. As shown in FIG. 3B, each of the first dipole magnets ($331_{1-41}$) was arranged on the intersections of the grid but some of the intersections of said grid did not comprise a first dipole magnet.

The 41 first dipole magnets ($331_{1-41}$) were cylindrical with the following dimensions: 2 mm (A4, diameter)×2 mm (A5, length) and were made of NdFeB N45. All the first dipole magnets ($331_{1-41}$) were magnetized through their length (A5), had their magnetic axes oriented parallel to the straight lines $\alpha_i$ ($\alpha_1$-$\alpha_9$), parallel to the substrate (320) surface and pointing all in the same direction, as indicated by the S→N arrow in FIG. 3B. The first magnetic-field generating device (330) had its vector sum H1 substantially parallel to the substrate (320) surface.

The first square-shaped supporting matrix (332) of the first magnetic-field generating device (330) had the following dimensions: 50 mm×50 mm×3 mm, was made of polyoxymethylene (POM) and comprised 41 indentations for holding the 41 first dipole magnets ($331_{1-41}$), said indentations having the same dimensions as said 41 first dipole magnets ($331_{1-41}$), so that the uppermost surface of said 41 first dipole magnets ($331_{1-41}$) was flush with the uppermost surface of the first square-shaped supporting matrix (332). The second dipole magnet (341) of the second magnetic-field generating device (340) was a square-shaped dipole magnet, had the following dimensions: 30 mm (B4)×30 mm (B5)×2 mm (B3) and was made of NdFeB N52. The second dipole magnet (341) had its South-North magnetic axis substantially parallel to the substrate (320) surface. The second magnetic-field generating device (340) had its vector sum H2 (corresponding to the magnetic axis of the second dipole magnet (341)) substantially parallel to the substrate (320).

The second square-shaped supporting matrix (342) of the second magnetic-field generating device (340) had the following dimensions: 50 mm×50 mm×2 mm, was made of polyoxymethylene (POM) and comprised an indentation/hole for holding the second dipole magnet (341), said indentation/hole having the same shape and dimensions as the second dipole magnet (341) (i.e. 30 mm (B4)×30 mm (B5)×2 mm (B3)) so that the uppermost and lowermost surfaces of said second dipole magnet (341) was flush with the uppermost and lowermost surfaces of the second square-shaped supporting matrix (342).

The distance (h1) between the upper surface of the first square-shaped supporting matrix (332) of the first magnetic-field generating device (330) (also corresponding to the upper surface of the 41 first dipole magnets ($331_{1-41}$) and the surface of the substrate (320) facing the magnetic assembly (300) was 1.5 mm. The distance (h2) between the upper surface of the second dipole magnet (341) of the second magnetic-field generating device (340) and the lowermost surface of the square-shaped supporting matrix (332) of the first magnetic-field generating device (330) was 0 mm, i.e. the first (330) and second (340) magnetic-field generating devices were in direct contact.

Curing Units

The following units were used for the preparation of the optical effect layers:

LED curing unit (×50): UV-LED-lamp from Phoseon (Type FireLine 125×20 mm, 395 nm, 8 W/cm$^2$) with an exposure time of for about 0.5 second.

Hg curing unit (×60): two lamps: iron-doped mercury lamp 200 W/cm$^2$+mercury lamp 200 W/cm$^2$ from IST Metz GmbH; 2 passes 100 m/min).

After the curing steps, each sample was rubbed with a tissue to check the curing of both the coating layer (×10) and indicium (×30). As it can be seen from the pictures shown in FIG. 4, Comparative Examples for which the curing was not complete or sufficient, at least part of one or both layers was removed.

Pictures of Examples and Comparative Examples (FIG. 4A-D)

Pictures of the optical effect layers produced as described hereabove are provided in FIG. 4A-D.

Figure 4A:
FIG. 4A-D show pictures of OELs prepared with the method according to the present invention (E1-E36) and prepared according to a comparative method (C1-C26).
Figure 4A:
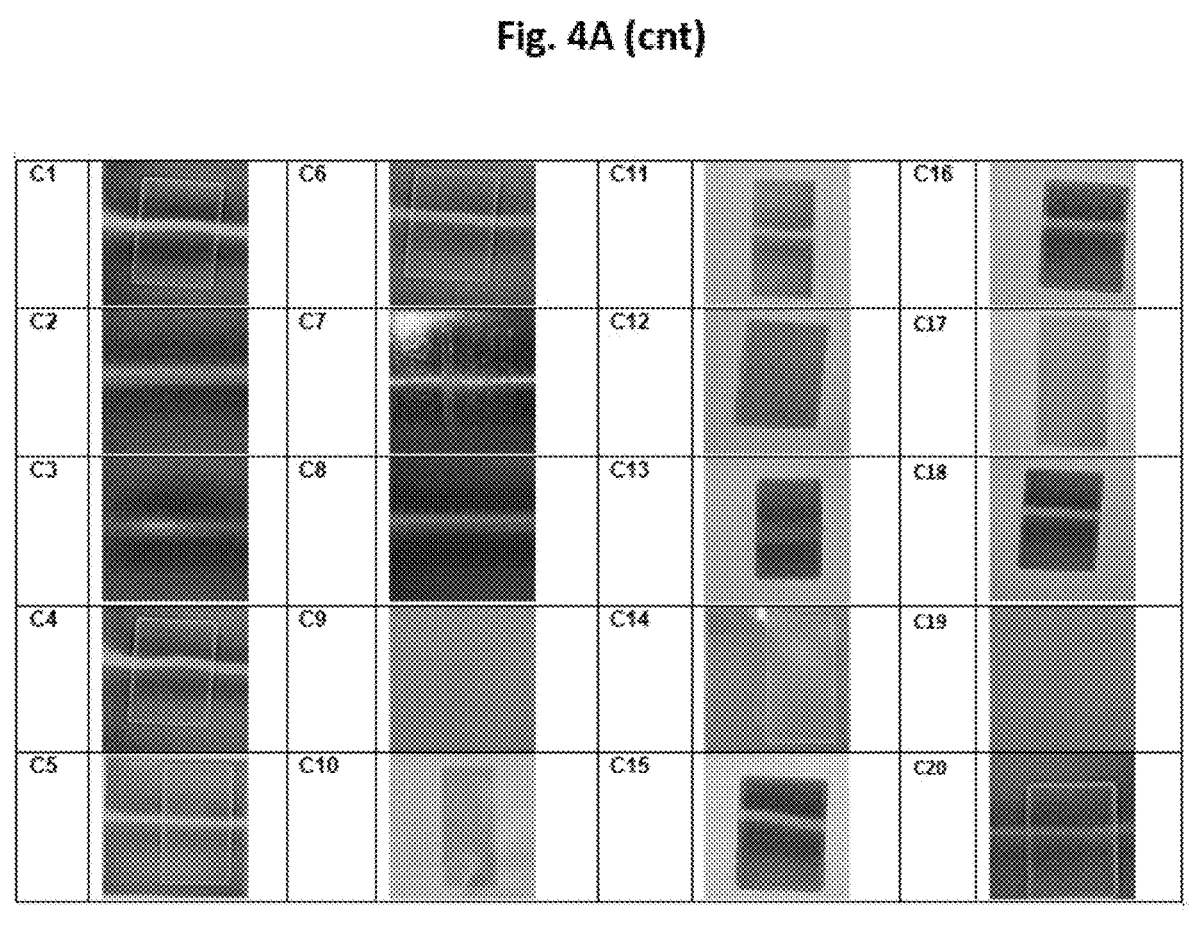

As shown by the pictures disclosed in FIG. 4A, the use in the claimed process described herein of combinations of a) one or more iodonium salts disclosed in the 1$^{st}$ embodiment described herein, in particular one or more salts selected from the group consisting of bis(4-methylphenyl)iodonium hexafluorophosphate (CAS Nr60565-88-0), bis(4-dodecylphenyl)iodonium hexafluoroantimonate (CAS Nr 71786-70-4) and mixtures thereof in the screen printing composition and b) one or more thioxanthone compounds disclosed in the 1$^{st}$ embodiment described herein, in particular one or more compounds selected from the group consisting of 1-chloro-4-propoxy-9H-thioxanthen-9-one (CAS Nr 142770-42-1), 2-isopropyl-9H-thioxanthen-9-one (CAS Nr 5495-84-1); 4-(1-methylethyl)-9H-thioxanthen-9-one (CAS Nr 83846-86-0), oligomeric and polymeric compounds thereof (CAS Nr 2055335-46-9), 1,3-di[[α-[1-chloro-9-oxo-9H-thioxanthen-4-yl)oxy]acetylpoly[oxy(1-methylethylene)]]oxy]-2,2-bis[[α-[1-cloro-9-oxo-9H-thioxanthen-4-yl)oxy]acetylpoly[oxy(1-methylethylene)]] oxymethylpropane (CAS Nr 1003567-83-6) and mixtures thereof in the top coating inkjet printing composition, allowed to produce optical effect layers exhibiting not only a dynamic movement of a rolling bar upon tilting the substrate due to the magnetic orientation with the magnetic-field generating device (B1) of the particles, bright and highly reflective areas but also the indicium.

As shown by the pictures disclosed in FIG. 4A, the use in the claimed process described herein of combinations of a) the one or more iodonium salts disclosed in the 2$^{nd}$ embodiment described herein, and b) one or more anthracene compounds disclosed in the 2$^{nd}$ embodiment, in particular 9,10-dibutoxy-anthracene (CAS Nr 76275-14-4) in the top coating inkjet printing composition, allowed to produce optical effect layers exhibiting not only a dynamic movement of a rolling bar upon tilting the substrate due to the magnetic orientation with the magnetic-field generating device (B1) of the particles, bright and highly reflective areas but also the indicium.

As shown by the pictures disclosed in FIG. 4A, the use in the claimed process described herein of combinations of a) the one or more iodonium salts disclosed in the 3$^{rd}$ embodiment described herein, and b) one or more coumarin compounds disclosed in the 3$^{rd}$ embodiment, in particular 3-(4-dodecylbenzoyl)-5,7-dimethoxy-2H-1-benzopyran-2-one (CAS Nr 2170153-43) in the top coating inkjet printing composition, allowed to produce optical effect layers exhibiting not only a dynamic movement of a rolling bar upon tilting the substrate due to the magnetic orientation with the magnetic-field generating device (B1) of the particles, bright and highly reflective areas but also the indicium.

As shown by the pictures disclosed in FIG. 4A, the use in the claimed process described herein of combinations of a) the one or more iodonium salts disclosed in the 4$^{th}$ embodiment described herein and b) a naphthalene compound and an anthracene compounds disclosed in the 4$^{th}$ embodiment, in particular 9,10-diethoxy-naphthalene (CAS Nr 27294-37-7) and 9,10-dibutoxy-anthracene (CAS Nr 76275-14-4) in the top coating inkjet printing composition, allowed to produce optical effect layers exhibiting not only a dynamic movement of a rolling bar upon tilting the substrate due to the magnetic orientation with the magnetic-field generating device (B1) of the particles, bright and highly reflective areas but also the indicium.

As shown by the pictures disclosed in FIG. 4A, the OELs obtained by the claimed process and the combination of the 1$^{st}$ embodiment described herein are shown in E1-E4, E8 and E9; the OEL obtained by the claimed process and the combination of the 2$^{nd}$ embodiment described herein is shown in E5; the OEL obtained by the claimed process and the combination of the 3$^{rd}$ embodiment described herein is shown in E6; and the OEL obtained by the claimed process and the combination of the 4$^{th}$ embodiment described herein is shown in E7.

As shown by the pictures disclosed in FIG. 4A, the use in the claimed process described herein of combinations of a) the one or more sulfonium salts disclosed in the 5$^{th}$ embodiment described herein, in particular one or more salts selected from the group consisting of 4-(phenylthio)phenyl-diphenylsulfonium hexafluoroantimonate (CAS Nr 71449-78-0) and bis[4-(diphenylsulfonium)phenyl] sulfide bishexafluoroantimonate (CAS Nr 89452-37-9) in the screen printing composition and b) the one or more anthracene compounds disclosed in the 5$^{th}$ embodiment described herein, in particular 9,10-dibutoxy-anthracene (CAS Nr 76275-14-4), in the top coating inkjet printing composition, allowed to produce optical effect layers exhibiting not only a dynamic movement of a rolling bar upon tilting the substrate due to the magnetic orientation with the magnetic-field generating device (B1) of the particles, bright and highly reflective areas but also the indicium.

As shown by the pictures disclosed in FIG. 4A, the use in the claimed process described herein of combinations of a) the one or more sulfonium salts disclosed in the 6$^{th}$ embodiment described herein, in particular 4-(phenylthio)phenyl-diphenylsulfonium hexafluoroantimonate (CAS Nr 71449-78-0) and bis[4-(diphenylsulfonium)phenyl] sulfide bishexafluoroantimonate (CAS Nr 89452-37-9) in the screen printing composition, b) the one or more iodonium salts disclosed in the 6$^{th}$ embodiment described herein, in particular bis(4-methylphenyl)iodonium hexafluorophosphate (CAS Nr 60565-88-0), in the top coating inkjet printing composition, and c) the one or more thioxanthone compounds disclosed in the 6$^{th}$ embodiment described herein, in particular 1-chloro-4-propoxy-9H-thioxanthen-9-one (CAS Nr 142770-42-1), in the top coating inkjet printing composition allowed to produce optical effect layers exhibiting not only a dynamic movement of a rolling bar upon tilting the substrate due to the magnetic orientation with the magnetic-field generating device of the particles, bright and highly reflective areas but also the indicium.

As shown by the pictures disclosed in FIG. 4A, the use in the claimed process described herein of combinations of a) the one or more sulfonium salts disclosed in the 7$^{th}$ embodiment described herein, in particular 4-(phenylthio)phenyl-diphenylsulfonium hexafluoroantimonate (CAS Nr 71449-78-0) and bis[4-(diphenylsulfonium)phenyl] sulfide bishexafluoroantimonate (CAS Nr 89452-37-9) in the screen printing composition, b) the naphthalene compound, disclosed in the 7$^{th}$ embodiment described herein, in particular 9,10-diethoxy-naphthalene, in the top coating inkjet printing composition and c) the anthracene compound, in particular, 9,10-dibutoxy-anthracene in the top coating inkjet printing composition, allowed to produce optical effect layers exhibiting not only a dynamic movement of a rolling bar upon tilting the substrate due to the magnetic orientation with the magnetic-field generating device of the particles, bright and highly reflective areas but also the indicium.

As shown in FIG. 4A, the OEL obtained by the claimed process and the combination of the 5$^{th}$ embodiment described herein is shown in E10; the OEL obtained by the claimed process and the combination of the 6$^{th}$ embodiment described herein is shown in E11; and the OEL obtained by the claimed process and the combination of the 7$^{th}$ embodiment described herein is shown in E12.

Figure 4B:
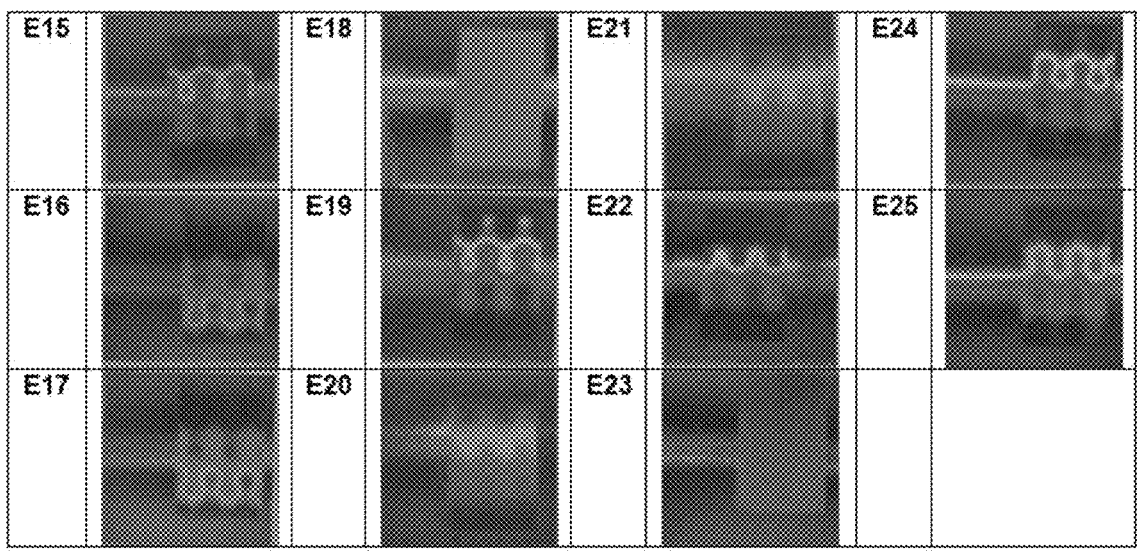
Figure 4C:
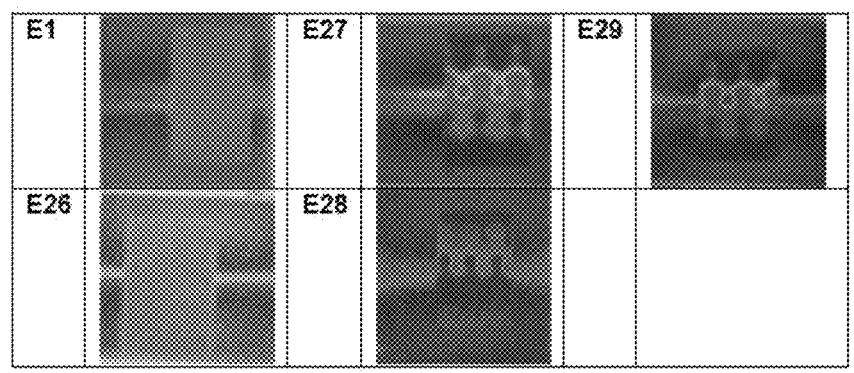
Figure 4D:
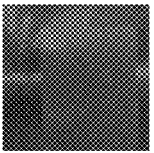

As shown by the pictures disclosed in FIG. 4D, the use in the claimed process described herein of combinations of a) the one or more sulfonium salts disclosed in the 8$^{th}$ embodiment described herein, in particular one or more salts selected from the group consisting of 4-(phenylthio)phenyl-diphenylsulfonium hexafluoroantimonate (CAS Nr 71449-78-0) and bis[4-(diphenylsulfonium)phenyl] sulfide bishexafluoroantimonate (CAS Nr 89452-37-9) in the screen printing composition and b) the one or more coumarin compounds disclosed in the 8$^{th}$ embodiment described herein, in particular 3-(4-C10-C13-benzoyl)-5,7-dimethoxy-2H-1-benzopyran-2-one (CAS Nr 2243703-91-3), and the one or more iodonium salts disclosed in the 8$^{th}$ embodiment described herein, in particular bis(4-methylphenyl)iodonium hexafluorophosphate (CAS Nr 60565-88-0) in the top coating inkjet printing composition, allowed to produce optical effect layers exhibiting not only a dynamic movement of a rolling bar upon tilting the substrate due to the magnetic orientation with the magnetic-field generating device (B1) of the particles, bright and highly reflective areas but also the indicium. As shown in FIG. 4D, the OEL obtained by the claimed process and the combination of the 8$^{th}$ embodiment described herein is shown in E30.

As shown by the pictures disclosed in FIG. 4D, the use in the claimed process described herein of combinations of a) the one or more iodonium salts disclosed in the 9$^{th}$ embodiment described herein, in particular bis(4-methylphenyl)iodonium hexafluorophosphate (CAS Nr 60565-88-0), or of the one or more sulfonium salts disclosed in the 9$^{th}$ embodiment described herein, in particular 4-(phenylthio)phenyl-diphenylsulfonium hexafluoroantimonate (CAS Nr 71449-78-0) and bis[4-(diphenylsulfonium)phenyl] sulfide bishexafluoroantimonate (CAS Nr 89452-37-9) in the screen printing composition, b) the one or more iodonium salts disclosed in the 9$^{th}$ embodiment described herein, in particular [(7-methoxy-4-methyl-2-oxo-2H-1-benzopyran-3-yl)phenyl]iodonium hexafluoro-antimonate (CAS Nr 2091854-13-4), in the top coating inkjet printing composition, allowed to produce optical effect layers exhibiting not only a dynamic movement of a rolling bar upon tilting the substrate due to the magnetic orientation with the magnetic-field generating device of the particles, bright and highly reflective areas but also the indicium. As shown by the pictures disclosed in FIG. 4D, the OELs obtained by the claimed process and the combination of the 9$^{th}$ embodiment described herein are shown in the OEL obtained by the claimed process and the combination of the 9$^{th}$ embodiment described herein are shown in E31 and E32.

As shown by the pictures disclosed in FIG. 4D, the use in the claimed process described herein of combinations of a) the one or more iodonium salts disclosed in the 10$^{th}$ embodiment described herein, in particular bis(4-methylphenyl)iodonium hexafluorophosphate (CAS Nr 60565-88-0), or of the one or more sulfonium salts disclosed in the 10$^{th}$ embodiment described herein, in particular 4-(phenylthio) phenyldiphenylsulfonium hexafluoroantimonate (CAS Nr 71449-78-0) and bis[4-(diphenylsulfonium)phenyl] sulfide bishexafluoroantimonate (CAS Nr 89452-37-9) in the screen printing composition, b) the one or more pyrilium salts disclosed in the 10$^{th}$ embodiment described herein, in particular 2, 4, 6-triphenylpyrylium tetrafluoroborate (CAS Nr. 448-61-3), in the top coating inkjet printing composition, allowed to produce optical effect layers exhibiting not only a dynamic movement of a rolling bar upon tilting the substrate due to the magnetic orientation with the magnetic-field generating device of the particles, bright and highly reflective areas but also the indicium. As shown by the pictures disclosed in FIG. 4D, the OELs obtained by the claimed process and the combination of the 10$^{th}$ embodiment described herein are shown in E33 and E34.

As shown by the pictures disclosed in FIG. 4D, the use in the claimed process described herein of combinations of a) the one or more iodonium salts disclosed in the 11$^{th}$ embodiment described herein, in particular bis(4-methylphenyl) iodonium hexafluorophosphate (CAS Nr 60565-88-0), or of the one or more sulfonium salts disclosed in the 11$^{th}$ embodiment described herein, in particular 4-(phenylthio) phenyldiphenylsulfonium hexafluoroantimonate (CAS Nr 71449-78-0) and bis[4-(diphenylsulfonium)phenyl] sulfide bishexafluoroantimonate (CAS Nr 89452-37-9) in the screen printing composition, b) the one or more sulfonium salts disclosed in the 11$^{th}$ embodiment described herein, in particular tris[4-(4-acetylphenylsulfanyl)phenyl]-sulfonium hexafluorophosphate (CAS Nr 953084-13-4], in the top coating inkjet printing composition, allowed to produce optical effect layers exhibiting not only a dynamic movement of a rolling bar upon tilting the substrate due to the magnetic orientation with the magnetic-field generating device of the particles, bright and highly reflective areas but also the indicium. As shown by the pictures disclosed in FIG. 4D, the OELs obtained by the claimed process and the combination of the 11$^{th}$ embodiment described herein are shown in E35 and E36.

Contrary to the examples according to the present invention, comparative examples (C1-C20) made with same process than the claimed one except that the compounds in the screen printing composition and the compounds in the top coating inkjet printing composition did not consist of the embodiments described herein), failed to exhibit the dynamic movement of a rolling bar upon tilting the substrate due to the magnetic orientation with the magnetic-field generating device (B1) of the particles, bright and highly reflective areas in combination with an indicium. Comparative examples C1-C8 and C20 exhibited a dynamic movement of a rolling bar upon tilting the substrate due to the magnetic orientation with the magnetic-field generating device of the particles but failed to show the indicium due to the absence of the specific one or more compounds absorbing in the range from about 350 nm to about 470 nm in the top curable coating composition or due to combinations of the compounds in the screen printing composition and the compounds in the top coating inkjet printing composition which did not consist of the embodiments described herein. Comparative examples C10, C12, C14 and C17 failed to exhibit a dynamic movement of a rolling bar upon tilting the substrate due to the lack of specific magnetic orientation pattern of the particles (random orientation of the particles) and failed to exhibit the indicium since the whole surface of the coating layer (×10) and indicium (×30) was cured with the LED curing unit in step c) thus impeding any no re-orientation thereafter. Comparative examples C11, C13, C15, C16 and C18 failed to exhibit the screen printing composition due to the lack of curing of said screen printing composition. C9 and C19 failed to exhibit the screen printing composition and the top coating inkjet printing composition due to the lack of curing of said screen printing composition and of said top coating inkjet printing composition.

Contrary to the examples according to the present invention, Comparative example C21 made with a same process than the claimed one except that the compounds in the screen printing composition and the compounds in the top coating inkjet printing composition did not consist of the embodiments described herein exhibited a dynamic movement of a rolling bar upon tilting but failed to exhibit the indicium due to the fact the compounds in the screen printing composition and the compounds in the top coating inkjet printing composition did not consist of the embodiments described herein.

Contrary to the examples according to the present invention, Comparative examples C22 and C23 made with a same process than the claimed one except that the top coating inkjet printing composition lacked the compounds described herein exhibited a dynamic movement of a rolling bar upon tilting but failed to exhibit the indicium.

Contrary to the examples according to the present invention, Comparative examples C24 and C25 made with a same process than the claimed one except that the top coating inkjet printing composition lacked the compounds described herein failed to exhibit a dynamic movement of a rolling bar upon tilting and failed to exhibit the indicium.

As shown by the pictures disclosed in FIG. 4A, the use in the claimed process described herein of combinations of a) one or more iodonium salts disclosed in the 11$^{th}$ embodiment described herein, in particular bis(4-methylphenyl) hexafluorophosphate (CAS Nr 60565-88-0) in the screen printing composition and b) one or more sulfonium salts disclosed in the 11$^{th}$ embodiment described herein, in particular one or more compounds selected from the group consisting of tris[4-(4-acetylphenylsulfanyl)phenyl]-sulfonium hexafluorophosphate (CAS Nr 953084-13-4); 10-[1, 1'-biphenyl]-4-yl-2-(1-methylethyl)-9-oxo-9H-thioxanthenium hexafluorophosphate (CAS Nr 591773-92-1); and mixtures thereof in the top coating inkjet printing composition, allowed to produce optical effect layers exhibiting not only a dynamic movement of a rolling bar upon tilting the substrate due to the magnetic orientation with the magnetic-field generating device (B1) of the particles, bright and highly reflective areas but also the indicium (see E13 in FIG. 4A).

As shown by the pictures disclosed in FIG. 4A, the use in the claimed process described herein of combinations of a) the one or more sulfonium salts disclosed in the 11$^{th}$ embodiment described herein, in particular one or more salts selected from the group consisting of 4-(phenylthio)phenyl-diphenylsulfonium hexafluoroantimonate (CAS Nr 71449-78-0) and bis[4-(diphenylsulfonium)phenyl] sulfide bishexafluoroantimonate (CAS Nr 89452-37-9) in the screen printing composition and b) one or more sulfonium salts disclosed in the 11$^{th}$ embodiment described herein, in particular one or more compounds selected from the group consisting of tris[4-(4-acetylphenylsulfanyl)phenyl]-sulfonium hexafluorophosphate (CAS Nr 953084-13-4); 10-[1, 1'-biphenyl]-4-yl-2-(1-methylethyl)-9-oxo-9H-thioxanthenium hexafluorophosphate (CAS Nr 591773-92-1); and mixtures thereof in the top coating inkjet printing composition, allowed to produce optical effect layers exhibiting not only a dynamic movement of a rolling bar upon tilting the substrate due to the magnetic orientation with the magnetic-field generating device (B1) of the particles, bright and highly reflective areas but also the indicium (see E14 in FIG. 4A).

As shown by the pictures disclosed in FIG. 4A, the OELs obtained by the claimed process and the combination of the 11$^{th}$ embodiment described herein are shown in E13-E14.

As shown by the pictures disclosed in FIG. 4B, the use of combinations of a) one or more iodonium salts disclosed in the 1$^{st}$ embodiment described herein, in particular bis(4-methylphenyl)iodonium hexafluorophosphate (CAS Nr 60565-88-0) in the screen printing composition and b) one or more thioxanthone compounds disclosed in the 1$^{st}$ embodiment described herein, in particular 1-chloro-4-propoxy-9H-thioxanthen-9-one (CAS Nr 142770-42-1), in the top coating inkjet printing composition with different processes according to the present invention allowed to produce optical effect layers exhibiting not only a dynamic movement of a rolling bar upon tilting the substrate (see E18, and E23 in FIG. 4B) or both a rolling bar (in the area outside the indicium) and a plurality of dark spots and a plurality of bright spots moving and/or appearing and/or disappearing (within the area of the indicium) upon tilting the substrate (see E15-E17 and E19-E22 in FIG. 4B) but also exhibiting the indicium.

As shown by the pictures disclosed in FIG. 4B, the use of combinations of a) one or more iodonium salts disclosed in the 2$^{nd}$ embodiment described herein, in particular bis(4-methylphenyl)iodonium hexafluorophosphate (CAS Nr 60565-88-0) in the screen printing composition and b) one or more anthracene compounds disclosed in the 2$^{nd}$ embodiment described herein, in particular ANTHRACURE® UVS 1331 (CAS Nr 76275-14-4), in the top coating inkjet printing composition with different processes according to the present invention allowed to produce optical effect layers both a rolling bar (in the area outside the indicium) and a plurality of dark spots and a plurality of bright spots moving and/or appearing and/or disappearing (within the area of the indicium) upon tilting the substrate (see E24 in FIG. 4B) but also exhibiting the indicium.

As shown by the pictures disclosed in FIG. 4B, the use of combinations of a) one or more sulfonium salts disclosed in the 5$^{th}$ embodiment described herein, in particular Speed-Cure 976 (CAS Nr 71449-78-0 and 89452-37-9) in the screen printing composition and b) one or more anthracene compounds disclosed in the 5$^{th}$ embodiment described herein, in particular ANTHRACURE® UVS 1331 (CAS Nr 76275-14-4), in the top coating inkjet printing composition with different processes according to the present invention allowed to produce optical effect layers both a rolling bar (in the area outside the indicium) and a plurality of dark spots and a plurality of bright spots moving and/or appearing and/or disappearing (within the area of the indicium) upon tilting the substrate (see E25 in FIG. 4B) but also exhibiting the indicium.

Contrary to the examples according to the present invention, the comparative example C26 made with the combination of a) one or more iodonium salts disclosed in the 1$^{st}$ embodiment described herein, in particular bis(4-methylphenyl)iodonium hexafluorophosphate (CAS Nr 60565-88-0) in the screen printing composition and b) one or more thioxanthone compounds disclosed in the 1$^{st}$ embodiment described herein, in particular 1-chloro-4-propoxy-9H-thioxanthen-9-one (CAS Nr 142770-42-1), in the top coating inkjet printing composition but with a process different from the claimed process, i.e. a process wherein the coating layer and the indicium are cured by the Hg curing unit after the step of exposing the coating layer to the magnetic field of the second magnetic-field generating device is fixed due to the curing of said layer with the Hg curing unit (i.e. no further re-orientation of the particles with the third magnetic-field generating device occurred), failed to exhibit the indicium. C26 exhibited a dynamic movement of a plurality of dark spots and a plurality of bright spots moving and/or appearing and/or disappearing upon tilting the substrate without exhibiting the indicium.

As shown by the pictures disclosed in FIG. 4C, the use of combinations of a) one or more iodonium salts disclosed in the 1$^{st}$ embodiment described herein, in particular bis(4-methylphenyl)iodonium hexafluorophosphate (CAS Nr 60565-88-0) in the screen printing composition and b) one or more thioxanthone compounds disclosed in the 1$^{st}$ embodiment described herein, in particular 1-chloro-4-propoxy-9H-thioxanthen-9-one (CAS Nr 142770-42-1), in the top coating inkjet printing composition on different substrates (S1-S4) allowed to produce optical effect layers exhibiting not only a dynamic movement of a rolling bar upon tilting the substrate (see E1 and E26 in FIG. 4C) or a plurality of bright spots moving and/or appearing and/or disappearing upon tilting the substrate (E27-E29 in FIG. 4C) but also exhibiting the indicium.

The invention claimed is:

1. A method for producing an optical effect layer (OEL), said OEL comprising a motif made of at least two areas made of a single applied and cured layer comprising non-spherical magnetic or magnetizable pigment particles and exhibiting one or more indicia on a substrate, the method comprising the steps of:
   a) applying on a substrate surface a radiation curable coating composition comprising the non-spherical magnetic or magnetizable pigment particles and one or more photo-reactive compounds not absorbing in a range from about 350 nm to about 470 nm, said radiation curable coating composition being in a first, liquid state so as to form a coating layer;
   b) subsequently to step a), applying a top coating composition at least partially on top of the coating layer, wherein said top coating composition is applied in the form of one or more indicia and wherein said top coating composition comprises one or more compounds absorbing in the range from about 350 nm to about 470 nm,
   c) partially simultaneously with or subsequently to step b), at least partially curing the one or more indicia and the one or more areas of the coating layer below said one or more indicia with a LED curing unit emitting between 350 nm and 470 nm,
   d) subsequently to step c), exposing the coating layer to a magnetic field of a magnetic-field generating device so as to orient at least a part of the non-spherical magnetic or magnetizable pigment particles; and
   e) partially simultaneously with or subsequently to step d), at least partially curing the coating layer with a curing unit at least emitting between 250 nm and 320 nm,
   wherein the radiation curable coating composition and the top coating composition are cationically curable compositions, and
   wherein the one or more photo-reactive compounds not absorbing in the range from about 350 nm to about 470 nm of the radiation curable coating composition of step a) and the one or more compounds absorbing in the range from about 350 nm to about 470 nm of the top curable coating composition of step b) are selected according to one of the following combinations:

i) the one or more photo-reactive compounds not absorbing in the range from about 350 nm to about 470 nm of the radiation curable coating composition of step a) are iodonium salts and the one or more compounds absorbing in the range from about 350 nm to about 470 nm of the top curable coating composition of step b) are thioxanthone compounds;

ii) the one or more photo-reactive compounds not absorbing in the range from about 350 nm to about 470 nm of the radiation curable coating composition of step a) are iodonium salts, and the one or more compounds absorbing in the range from about 350 nm to about 470 nm of the top curable coating composition of step b) are anthracene compounds;

iii) the one or more photo-reactive compounds not absorbing in the range from about 350 nm to about 470 nm of the radiation curable coating composition of step a) are iodonium salts, and the one or more compounds absorbing in the range from about 350 nm to about 470 nm of the top curable coating composition of step b) are coumarin compounds;

iv) the one or more photo-reactive compounds not absorbing in the range from about 350 nm to about 470 nm of the radiation curable coating composition of step a) are iodonium salts and the one or more compounds absorbing in the range from about 350 nm to about 470 nm of the top curable coating composition of step b) are naphthalene compounds and the top curable coating composition of step b) further comprises one or more anthracene compounds;

v) the one or more photo-reactive compounds not absorbing in the range from about 350 nm to about 470 nm of the radiation curable coating composition of step a) are sulfonium salts having a cationic moiety and an anionic moiety, wherein cationic moiety is 4-(phenylthio)phenyldiphenyl-sulfonium; bis[4-(diphenylsulfonium)phenyl] sulfide; (4-methylphenyl)diphenyl-sulfonium; (3-methylphenyl)diphenyl-sulfonium; bis(4-methylphenyl)phenyl-sulfonium; [(4-(1,1-dimethylethyl)phenyl]diphenyl-sulfonium; bis[4-(1-methylethyl)phenyl]phenyl-sulfonium; [(4-(2-methylpropyl)phenyl]diphenyl-sulfonium; (4-methoxyphenyl)diphenyl-sulfonium; 1-naphthalenyldiphenyl-sulfonium; tris(4-methylphenyl)-sulfonium; (4-bromophenyl)diphenyl-sulfonium; (4-iodophenyl)diphenyl-sulfonium; (4-fluorophenyl)diphenyl-sulfonium; (4-chlorophenyl)diphenyl-sulfonium; (4-phenoxyphenyl)diphenyl-sulfonium; (4'-methyl[1,1'-biphenyl]-4-yl)diphenyl-sulfonium; tris(4-propylphenyl)-sulfonium; bis(4-butylphenyl)phenyl-sulfonium; tris[4(1-methylethyl)phenyl]-sulfonium; S,S'-1,3-phenylenbis[S,S'-diphenyl]-sulfonium; (4-dodecylphenyl)diphenyl-sulfonium; (4-benzoylphenyl) diphenyl-sulfonium; bis([1,1'-biphenyl]-4-yl)(4-methylphenyl)-sulfonium; tris[4-[1,1-dimethylethyl)phenyl]-sulfonium; triphenyl-sulfonium, 5-(4-methylphenyl)-dibenzothiophenium; 10-(4-methylphenyl)-9H-thioxanthenium; diphenyl[4-[(4-phenylthiophenyl]thio]phenyl]-sulfonium; phenylbis[4-phenylthio)phenyl]-sulfonium; 5-[4-(phenylthio)phenyl]-thianthrenium; 5-[4-(phenylthio)phenyl]-dibenzothiophenium; 10-[4-(diphenylthio)phenyl]-9H-thioxanthenium; 5-phenyl-thianthrenium; 10-phenyl-9H-thioxanthenium; 5-(4-methylphenyl)-thianthrenium; 5-[1,1'-biphenyl]-4-yl-thianthrenium; or S,S'-(thiodi-4,1-phenylene)bis [S,S'-bis[4-(2-hydroxyethoxy)]phenyl]-sulfonium; 5-[4-(2-hydroxyethoxy) phenyl]thianthrenium; and the one or more compounds absorbing in the range from about 350 nm to about 470 nm of the top curable coating composition of step b) are anthracene compounds;

vi) the one or more photo-reactive compounds not absorbing in the range from about 350 nm to about 470 nm of the radiation curable coating composition of step a) are sulfonium salts having a cationic moiety and an anionic moiety, wherein the cationic moiety is any one of those of v), and the one or more compounds absorbing in the range from about 350 nm to about 470 nm of the top curable coating composition of step b) are thioxanthone compounds and the top curable coating composition of step b) further comprises one or more compounds being iodonium salts;

vii) the one or more photo-reactive compounds not absorbing in the range from about 350 nm to about 470 nm of the radiation curable coating composition of step a) are sulfonium salts having a cationic moiety and an anionic moiety, wherein the cationic moiety is any one of those of v), and the one or more compounds absorbing in the range from about 350 nm to about 470 nm of the top curable coating composition of step b) are naphthalene compounds and the top curable coating composition of step b) further comprises one or more anthracene compounds;

viii) the one or more photo-reactive compounds not absorbing in the range from about 350 nm to about 470 nm of the radiation curable coating composition of step a) are sulfonium salts having a cationic moiety and an anionic moiety, wherein the cationic moiety is any one of those of v), and the one or more compounds absorbing in the range from about 350 nm to about 470 nm of the top curable coating composition of step b) are coumarin compounds and the top curable coating composition of step b) further comprises one or more compounds being iodonium salts;

ix) the one or more photo-reactive compounds not absorbing in the range from about 350 nm to about 470 nm of the radiation curable coating composition of step a) are selected from the group consisting of iodonium salts, sulfonium salts having a cationic moiety and an anionic moiety, wherein the cationic moiety is any one of those of v), and mixtures thereof, and the one or more compounds absorbing in the range from about 350 nm to about 470 nm of the top curable coating composition of step b) are iodonium salts having a cationic moiety and an anionic moiety, wherein the cationic moiety is [(7-methoxy-4-methyl-2-oxo-2H-1-benzopyran-3-yl)phenyl]iodonium or [(7-methoxy-4-methyl-2-oxo-2H-1-benzopyran-3-yl)phenyl]iodonium;

x) the one or more photo-reactive compounds not absorbing in the range from about 350 nm to about 470 nm of the radiation curable coating composition of step a) are selected from the group consisting of iodonium salts, sulfonium salts having a cationic moiety and an anionic moiety, wherein the cationic moiety is any one of those of v), and mixtures thereof, and the one or more compounds absorbing in the range from about 350 nm to about 470 nm of the top curable coating composition of step b) are oxonium salts having a cationic moiety and an anionic moiety, wherein the cationic moiety 2,4,6-triphenylpyrylium; 2,4,6-tris (4-methylphenyl)-pyrylium; 2,4,6-tris(4-methoxyphenyl)-pyrylium; 2,6-bis(4-fluorophenyl)-4-(4-methoxyphenyl)-pyrylium; 3-methyl-2,4,6-triphenyl-pyrylium; 2,4,6-tris([1,1'-biphenyl]-4-yl)-pyrylium; 4-[4-(dimethylamino)phenyl]-2,6-diphenyl-pyrylium or 2,4-bis (4-methoxyphenyl)-6-phenyl-pyrylium;

xi) the one or more photo-reactive compounds not absorbing in the range from about 350 nm to about 470 nm of the radiation curable coating composition of step a) are selected from the group consisting of iodonium salts, sulfonium salts having a cationic moiety and an anionic moiety, wherein the cationic moiety is any one of those of v), and mixtures thereof, and the one or more compounds absorbing in the range from about 350 nm to about 470 nm of the top curable coating composition of step b) are sulfonium salts having a cationic moiety and an anionic moiety, wherein the cationic moiety is tris[4-(4-acetylphenylsulfanyl)phenyl]-sulfonium; 10-[1,1'-biphenyl]-4-yl-2-(1-methylethyl)-9-oxo-9H-thioxanthenium; or (9-oxo-9H-thioxanthen-2-yl)diphenyl-sulfonium.

2. The method according to claim 1, wherein the one or more photo-reactive compounds not absorbing in the range from about 350 nm to about 470 nm of the radiation curable coating composition of step a) and the one or more compounds absorbing in the range from about 350 nm to about 470 nm of the top curable coating composition of step b) are selected according to one of the following combinations:

i') the one or more photo-reactive compounds not absorbing in the range from about 350 nm to about 470 nm of the radiation curable coating composition of step a) are iodonium salts having a cationic moiety and an anionic moiety, wherein the cationic moiety is bis(4-dodecylphenyl)iodonium; bis[4-(1,1-dimethylethyl)phenyl]iodonium; (4-isopropylphenyl)(4-methylphenyl) iodonium; bis(4-methylphenyl)iodonium; (4-methylphenyl) [4-(2-methylpropyl)phenyl]iodonium; bis(2,4-dimethylphenyl)]iodonium; bis(3,4-dimethylphenyl)]iodonium; (4-methylphenyl)(2,4,6-trimethylphenyl)iodonium; bis[(4-(2-methylpropyl)phenyl] iodonium; bis(4-butylphenyl]iodonium; bis(2,4,6-trimethylphenyl)iodonium; bis(4-hexylylphenyl] iodonium; bis(4-decylphenyl)iodonium; (4-decylphenyl)(4-undecylphenyl)iodonium; bis(4-undecylphenyl)iodonium; bis(4-tridecylphenyl)iodonium; bis(4-tetradecylphenyl)iodonium; bis(4-hexadecylphenyl)iodonium; bis(4-heptadecylphenyl) iodonium; bis(4-octadecylphenyl)iodonium; (4-decylphenyl)(4-dodecylphenyl)iodonium; (4-decylphenyl)(4-tridecylphenyl)iodonium; (4-decylphenyl)(4-tetradecylphenyl)iodonium; (4-dodecylphenyl)(4-undecylphenyl)iodonium; (4-dodecylphenyl)(4-tridecylphenyl)iodonium; (4-dodecylphenyl)(4-tetradecylphenyl)iodonium; (4-tridecylphenyl)(4-undecylphenyl)iodonium; (4-tetradecylphenyl)(4-undecylphenyl)iodonium; (4-tetradecylphenyl)(4-tridecylphenyl)iodonium; p-(octyloxyphenyl)phenyliodonium; [4-[(2-hydroxytetradecyl) oxy]phenyl]phenyliodonium; phenyl[3-(trifluoromethyl)phenyl]iodonium; bis(4-fluorophenyl) iodonium; (4-nitrophenyl)phenyliodonium; (4-nitrophenyl)(2,4,6-trimethylphenyl)iodonium; and the one or more compounds absorbing in the range from about 350 nm to about 470 nm of the top curable coating composition of step b) are thioxanthone compounds being selected from the group consisting of 2-isopropyl-9H-thioxanthen-9-one; 4-(1-methylethyl)-9H-thioxanthen-9-one; 2,4-diethyl-9H-thioxanthen-9-one); 2-chloro-9H-thioxanthen-9-one; 1-chloro-4-propoxy-9H-thioxanthen-9-one; 1,3-di[[α-[1-chloro-9-oxo-9H-thioxanthen-4-yl)oxy]acetylpoly[oxy(1-methylethylene)]]oxy]-2,2-bis[[α-[1-cloro-9-oxo-9H-thioxanthen-4-yl)oxy]acetylpoly[oxy(1-methylethylene)]]oxymethylpropane; α-[2-[(9-oxo-9H-thioxanthenyl)oxy]acetyl]-ω-[[2-[(9-oxo-9H-thioxanthenyl)oxy]acetyl]oxy]-poly(oxy-1,4-butanediyl; α-[2-[(9-oxo-9H-thioxanthenyl)oxy] acetyl]-ω-[[2-[(9-oxo-9H-thioxanthenyl)oxy]acetyl] oxy]-poly(oxy-1,4-butanediyl; oligomeric and polymeric compounds thereof and mixtures thereof;

ii') the one or more photo-reactive compounds not absorbing in the range from about 350 nm to about 470 nm of the radiation curable coating composition of step a) are iodonium salts of i'), and the one or more compounds absorbing in the range from about 350 nm to about 470 nm of the top curable coating composition of step b) are anthracene compounds selected from the group consisting of 9,10-diethoxy-anthracene; 9,10-dibutoxy-anthracene and mixtures thereof;

iii') the one or more photo-reactive compounds not absorbing in the range from about 350 nm to about 470 nm of the radiation curable coating composition of step a) are iodonium salts of i'), and the one or more compounds absorbing in the range from about 350 nm to about 470 nm of the top curable coating composition of step b) are coumarin compounds selected from the group consisting of 3-(4-dodecylbenzoyl)-5,7-dimethoxy-2H-1-benzopyran-2-one, 3-(4-$C_{10}$-$C_{13}$-benzoyl)-5,7-dimethoxy-2H-1-benzopyran-2-one and mixtures thereof;

iv') the one or more photo-reactive compounds not absorbing in the range from about 350 nm to about 470 nm of the radiation curable coating composition of step a) are iodonium salts of i'), and the one or more compounds absorbing in the range from about 350 nm to about 470 nm of the top curable coating composition of step b) are naphthalene compounds being 9,10-diethoxy-naphthalene and the top curable coating composition of step b) further comprises one or more anthracene compounds selected from the group consisting of 9,10-diethoxy-anthracene; 9,10-dibutoxy-anthracene and mixtures thereof;

v') the one or more photo-reactive compounds not absorbing in the range from about 350 nm to about 470 nm of the radiation curable coating composition of step a) are sulfonium salts having a cationic moiety and an anionic moiety, wherein cationic moiety is 4-(phenylthio)phenyldiphenyl-sulfonium; bis[4-(diphenylsulfonium)phenyl] sulfide; (4-methylphenyl)diphenyl-sulfonium; (3-methylphenyl)diphenyl-sulfonium; bis(4-methylphenyl)phenyl-sulfonium; [(4-(1,1-dimethylethyl) phenyl]diphenyl-sulfonium; bis[4-(1-methylethyl)phenyl]phenyl-sulfonium; [(4-(2-methylpropyl)phenyl]diphenyl-sulfonium; (4-methoxyphenyl)diphenyl-sulfonium; 1-naphthalenyldiphenyl-sulfonium; tris(4-methylphenyl)-sulfonium; (4-bromophenyl)diphenyl-sulfonium; (4-iodophenyl)diphenyl-sulfonium; (4-fluorophenyl)diphenyl-sulfonium; (4-chlorophenyl)diphenyl-sulfonium; (4-phenoxyphenyl)diphenyl-sulfonium; (4'-methyl[1,1'-biphenyl]-4-yl)diphenyl-sulfonium; tris(4-propylphenyl)-sulfonium; bis(4-butylphenyl)phenyl-sulfonium; tris[4 (1-methylethyl)phenyl]-sulfonium; S,S'-1,3-phenylenbis[S,S'-diphenyl]-sulfonium; (4-dodecylphenyl)diphenyl-sulfonium; (4-benzoylphenyl)diphenyl-sulfonium; bis([1,1'-biphenyl]-4-yl)(4-methylphenyl)-sulfonium; tris[4-[1,1-dimethylethyl)phenyl]-sulfonium; triphenyl-sulfonium; 5-(4-methylphenyl)-dibenzothiophenium; 10-(4-methylphenyl)-9H-thioxanthenium; diphenyl[4-[[(4-phenylthiophenyl]thio]phenyl]-sulfonium; phenylbis[4-phenylthio)phenyl]-sulfonium; 5-[4-(phenylthio)phenyl]-thianthrenium; 5-[4-(phenylthio)phenyl]-dibenzothiophenium; 10-[4-(diphenylthio)phenyl]-9H-thioxanthenium; 5-phenyl-thianthrenium; 10-phenyl-9H-thioxanthenium; 5-(4-methylphenyl)-thianthrenium; 5-[1,1'-biphenyl]-4-yl-thianthrenium; or S,S'-(thiodi-4,1-phenylene)bis[S,S'-bis[4-(2-hydroxyethoxy)phenyl]-sulfonium, and the one or more compounds absorbing in the range from about 350 nm to about 470 nm of the top curable coating composition of step b) are anthracene compounds of ii');

vi') the one or more photo-reactive compounds not absorbing in the range from about 350 nm to about 470 nm of the radiation curable coating composition of step a) are sulfonium salts of v'), and
the one or more compounds absorbing in the range from about 350 nm to about 470 nm of the top curable coating composition of step b) are thioxanthone compounds of i') and the top curable coating composition of step b) further comprises one or more compounds being iodonium salts of i');

vii') the one or more photo-reactive compounds not absorbing in the range from about 350 nm to about 470 nm of the radiation curable coating composition of step a) are sulfonium salts of v'), and
the one or more compounds absorbing in the range from about 350 nm to about 470 nm of the top curable coating composition of step b) are naphthalene compounds being 9,10-diethoxy-naphthalene and the top curable coating composition of step b) further comprises one or more anthracene compounds selected from the group consisting of 9,10-diethoxy-anthracene; 9,10-dibutoxy-anthracene and mixtures thereof;

viii') the one or more photo-reactive compounds not absorbing in the range from about 350 nm to about 470 nm of the radiation curable coating composition of step a) are sulfonium salts of v'), and
the one or more compounds absorbing in the range from about 350 nm to about 470 nm of the top curable coating composition of step b) are coumarin compounds of iii') and the top curable coating composition of step b) further comprises one or more compounds being iodonium salts of i');

ix') the one or more photo-reactive compounds not absorbing in the range from about 350 nm to about 470 nm of the radiation curable coating composition of step a) are selected from the group consisting of iodonium salts, sulfonium salts having a cationic moiety and an anionic moiety, wherein the cationic moiety is any of those of v') and mixtures thereof, and
the one or more compounds absorbing in the range from about 350 nm to about 470 nm of the top curable coating composition of step b) are iodonium salts having a cationic moiety and an anionic moiety, wherein the cationic moiety is [(7-methoxy-4-methyl-2-oxo-2H-1-benzopyran-3-yl)phenyl]iodonium or [(7-methoxy-4-methyl-2-oxo-2H-1-benzopyran-3-yl)phenyl]iodonium;

x') the one or more photo-reactive compounds not absorbing in the range from about 350 nm to about 470 nm of the radiation curable coating composition of step a) are selected from the group consisting of iodonium salts, sulfonium salts having a cationic moiety and an anionic moiety, wherein the cationic moiety is any of those of v', and mixtures thereof; and
the one or more compounds absorbing in the range from about 350 nm to about 470 nm of the top curable coating composition of step b) are oxonium salts having a cationic moiety and an anionic moiety, wherein the cationic moiety is 2,4,6-triphenylpyrylium; 2,4,6-tris(4-methylphenyl)-pyrylium; 2,4,6-tris(4-methoxyphenyl)-pyrylium; 2,6-bis(4-fluorophenyl)-4-(4-methoxyphenyl)-pyrylium; 3-methyl-2,4,6-triphenyl-pyrylium; 2,4,6-tris([1,1'-biphenyl]-4-yl)-pyrylium; 4-[4-(dimethylamino)phenyl]-2,6-diphenyl-pyrylium (or 2,4-bis(4-methoxyphenyl)-6-phenyl-pyrylium;

xi') the one or more photo-reactive compounds not absorbing in the range from about 350 nm to about 470 nm of the radiation curable coating composition of step a) are selected from the group consisting of iodonium salts, sulfonium salts having a cationic moiety and an anionic moiety, wherein the cationic moiety is any of those of v', and mixtures thereof; and
the one or more compounds absorbing in the range from about 350 nm to about 470 nm of the top curable coating composition of step b) are sulfonium salts having a cationic moiety and an anionic moiety, wherein the cationic moiety is tris[4-(4-acetylphenylsulfanyl)phenyl]-sulfonium; 10-[1,1'-biphenyl]-4-yl-2-(1-methylethyl)-9-oxo-9H-thioxanthenium; or (9-oxo-9H-thioxanthen-2-yl)diphenyl-sulfonium.

3. The method according to claim 1, wherein the one or more photo-reactive compounds not absorbing in the range from about 350 nm to about 470 nm of the radiation curable coating composition of step a) and the one or more compounds absorbing in the range from about 350 nm to about 470 nm of the top curable coating composition of step b) are selected according to one of the following combinations:

i'') at least one of the one or more photo-reactive compounds not absorbing in the range from about 350 nm to about 470 nm of the radiation curable coating composition of step a) is an iodonium salt being bis(4-methylphenyl)iodonium hexafluorophosphate or bis(4-dodecylphenyl)iodonium hexafluoroantimonate; and at least one of the one or more compounds absorbing in the range from about 350 nm to about 470 nm of the top curable coating composition of step b) is a thioxanthone compound being is a thioxanthone compound being 1-chloro-4-propoxy-9H-thioxanthen-9-one, 2-isopropyl-9H-thioxanthen-9-one, 4-(1-methylethyl)-9H-thioxanthen-9-one, a thioxanthone oligomer or polymer or 1,3-di[[α-[1-chloro-9-oxo-9H-thioxanthen-4-yl)oxy]acetylpoly[oxy(1-methylethylene)]]

oxy]-2,2-bis[[α-[1-cloro-9-oxo-9H-thioxanthen-4-yl)oxy]acetylpoly[oxy(1-methylethylene)]]oxymethylpropane;

ii") at least one of the one or more photo-reactive compounds not absorbing in the range from about 350 nm to about 470 nm of the radiation curable coating composition of step a) is an iodonium salt being bis(4-methylphenyl)iodonium hexafluorophosphate, and
at least one of the one or more compounds absorbing in the range from about 350 nm to about 470 nm of the top curable coating composition of step b) is an anthracene compound being 9,10-dibutoxy-anthracene;

iii") at least one of the one or more photo-reactive compounds not absorbing in the range from about 350 nm to about 470 nm of the radiation curable coating composition of step a) is an iodonium salt being bis(4-methylphenyl)iodonium hexafluorophosphate, and
at least one of the one or more compounds absorbing in the range from about 350 nm to about 470 nm of the top curable coating composition of step b) is a coumarin compound being 3-(4-dodecylbenzoyl)-5,7-dimethoxy-2H-1-benzopyran-2-one;

iv") at least one of the one or more photo-reactive compounds not absorbing in the range from about 350 nm to about 470 nm of the radiation curable coating composition of step a) is an iodonium salt being bis(4-methylphenyl)iodonium hexafluorophosphate, and
at least one of the one or more compounds absorbing in the range from about 350 nm to about 470 nm of the top curable coating composition of step b) is an anthracene compound being 9,10-dibutoxy-anthracene and at last another one is a naphthalene compound being 9,10-diethoxy-naphthalene, v") at least one of the one or more photo-reactive compounds not absorbing in the range from about 350 nm to about 470 nm of the radiation curable coating composition of step a) is a sulfonium salt being 4-(phenylthio)phenyldiphenylsulfonium hexafluoroantimonate or bis[4-(diphenylsulfonium)phenyl] sulfide bishexafluoroantimonate, and at least one of the one or more compounds absorbing in the range from about 350 nm to about 470 nm of the top curable coating composition of step b) is an anthracene compound being 9,10-dibutoxy-anthracene;

vi") at least one of the one or more photo-reactive compounds not absorbing in the range from about 350 nm to about 470 nm of the radiation curable coating composition of step a) is a sulfonium salt being 4-(phenylthio)phenyldiphenylsulfonium hexafluoroantimonate or bis[4-(diphenylsulfonium)phenyl] sulfide bishexafluoroantimonate, and at least one of the one or more compounds absorbing in the range from about 350 nm to about 470 nm of the top curable coating composition of step b) is a thioxanthone compound being 1-chloro-4-propoxy-9H-thioxanthen-9-one and at least another one is an iodonium salt being bis(4-methylphenyl)iodonium hexafluorophosphate;

vii") at least one of the one or more photo-reactive compounds not absorbing in the range from about 350 nm to about 470 nm of the radiation curable coating composition of step a) is a sulfonium salt being 4-(phenylthio)phenyldiphenylsulfonium hexafluoroantimonate or bis[4-(diphenylsulfonium)phenyl] sulfide bishexafluoroantimonate, and at least one of the one or more compounds absorbing in the range from about 350 nm to about 470 nm of the top curable coating composition of step b) is an anthracene compound being 9,10-dibutoxy-anthracene and at last another one is a naphthalene compound being 9,10-diethoxy-naphthalene;

xi") at least one of the one or more photo-reactive compounds not absorbing in the range from about 350 nm to about 470 nm of the radiation curable coating composition of step a) is an iodonium salt being bis(4-methylphenyl)iodonium hexafluorophosphate or a is a sulfonium salt being 4-(phenylthio)phenyldiphenylsulfonium hexafluoroantimonate or bis[4-(diphenylsulfonium)phenyl] sulfide bishexafluoroantimonate, and at least one of the one or more compounds absorbing in the range from about 350 nm to about 470 nm of the top curable coating composition of step b) is a sulfonium salts having a cationic moiety and an anionic moiety, wherein the cationic moiety is tris[4-(4-acetylphenylsulfanyl)phenyl]-sulfonium.

4. The method according to claim 1, further comprising a step of exposing the coating layer to a magnetic field of a magnetic-field generating device so as to orient at least a part of the magnetic or magnetizable pigment particles, said step being carried out subsequently to or partially simultaneously with step b) and prior to step c).

5. The method according to claim 4, wherein the step d) of exposing the coating layer and/or the step of exposing the coating layer to the magnetic field of a magnetic-field generating device, is carried out so as to mono-axially orient at least a part of the non-spherical magnetic or magnetizable pigment particles.

6. The method according to claim 4, wherein the step d) of exposing the coating layer and/or the step of exposing the coating layer to magnetic field of a magnetic-field generating device is carried out so as to bi-axially orient at least a part of the non-spherical magnetic or magnetizable pigment particles, wherein the non-spherical magnetic or magnetizable pigment particles are platelet-shaped magnetic or magnetizable pigment particles, having an X-axis and a Y-axis defining a plane of predominant extension of the particles.

7. The method according claim 6, wherein the step d) exposing the coating layer is carried out so as to bi-axially orient at least a part of the platelet-shaped magnetic or magnetizable pigment particles to have both their X-axes and Y-axes substantially parallel to the substrate surface.

8. The method according to claim 4, wherein step d) and/or the step of exposing the coating layer to the magnetic field of a magnetic-field generating device consists of two steps, a first step consisting of exposing the coating layer to the magnetic field of the magnetic-field generating device so as to bi-axially orient at least a part of the platelet-shaped magnetic or magnetizable pigment particles, and a second step consisting of exposing the coating layer to a magnetic field of a second magnetic-field-generating device so as to mono-axially orient at least a part of the platelet-shaped magnetic or magnetizable pigment particles, wherein said second step is carried out partially simultaneously with, simultaneously with or subsequently to the first step.

9. The method according to claim 1, further comprising a step of exposing the coating layer to a magnetic field of a magnetic-field generating device so as to orient at least a part of the magnetic or magnetizable pigment particles, said step being carried out subsequently to step a) and prior to step b).

10. The method according to claim 1, wherein the step a) of applying the radiation curable coating composition is carried out by a process selected from the group consisting of screen printing, rotogravure printing, pad printing and flexography printing.

11. The method according to claim 1, wherein the step b) of applying the top coating composition is carried out by a contactless fluid microdispensing technology.

12. The method according to claim 11, wherein the step b) of applying the top coating composition is carried out by an inkjet printing process.

13. The method according to claim 1, wherein at least a part of the non-spherical magnetic or magnetizable pigment particles is constituted by non-spherical optically variable magnetic or magnetizable pigment particles.

14. The method according to claim 13, wherein the non-spherical optically variable magnetic or magnetizable pigment particles are selected from the group consisting of magnetic thin-film interference pigments, magnetic cholesteric liquid crystal pigments and mixtures thereof.

15. The method according to claim 1, wherein the one or more indicia are selected from the group consisting of codes, symbols, alphanumeric symbols, motifs, geometric patterns, letters, words, numbers, logos, drawings, portraits and combinations thereof.

16. An optical effect layer (OEL) produced by the method recited in claim 1.

\* \* \* \* \*